(12) United States Patent
Koike et al.

(10) Patent No.: US 6,312,064 B1
(45) Date of Patent: Nov. 6, 2001

(54) BRAKING FORCE CONTROLLER

(75) Inventors: Shin Koike, Nishikamo-gun; Nobuyasu Nakanishi, Toyota; Akiyoshi Yamada, Toyoake; Satoshi Shimizu, Toyota; Hideyuki Aizawa; Masahiro Hara, both of Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/331,910

(22) PCT Filed: Feb. 26, 1998

(86) PCT No.: PCT/JP98/00797

§ 371 Date: Jun. 24, 1999

§ 102(e) Date: Jun. 24, 1999

(87) PCT Pub. No.: WO98/39186

PCT Pub. Date: Sep. 11, 1998

(30) Foreign Application Priority Data

Mar. 6, 1997 (JP) .................................................. 9-052074
Jul. 9, 1997 (JP) .................................................. 9-183964

(51) Int. Cl.$^7$ ................................................ B60T 8/60
(52) U.S. Cl. ........................................ 303/155; 303/116.1
(58) Field of Search ................................ 303/155, 113.4, 303/116.1

(56) References Cited

U.S. PATENT DOCUMENTS 4,674,805 * 6/1987 Leiber .................................... 303/114
4,755,008 * 7/1988 Imoto et al. .......................... 303/110

(List continued on next page.)

FOREIGN PATENT DOCUMENTS

| 0711695 | 5/1996 | (EP) . |
| 2282649 | 4/1995 | (GB) . |
| 2295209 | 5/1996 | (GB) . |
| 61-268560 | 11/1986 | (JP) . |

(List continued on next page.)

Primary Examiner—Robert J Oberleitner
Assistant Examiner—Benjamin A. Pezzlo
(74) Attorney, Agent, or Firm—Kenyon & Kenyon

(57) ABSTRACT

A brake force control apparatus which can always accurately generate a brake force confirming to a driver's intention is provided. The brake force control apparatus performs brake assist control for supplying an increased brake fluid pressure which is greater than that generated in a regular brake operation to a wheel cylinder of a vehicle when an emergency brake operation is performed by a driver. A deceleration of the vehicle is detected. Additionally, a difference between a target deceleration which is to be generated during execution of the brake assist control and the deceleration is detected. A brake fluid pressure which is supplied to the wheel cylinder during execution of the brake assist control is controlled based on the difference.

8 Claims, 41 Drawing Sheets

U.S. PATENT DOCUMENTS

| | | |
|---|---|---|
| 4,774,667 | 9/1988 | Kuraoka et al. . |
| 5,158,343 | 10/1992 | Reichelt et al. . |
| 5,261,730 | 11/1993 | Steiner et al. . |
| 5,350,225 | 9/1994 | Steiner et al. . |
| 5,367,942 | 11/1994 | Nell et al. . |
| 5,427,442 * | 6/1995 | Heibel ............................... 303/114.3 |
| 5,445,444 | 8/1995 | Rump et al. . |
| 5,492,397 | 2/1996 | Steiner et al. . |
| 5,496,099 | 3/1996 | Resch . |
| 5,499,866 | 3/1996 | Brugger et al. . |
| 5,505,526 | 4/1996 | Michels . |
| 5,513,906 | 5/1996 | Steiner . |
| 5,535,123 | 7/1996 | Rump et al. . |
| 5,539,641 | 7/1996 | Littlejohn . |
| 5,549,369 | 8/1996 | Rump et al. . |
| 5,556,173 | 9/1996 | Steiner et al. . |
| 5,564,797 | 10/1996 | Steiner et al. . |
| 5,567,021 | 10/1996 | Gaillard . |
| 5,584,542 | 12/1996 | Klarer et al. . |
| 5,586,814 | 12/1996 | Steiner . |
| 5,588,718 * | 12/1996 | Winner et al. ..................... 303/113.1 |
| 5,607,209 | 3/1997 | Narita et al. . |
| 5,632,531 * | 5/1997 | Batistic et al. ..................... 303/113.4 |
| 5,647,647 * | 7/1997 | Kato et al. ....................... 303/122.09 |
| 5,658,055 | 8/1997 | Dieringer et al. . |
| 5,660,448 | 8/1997 | Kiesewetter et al. . |
| 5,669,676 | 9/1997 | Rump et al. . |
| 5,719,769 | 2/1998 | Brugger et al. . |
| 5,720,532 | 2/1998 | Steiner et al. . |
| 5,727,854 * | 3/1998 | Pueschel et al. ..................... 303/155 |
| 5,762,407 | 6/1998 | Stacey et al. . |
| 5,772,290 | 6/1998 | Heibel et al. . |
| 5,779,329 | 7/1998 | Takeshima . |
| 5,816,666 * | 10/1998 | Wiss .................................. 303/113.4 |
| 5,816,667 * | 10/1998 | Jokic ................................. 303/113.4 |
| 5,833,327 * | 11/1998 | Kozakai ............................ 303/113.4 |
| 5,890,776 | 4/1999 | Sawada . |
| 5,897,175 * | 4/1999 | Terazawa et al. ................. 303/113.4 |
| 5,931,545 | 8/1999 | Yonemura et al. . |
| 5,961,188 | 10/1999 | Sawada . |
| 5,978,725 | 11/1999 | Kagawa . |
| 6,019,438 * | 2/2000 | Sawada et al. .................... 303/113.4 |
| 6,027,182 * | 2/2000 | Nakanishi et al. ................. 303/116.1 |
| 6,033,039 * | 3/2000 | Dieringer .......................... 303/113.4 |
| 6,099,086 * | 8/2000 | Feigel et al. .......................... 303/155 |
| 6,106,080 * | 8/2000 | Tozu et al. ......................... 303/116.1 |
| 6,109,703 * | 8/2000 | Takahashi ............................ 303/155 |
| 6,120,110 * | 9/2000 | Shimizu ............................ 303/113.4 |
| 6,129,423 * | 10/2000 | Hashimoto ........................... 303/125 |
| 6,129,425 * | 10/2000 | Onuma .................................. 303/155 |
| 6,149,248 * | 11/2000 | Lubbers et al. .................... 303/114.1 |
| 6,157,887 * | 12/2000 | Zittlau ..................................... 701/70 |
| 6,158,824 * | 12/2000 | Yonemura et al. ................ 303/113.5 |

FOREIGN PATENT DOCUMENTS

| | | |
|---|---|---|
| 61268560 | 11/1986 | (JP) . |
| 3-227766 | 10/1991 | (JP) . |
| 4-334649 | 11/1992 | (JP) . |
| 05050908 | 3/1993 | (JP) . |
| 5-97022 | 4/1993 | (JP) . |
| 05254411 | 10/1993 | (JP) . |
| 05262212 | 10/1993 | (JP) . |
| 05319233 | 12/1993 | (JP) . |
| 05319235 | 12/1993 | (JP) . |
| 7-76267 | 3/1995 | (JP) . |
| 7-81540 | 3/1995 | (JP) . |
| 7-156786 | 6/1995 | (JP) . |
| 07315187 | 12/1995 | (JP) . |
| 7-329766 | 12/1995 | (JP) . |
| 08002286 | 1/1996 | (JP) . |
| 8-34326 | 2/1996 | (JP) . |
| 8-40229 | 2/1996 | (JP) . |
| 0885431 | 4/1996 | (JP) . |
| 08164837 | 6/1996 | (JP) . |
| 8-507021 | 7/1996 | (JP) . |
| 08230634 | 9/1996 | (JP) . |
| 08301098 | 11/1996 | (JP) . |
| 8-295224 | 11/1996 | (JP) . |
| 8-301098 | 11/1996 | (JP) . |
| 09030394 | 2/1997 | (JP) . |
| 9071236 | 3/1997 | (JP) . |
| 9532878 | 12/1995 | (WO) . |
| WO96/06763 | 3/1996 | (WO) . |

* cited by examiner

ASSIST PRESSURE INCREASING STATE (BA CONTROL OR BA+ABS CONTROL)

ASSIST PRESSURE CORRECTING AND HOLDING STATE
(BA CONTROL OR BA + ABS CONTROL)

START PRESSURIZING END TIME TABLE

PRESSURE INCREASING TIME TABLE

PRESSURE DECREASING TIME TABLE (FR FRONT/REAR CONNECTED VEHICLE) REGULAR BRAKE STATE (ABS OPERATING STATE)

(FR: FRONT/REAR CONNECTED VEHICLE)
ASSIST PRESSURE INCREASING STATE (BA CONTROL)

FIG. 36

ASSIST PRESSURE HOLDING STATE (BA CONTROL)
(FF:X CONNECTED VEHICLE)

BRAKING FORCE CONTROLLER

TECHNICAL FIELD

The present invention relates to a brake force control apparatus and, more particularly, to a brake force control apparatus which generates, when an emergency brake operation is performed in a vehicle, a relatively large brake force as compared to that generated during a normal brake operation.

BACKGROUND ART

Conventionally, as disclosed in Japanese Laid-Open Patent Application No. 4-121260, a brake force control apparatus is known which generates an increased brake fluid pressure as compared to that generated during a normal brake operation when a brake pedal is depressed at a speed exceeding a predetermined speed. A driver of a vehicle operates a brake pedal at a high speed when a rapid increase in a brake force is desired. According to the above-mentioned brake force control apparatus, when such a brake operation (hereinafter referred to as an emergency brake operation) is performed, it is possible to generate a brake force which appropriately responds to a request of the driver by generating an increased brake fluid pressure as compared to that generated during the normal brake operation.

A brake force requested by the driver after start of the emergency brake operation is not always uniform. That is, when the brake pedal is further depressed after the start of the emergency brake operation, it can be determined that the driver intends to increase the brake force. On the other hand, when an operation of the brake pedal is maintained constant or decreased, it can be determined that the driver intends to maintain or decrease the brake force, respectively.

Accordingly, in order to generate a brake force to which the driver's intention is accurately reflected after the emergency brake operation is started, it is appropriate to increase or decrease the brake fluid pressure in accordance with a state of operation of the brake pedal after the brake fluid pressure is increased as compared to that generated in the normal operation. Such an ability can be achieved by, for example, providing an additional function which attempts to increase the brake fluid pressure when the amount of operation of the brake pedal is increased, maintain the brake fluid pressure when the amount of operation is maintained, and decrease the brake fluid pressure when the amount of operation is decreased.

However, it is not necessarily easy to increase or decrease the brake fluid pressure supplied to wheel cylinders when the brake fluid pressure is relatively high as compared to a case of a normal operation. For this reason, the brake fluid pressure intended by the driver may not be generated if the brake fluid pressure is controlled by using the above-mentioned technique.

DISCLOSURE OF THE INVENTION

It is an object of the present invention to provide a brake force control apparatus which can always accurately generate a brake force conforming to a driver's intention.

The above-mentioned object can be achieved by a brake force control apparatus which performs brake assist control for supplying an increased brake fluid pressure which is greater than that generated in a regular brake operation to a wheel cylinder of a vehicle when an emergency brake operation is performed by a driver, the brake force control apparatus characterized by:

deceleration detecting means for detecting a deceleration of the vehicle;

difference detecting means for detecting a difference between a target deceleration which is to be generated during execution of the brake assist control and the deceleration; and fluid pressure control means for controlling a brake fluid pressure which is supplied to the wheel cylinder during execution of the brake assist control based on the difference.

In this invention, during execution of the brake assist control, an increased brake fluid pressure is supplied to the wheel cylinder as compared to that generated during the regular brake operation. This brake fluid pressure is controlled based on the difference between the target deceleration and the actual deceleration. According to this control, a deceleration which is always equal to the target deceleration can be obtained during execution of the brake assist control (hereinafter referred to as BA control) without being influenced by interferences with the other controls and changes in properties of components during execution of the brake assist control.

The brake force control apparatus according to the present invention may further comprise:

amount of brake operation detecting means for detecting an amount of brake operation; and target deceleration setting means for setting the target deceleration based on the amount of brake operation.

In this invention, the target deceleration is set based on the amount of brake operation performed by the driver. When a relatively large amount of brake operation is generated during execution of the brake assist control, it can be determined that the driver requests a relatively large deceleration. In this case, it is appropriate to set the target deceleration to a relatively large value. On the other hand, when the amount of brake operation generated during execution of the brake assist control is relatively small, it can be determined that the driver does not request a large deceleration. In this case, it is appropriate to set the target deceleration to a relatively small value. According to the invention, it is possible to set the target deceleration to a value which always satisfies the above-mentioned requirements during execution of the brake assist control. Thus, it is possible to set the target deceleration to an appropriate value which conforms to the driver's intention.

Additionally, the target deceleration setting means may comprise:

basic deceleration detecting means for detecting a deceleration which is obtained during the regular brake operation based on the amount of brake operation; and assist deceleration adding means for calculating the target deceleration by adding a predetermined assist deceleration to the deceleration detected by the basic deceleration detecting means.

In this invention, a deceleration which is substantially equal to the target deceleration can be obtained during execution of the brake assist control. In addition, the target deceleration is set to a value which is obtained by adding the assist deceleration to a deceleration corresponding to the amount of brake operation (a deceleration obtained during the regular brake operation). Accordingly, a deceleration can be generated which is greater than that obtained during the regular brake operation by the predetermined assist deceleration during execution of the brake assist control.

Additionally, the brake force control apparatus may further comprise an TABS mechanism for performing TABS control which attempts to decrease a wheel cylinder pressure $P_{W/C}$ for a wheel in which an excessive slip rate is generated, and the fluid pressure control means may comprise pressure increasing inhibiting means for inhibiting increase of the wheel cylinder pressure $P_{W/C}$ when the TABS control is performed even if the deceleration is smaller than the target deceleration.

In this invention, when an excessive slip rate is generated in any of the wheels, the wheel cylinder pressure $P_{W/C}$ of that wheel is decreased by performing the TABS control. It can be determined that the wheel cylinder pressure $P_{W/C}$ of each wheel is increased to a certain extent at a time when the TABS control is started. According to the present invention, in such a situation, the wheel cylinder pressure $P_{W/C}$ is inhibited from being increased even if the deceleration of the vehicle is smaller than the target deceleration. According to this process, the wheel cylinder pressure $P_{W/C}$ is not increased to an excessively high fluid pressure when the vehicle is moving on a low friction road.

Additionally, the pressure increasing inhibiting means may inhibit increase of the wheel cylinder pressure $P_{W/C}$ when the TABS control is performed for at least one of the front left and right wheels.

In this invention, increase of the wheel cylinder pressure $P_{W/C}$ is inhibited only when the TABS control is performed for the front left or right wheel. When the TABS control is performed for one of the front left and right wheels, the brake force cannot be effectively increased if the wheel cylinder pressure $P_{W/C}$ of the other wheel is increased. Thus, in such a situation, it is appropriate to inhibit increase of the wheel cylinder pressure $P_{W/C}$ for maintaining the stability of the vehicle. On the other hand, when the TABS control is performed for neither of the front left and right wheels, a further increased brake force may be obtained by increasing the wheel cylinder pressure $P_{W/C}$ of these wheels. Thus, in such a situation, increase of the wheel cylinder pressure $P_{W/C}$ should not be inhibited. According to the present invention, both the above-mentioned two requirements can be satisfied. That is, it is possible to permit increase of the wheel cylinder pressure $P_{W/C}$ when the brake force can be increased by increasing the wheel cylinder pressure $P_{W/C}$ and inhibit increase of the wheel cylinder pressure $P_{W/C}$ only when the brake force cannot be increased.

The fluid pressure control means may control the brake fluid pressure supplied to the wheel cylinder based on the difference and a brake operation performed by the driver.

In this invention, it is necessary to increase or decrease the brake fluid pressure in accordance with the driver's intention during execution of the brake assist control. Therefore, when a brake operation is performed by the driver intending to decrease the brake force, the brake fluid pressure should not be increased even if the deceleration is smaller than the target deceleration. Similarly, when a brake operation is performed by the driver intending to increase the brake force, the brake fluid pressure should not be decreased even if the deceleration is greater than the target deceleration. According to the present invention, since the brake fluid pressure is controlled referring to the brake operation, the driver's intention can be accurately reflected to the brake fluid pressure.

Additionally, the fluid pressure control means may comprise pressure correcting and holding means for disconnecting wheel cylinders of all wheels from all fluid pressure sources when the deceleration is greater than the target deceleration by a value which is greater than a first predetermined value and a brake operating speed is smaller than or equal to a second predetermined value.

In this invention, when the deceleration is greater than the target deceleration by a value which is greater than the first predetermined value, it can be determined that the current brake fluid pressure is excessively large as compared to a brake fluid pressure by which the target deceleration can be obtained. In addition, when the brake operating speed is smaller than or equal to the second predetermined value, it can be determined that the driver does not intend to increase the brake force.

According to the present invention, when the above-mentioned situation is detected, the wheel cylinders are disconnected from all of the fluid pressure sources. If the wheel cylinders are disconnected from all of the fluid pressure sources, increase of the wheel cylinder pressure $P_{W/C}$ is inhibited. Accordingly, it is possible to positively prevent the difference between the deceleration and the target deceleration from being increased when an excessive deceleration is generated as compared to the target deceleration and the driver does not intend to increase the brake force.

Additionally, the fluid pressure control means may further comprise pressure correcting and holding interrupting means for interrupting the correction of the brake fluid pressure by the pressure correcting and holding means when a brake operation is performed which intends to decrease or increase a brake force.

In this invention, when a brake operation is performed by the driver intending to increase or decrease the brake force, it is appropriate to increase or decrease the brake fluid pressure in accordance with the intention. In a state where the wheel cylinders are disconnected from all of the fluid pressure sources (hereinafter referred to as a correcting and holding state), it is not possible to increase or decrease the brake fluid pressure in accordance with the driver's intention. According to the present invention, the correcting and holding state can be cancelled immediately after the brake operation is performed intending to increase or decrease the brake force. Thus, the driver's intention can be accurately reflected in the brake fluid pressure.

The fluid pressure control means may comprise pressure correcting and increasing means for increasing and correcting the brake fluid pressure supplied to the wheel cylinder when the deceleration is smaller than the target deceleration by a value which is greater than a third predetermined value and the brake operating speed is greater than or equal to a fourth predetermined value.

In this invention, when the deceleration is smaller than the target deceleration by a value which is greater than the third predetermined value, it can be determined that the current brake fluid pressure is insufficient for obtaining the target deceleration. In addition, when the brake operating speed is greater than the fourth predetermined value, it can be determined that the driver does not intend to decrease the brake force. According to the present invention, when the above-mentioned situation is detected, the brake fluid pressure is increased and corrected. Thus, it is possible to decrease the difference between the deceleration and the target deceleration when the deceleration is insufficient as compared to the target deceleration and the driver does not intend to decrease the brake force.

Additionally, the fluid pressure control means may further comprise pressure correcting and increasing interrupting means for interrupting the correction of the brake fluid pressure by the pressure correcting and increasing means when a brake operation is performed which intends to decrease or increase a brake force.

In this invention, when a brake operation is performed by the driver intending to increase or decrease the brake force, it is appropriate to increase or decrease the brake fluid pressure in accordance with the intention. In a situation where the brake fluid pressure is increased and corrected, it is not possible to increase or decrease the brake fluid pressure in accordance with the driver's intention. According to the present invention, the increase and correction of the brake fluid pressure is interrupted immediately after the above-mentioned brake operation is performed. Thus, the driver's intention can be accurately reflected in the brake fluid pressure.

The brake force control apparatus may comprise a master cylinder which is connected to the wheel cylinder and a pump which is connected to the wheel cylinder, and the brake force control apparatus may supply brake fluid pumped up by the pump from the master cylinder to the wheel cylinder during execution of the brake assist control.

In this invention, during execution of the brake assist control, the brake fluid delivered by the pump is supplied to the wheel cylinder. A discharging capability of the pump changes dependent on the fluid pressure supplied to an inlet thereof, that is, a master cylinder pressure $P_{M/C}$. Therefore, it is not possible to adequately increase the brake fluid pressure by controlling a pressure increasing time or a pressure increasing pattern. According to the present invention, the brake fluid pressure is controlled based on the difference between the deceleration and the target deceleration. Hence, it is possible to adequately increase the brake fluid pressure during execution of the brake assist control regardless of the change in the discharging capability of the pump.

BRIEF DESCRIPTION OF THE DRAWINGS

FIG. 36 is an illustration showing an assist pressure holding state of the brake force control apparatus according to the third embodiment of the present invention which is achieved during execution of the BA control.

DESCRIPTION OF THE PREFERRED EMBODIMENTS

Figure 1:
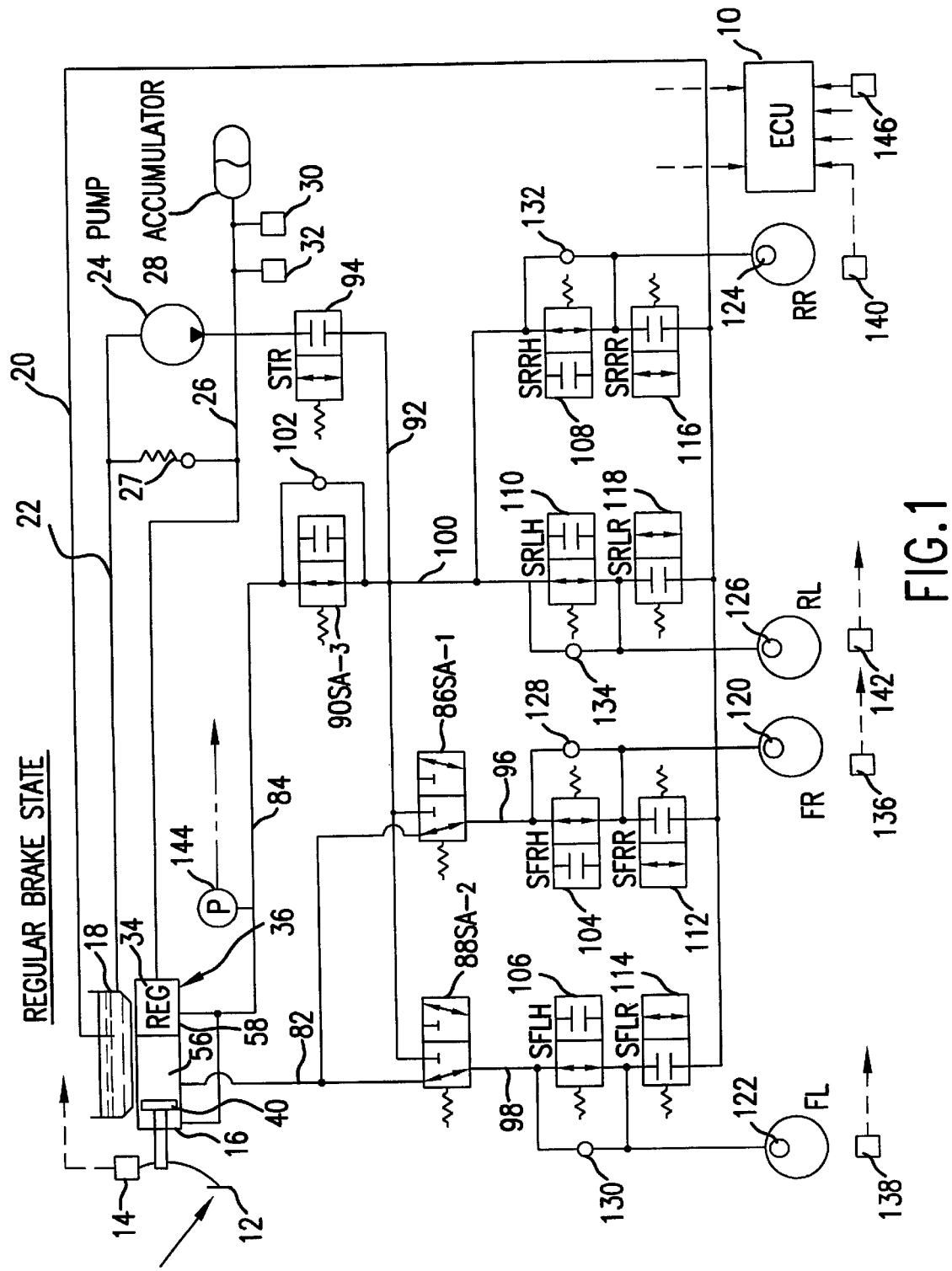
FIG. 1 is a system structure diagram showing a regular brake state of a brake force control apparatus according to a first embodiment of the present invention.

FIG. 1 shows a system structure diagram of a hydro-booster type brake force control apparatus (hereinafter simply referred to as a brake force control apparatus) according to an embodiment of the present invention. The brake force control apparatus according to the present embodiment is controlled by an electronic control unit 10 (hereinafter referred to as ECU 10).

The brake force control apparatus comprises a brake pedal 12. A brake switch 14 is provided near the brake pedal 12. The brake switch 14 outputs an on-signal when the brake pedal 12 is depressed. An output signal of the brake switch 14 is supplied to the ECU 10. The ECU 10 determines whether or not the brake pedal is depressed based on the output signal of the brake switch 14.

The brake pedal 12 is connected to a master cylinder 16. A reservoir tank 18 is provided above the master cylinder 16. The reservoir tank 18 is connected to a return passage 20 for recirculating brake fluid to the reservoir tank 18. A supply passage 22 is also connected to the reservoir tank 18. The supply passage 22 is connected to an inlet of a pump 24. An outlet of the pump 24 is connected to an accumulator passage 26. A low pressure release valve 27 is provided between the accumulator passage 26 and the supply passage 22. The low pressure release valve 27 opens when an excessive pressure is generated in the accumulator passage 26.

An accumulator 28 is connected to the accumulator passage 26 for accumulating a hydraulic pressure discharged by the pump 24. An upper limit pressure switch 30 and a lower limit pressure switch 32 are also connected to the accumulator passage 26. The upper limit pressure switch 30 generates an on-output when a pressure (hereinafter referred to as an accumulator pressure $P_{ACC}$) in the accumulator passage 26 exceeds a predetermined upper limit value. On the other hand, the lower limit pressure switch 32 generates an on-output when the accumulator pressure $P_{ACC}$ exceeds a predetermined lower limit value.

The pump 24 is turned on after the on-output is generated by the lower limit pressure switch 32 and until the on-output is generated by the upper limit pressure switch 30, that is, after the accumulator pressure $P_{ACC}$ becomes below the lower limit value and until the accumulator pressure $P_{ACC}$ reaches the upper limit value. Accordingly, the accumulator pressure $P_{ACC}$ is always maintained at a level between the upper limit value and the lower limit value.

The master cylinder 16 is integrally provided with a regulator 34. The regulator 34 is connected to the accumulator passage 26. Hereinafter, an assembly of the master cylinder and the regulator are referred to as a hydro-booster 36.

A piston 40 is disposed inside the hydro-booster 36. An assist hydraulic chamber 46 is formed on a side of the brake pedal 12 of the first piston 40. Additionally, a first fluid pressure chamber 56 and a second fluid pressure chamber 58 are formed inside the hydro-booster 36. The hydro-booster 36 generates a fluid pressure having a predetermined power ratio with respect to a brake depressing force in the first fluid pressure chamber 56 and the second fluid pressure chamber 58 by using the accumulator pressure $P_{ACC}$ as a fluid pressure source. Hereinafter, the fluid pressure generated in the first fluid pressure chamber 56 and the second fluid pressure chamber 58 is referred to as a master cylinder pressure $P_{M/C}$.

A first fluid pressure passage 82 and the second fluid pressure passage 84 are connected to the first fluid pressure chamber 56 and the second fluid pressure chamber 58 of the hydro-booster 36, respectively. The first fluid pressure passage 82 is connected to a first assist solenoid valve 86 (hereinafter referred to as $SA_{-1}$ 86 and a second assist solenoid valve 88 (hereinafter referred to as $SA_{-2}$ 88). The second fluid pressure passage 84 is connected to third assist solenoid valve 90 (hereinafter referred to as $SA_{-3}$ 90).

A control pressure passage 92 is connected to $SA_{-1}$ 86 and $SA_{-2}$ 88. The control pressure passage is connected to the accumulator passage 26 via a regulator switching solenoid valve 94 (hereinafter referred to as STR 94). STR 94 is a two-position solenoid valve which disconnects the accumulator passage 26 and the control pressure passage 92 from each other by being turned off and connects them to each other by being turned on.

A fluid pressure passage 96 which is provided to a front right wheel FR is connected to $SA_{-1}$ 86. Similarly, a fluid pressure passage 98 which is provided to a front left wheel FL, is connected to $SA_{-2}$ 88. $SA_{-1}$ 86 is a two-position solenoid valve which achieves a first state in which the fluid pressure passage 96 is connected to the first fluid pressure passage 82 by being turned off and a second state in which the fluid pressure passage 96 is connected to the control pressure passage 92 by being turned on. $SA_{-2}$ 88 is a two-position solenoid valve which achieves a first state in which the fluid pressure passage 98 is connected to the first fluid pressure passage 82 by being turned off and a second state in which the fluid pressure passage 98 is connected to the control pressure passage 92 by being turned on.

A fluid pressure passage 100 which is provided to left and rear right wheels RL and RR is connected to $SA_{-3}$ 90. $SA_{-3}$ 90 is a two-position solenoid valve which connects the second fluid pressure passage 84 and the fluid pressure passage to each other by being turned off and disconnects them from each other by being turned on. A check valve 102 is provided between the second fluid pressure passage 84 and the fluid pressure passage 100 so as to permit a flow of the fluid only in a direction from the second fluid pressure passage 84 to the fluid pressure passage 100.

A front right wheel holding solenoid valve 104 (hereinafter referred to as SFRH 104) is connected to the fluid pressure passage 96 corresponding to the front right wheel FR. Similarly, a front left wheel holding solenoid valve 106 (hereinafter referred to as SFLH 106) is connected to the fluid pressure passage 96 corresponding to the front right wheel FR, and a rear right wheel holding solenoid valve 108 (hereinafter referred to as SRRH 108) and a rear left holding solenoid valve 110 (hereinafter referred to as SRLH 110) are connected to the fluid pressure passage 100 which corresponds to the rear left and rear right wheels RL and RR, respectively. Hereinafter, these solenoid valves may be referred to as "holding solenoid valve S**H" as a whole.

A front right wheel pressure decreasing solenoid valve 112 (hereinafter referred to as SFRR 112) is connected to SFRH 104. Similarly, a front left wheel pressure decreasing solenoid valve 114 (hereinafter referred to as SFLR 114), a rear right wheel pressure decreasing solenoid valve 116 (hereinafter referred to as SRRR 116) and a rear left wheel pressure decreasing solenoid valve 118 (hereinafter referred to as SRLR 118) are connected to SFRH 104, SRRH 108 and the SRLH 110, respectively. Hereinafter, these solenoid valves may be referred to as "pressure decreasing solenoid valve S**R" as a whole.

Additionally, a wheel cylinder 120 of the front right wheel FR is connected to SFRH 104. Similarly, a wheel cylinder 122 of the front left wheel FR is connected to SFLH 106, a wheel cylinder 124 of the rear right wheel RR is connected to SRRH 106, and a wheel cylinder 126 of the rear left wheel RL is connected to SRLH 110.

Further, a check valve 128 is provided between the fluid pressure passage 96 and the wheel cylinder 120 so as to permit a flow of the fluid from the wheel cylinder 120 to the fluid pressure passage 96 by bypassing SFRH 104. Similarly, check valves 130, 132 and 134 are provided between the fluid pressure passage 98 and the wheel cylinder 122, between the fluid pressure passage 100 and the wheel cylinder 124 and between the fluid pressure passage 100 and the wheel cylinder 126 so as to permit a flow of the fluid bypassing SFLH 106, SRRH 108 and SRLH 110, respectively.

SFRH 104 is a two-position solenoid valve which connects the fluid pressure passage 96 and the wheel cylinder 120 to each other by being turned off and disconnects them from each other by being turned on. Similarly, SFLH 106, SRRH 108 and SRLH 110 are two-positional solenoid valves which close a path connecting the fluid pressure passage 98 to the wheel cylinder 122, a path connecting the fluid pressure passage 100 to the wheel cylinder 124 and a path connecting the fluid pressure passage 100 to the wheel cylinder 126, respectively.

A return passage 20 is connected to each of SFRR 112, SFLR 114, SRRR 116 and SRLR 118. SFRR 112 is a two-position solenoid valve which disconnects the return passage 20 from the wheel cylinder 120 by being turned off and connects the return passage 20 to the wheel cylinder 120 by being turned on. Similarly, SFLR 114, SRRR 116 and SRLR 118 are two-position solenoid valves which close a path connecting the wheel cylinder 122 to the return passage 20, a path connecting the wheel cylinder 124 to the return passage 20 and a path connecting the wheel cylinder 126 to the return passage 20, respectively. A wheel speed sensor 136 is located near the front right wheel FR. The wheel speed sensor 136 outputs a pulse signal in response to a rotational speed of the front right wheel FR. Similarly, wheel speed sensors 138, 140 and 132 are located near the front left wheel FL, the rear right wheel RR and the rear left wheel RL, respectively, each of which outputs a pulse signal corresponding to a rotational speed of the respective wheel. The output signal of the wheel sensors 136 to 132 are supplied to the ECU 10. The ECU 10 detects the rotational speed VW of each wheel based on the output signals of the wheel speed sensors 136 to 132.

A fluid pressure sensor 144 is provided to the second fluid pressure passage 84 which is connected to the second hydraulic pressure chamber 58 of the hydro-booster 36. The fluid pressure sensor 144 outputs an electric signal pMC corresponding to the fluid pressure generated in the second hydraulic pressure chamber 58, that is, the master cylinder pressure $P_{M/C}$ generated by the hydro-booster 36. The output signal pMC of the fluid pressure sensor 144 is supplied to the ECU 10. The ECU 10 detects the master cylinder pressure $P_{M/C}$ based on the output signal pMC of the fluid pressure sensor 144.

The brake force control apparatus also comprises an deceleration sensor 146. The deceleration sensor 146 delivers an electric signal corresponding to a longitudinal deceleration generated in a vehicle on which the brake force control apparatus is mounted. The output signal of the deceleration sensor 146 is supplied to the ECU 10. The ECU 10 detects the deceleration G generated in the vehicle based on the output signal of the deceleration sensor.

A description will now be given of an operation of the brake force control apparatus according to the present embodiment. The brake force control apparatus according to the present embodiment achieves the following functions by operating various solenoid valves provided in the fluid circuit:

1) a function of a regular brake apparatus;
2) a function of an antilock brake system; and
3) a function for generating a brake force greater than that generated in the normal condition when a rapid increase in the brake force is required (brake assist function).

FIG. 1 shows a state of the brake force control apparatus which achieves the 1) function of a regular brake apparatus (hereinafter referred to as a regular brake function). That is, the 1) regular brake function is achieved by turning off all of the solenoid valves provided in the brake force control apparatus as shown in FIG. 1. Hereinafter, the state shown in FIG. 1 is referred to as a regular brake state. Additionally, a control for achieving the regular brake function in the brake force control apparatus is referred to as a regular brake control.

In FIG. 1, the wheel cylinder 120 and 122 of the front left and front right wheels FL and FR are connected to the first hydraulic pressure chamber 56 of the hydro-booster 36 via the first fluid pressure passage 82. The wheel cylinder 124 and 126 of the rear left and rear right wheels RL and RR are connected to the second hydraulic pressure chamber 58 of the hydro-booster 36 via the second fluid pressure passage 84. In this case, the wheel cylinder pressure $P_{W/C}$ of each of the wheel cylinders 120 to 126 is controlled to be always equal to the master cylinder pressure $P_{M/C}$. Accordingly, in the state shown in FIG. 1, the regular brake function is achieved.

Figure 2:
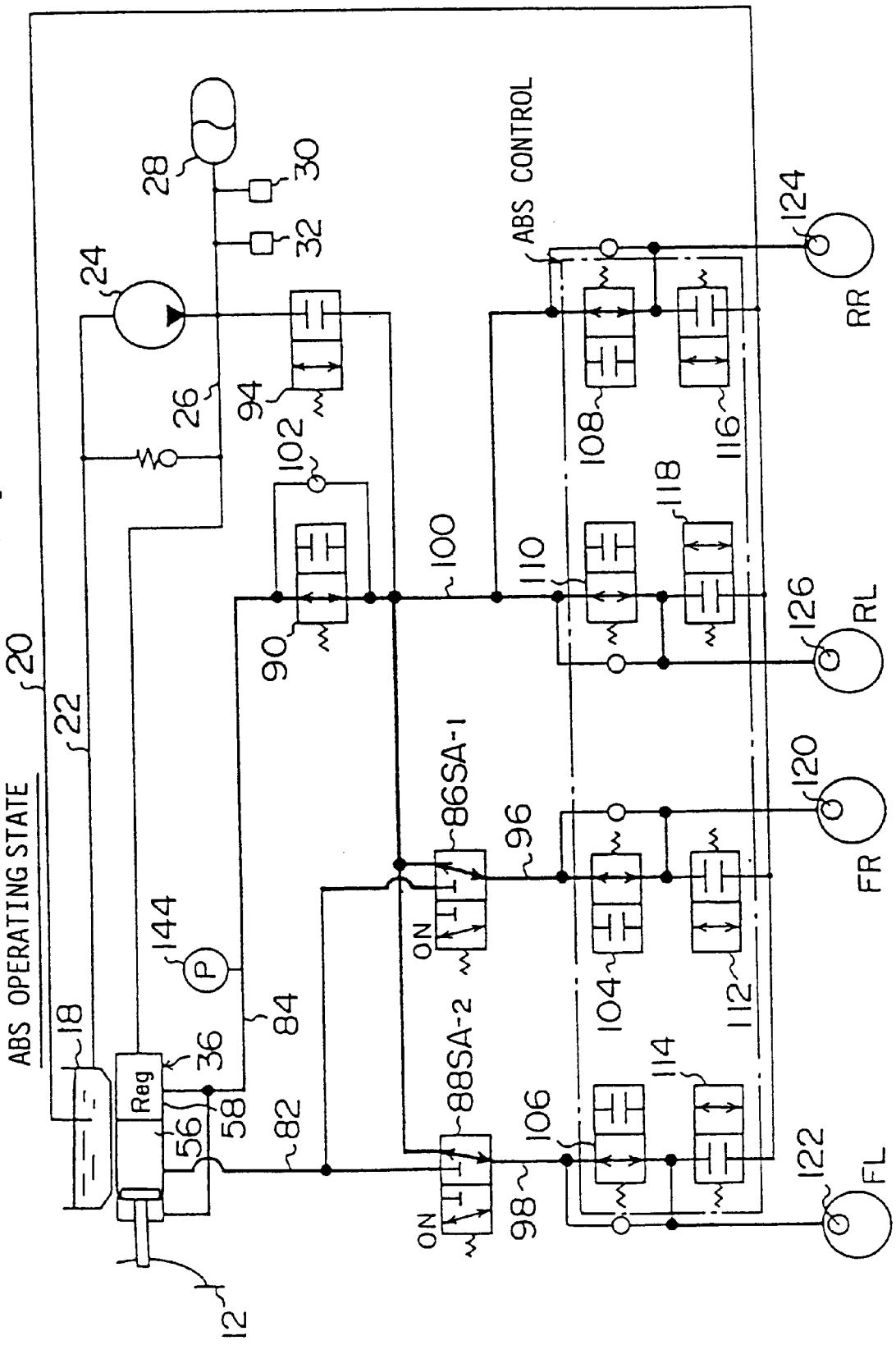
FIG. 2 is an illustration showing an ABS operating state of the brake force control apparatus according to the first embodiment of the present invention.

FIG. 2 shows a state of the brake force control apparatus which achieves the 2) function of an antilock brake system (hereinafter referred to as an ABS function). That is, 2) the ABS function is achieved by turning on $SA_{-1}$ 86 and $SA_{-2}$ 88 and appropriately operating the holding solenoid valves S**\*\*H and the pressure decreasing solenoid valves S\*\*R in response to requirements of the ABS system as shown in FIG. 2. Hereinafter, the state shown in FIG. 2** is referred to as an ABS operating state. Additionally, a control for achieving the ABS function in the brake force control apparatus is referred to as ABS control.

The ECU 10 starts the ABS control when the vehicle is in a braking operation and an excessive slip rate is detected in any one of the wheels. During the ABS control, the fluid pressure passages 96 and 98 provided to the front wheels are connected to the second hydraulic pressure chamber 58 of the hydro-booster 36 similar to the fluid pressure passage 100 provided to the rear wheels. Accordingly, during the ABS control, the wheel cylinder pressure $P_{W/C}$ for all wheels is increased by using the second hydraulic pressure chamber 58 as a fluid pressure source.

The wheel cylinder pressure $P_{W/C}$ for each wheel can be increased by opening the holding solenoid valves S**\*\*H and closing the pressure decreasing solenoid valves S\*\*R while the ABS control is performed. Hereinafter, this state is referred to as i) pressure increasing mode. Additionally, the wheel cylinder pressure $P_{W/C}$ for each wheel can be maintained by closing both the holding solenoid valves S\*\*H and the pressure decreasing solenoid valves S\*\*R while the ABS control is performed. Hereinafter, this state is referred to as (ii) holding mode. Further, the wheel cylinder pressure $P_{W/C}$ for each wheel can be decreased by closing the holding solenoid valves S\*\*H and opening the pressure decreasing solenoid valves S\*\***R while the ABS control is performed. Hereinafter, this state is referred to as iii) pressure decreasing mode.

The ECU 10 controls the holding solenoid valves S**\*\*H and the pressure decreasing solenoid valves S\*\*R so that the above-mentioned i) pressure increasing mode, (ii) holding mode and iii) pressure decreasing mode are achieved, if necessary, in response to a slip state of each wheel while the ABS control is performed. When the holding solenoid valves S\*\*H and the pressure decreasing solenoid valves S\*\***R are controlled as mentioned above, the wheel cylinder pressure $P_{W/C}$ for all of the wheels is controlled to be a pressure which does not generate an excessive slip rate in the respective wheels. Thus, according to the above-mentioned control, the ABS function can be achieved in the brake force control apparatus.

The ECU 10 ends the ABS control and sets the brake force control apparatus in the regular brake state in a case where execution of the ABS control is no longer required for each of the wheels, such as when the vehicle has moved from a high friction road to a low friction road. During execution of the ABS control, the wheel cylinder pressure $P_{W/C}$ of a wheel which is an objective wheel of the ABS control (hereinafter referred to as an ABS objective wheel) is controlled to be lower than the master cylinder pressure $P_{M/C}$. Thus, if the regular brake state is achieved immediately after the condition for ending the ABS control is established, there is a rapid change in the wheel cylinder pressure $P_{W/C}$ of the ABS objective wheel.

In order to avoid such a rapid change in the wheel cylinder pressure $P_{W/C}$, when the condition for ending the ABS control is established, the ECU 10 sets the brake force control apparatus in the regular brake state after operating the holding solenoid valves S**\*\*H and the pressure decreasing solenoid valves S\*\***R so that the (i) pressure increasing mode and the (ii) the holding mode are alternately achieved for the ABS objective wheel for a predetermined time.

Hereinafter, the above-mentioned control which is performed after the condition for ending the ABS control is established is referred to an ABS ending control. According to the ABS ending control, the wheel cylinder pressure $P_{W/C}$ of the ABS objective wheel can be moderately increased toward the master cylinder pressure $P_{M/C}$. Thus, according to the brake force control apparatus of the present embodiment, it is possible to end the ABS control without generating a rapid change in the wheel cylinder pressure $P_{W/C}$ of the ABS objective wheel.

While the ABS control is performed, the brake fluid in the wheel cylinders 120 to 126 is discharged to the return passage 20 each time the pressure decreasing mode is set for each wheel. Then, the brake fluid is provided to wheel cylinders 120 to 126 each time the pressure increasing mode is set for each wheel. Thus, while the ABS control is performed, a large amount of brake fluid flows from the hydro-booster 36 as compared to the regular brake operation.

The first hydraulic pressure chamber 56 of the hydro-booster 36 is not connected to a fluid pressure source such as the accumulator 28. Thus, when the first hydraulic pressure chamber 56 is used while the ABS control is performed, the brake fluid in the first hydraulic pressure chamber 56 flows out, resulting in an excessive travel of the brake pedal 12. However, in the system according to the present embodiment, the second hydraulic pressure chamber 58 which is connected to the accumulator 28 via the spool portion 54 is used as a fluid pressure source. Thus, according to the system of the present invention, an excessive travel of the brake pedal 12 is not generated.

Figure 3:
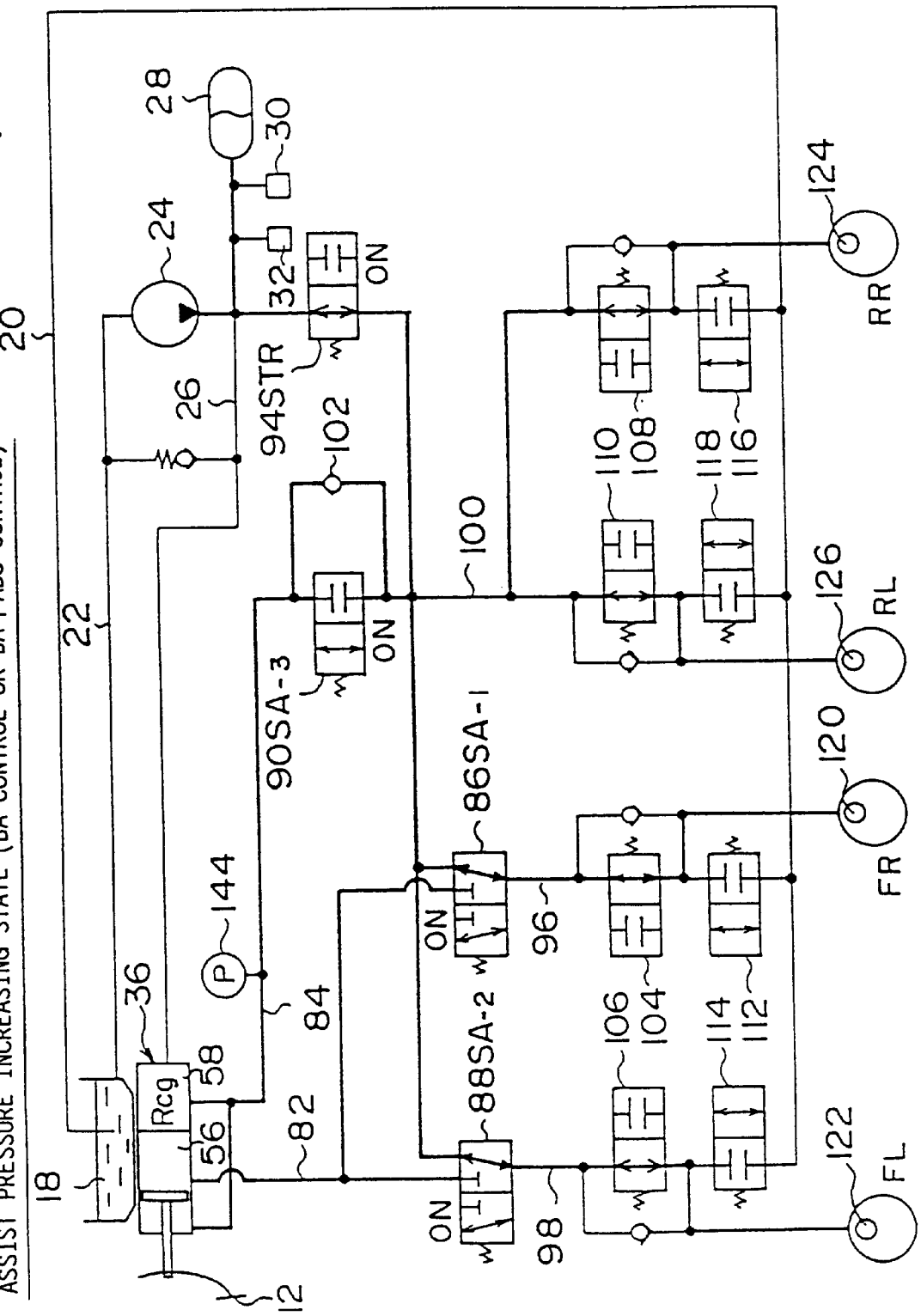
FIG. 3 is an illustration showing an assist pressure increasing state of the brake force control apparatus according to the first embodiment of the present invention which is achieved during execution of BA control or BA+ABS control.
Figure 4:
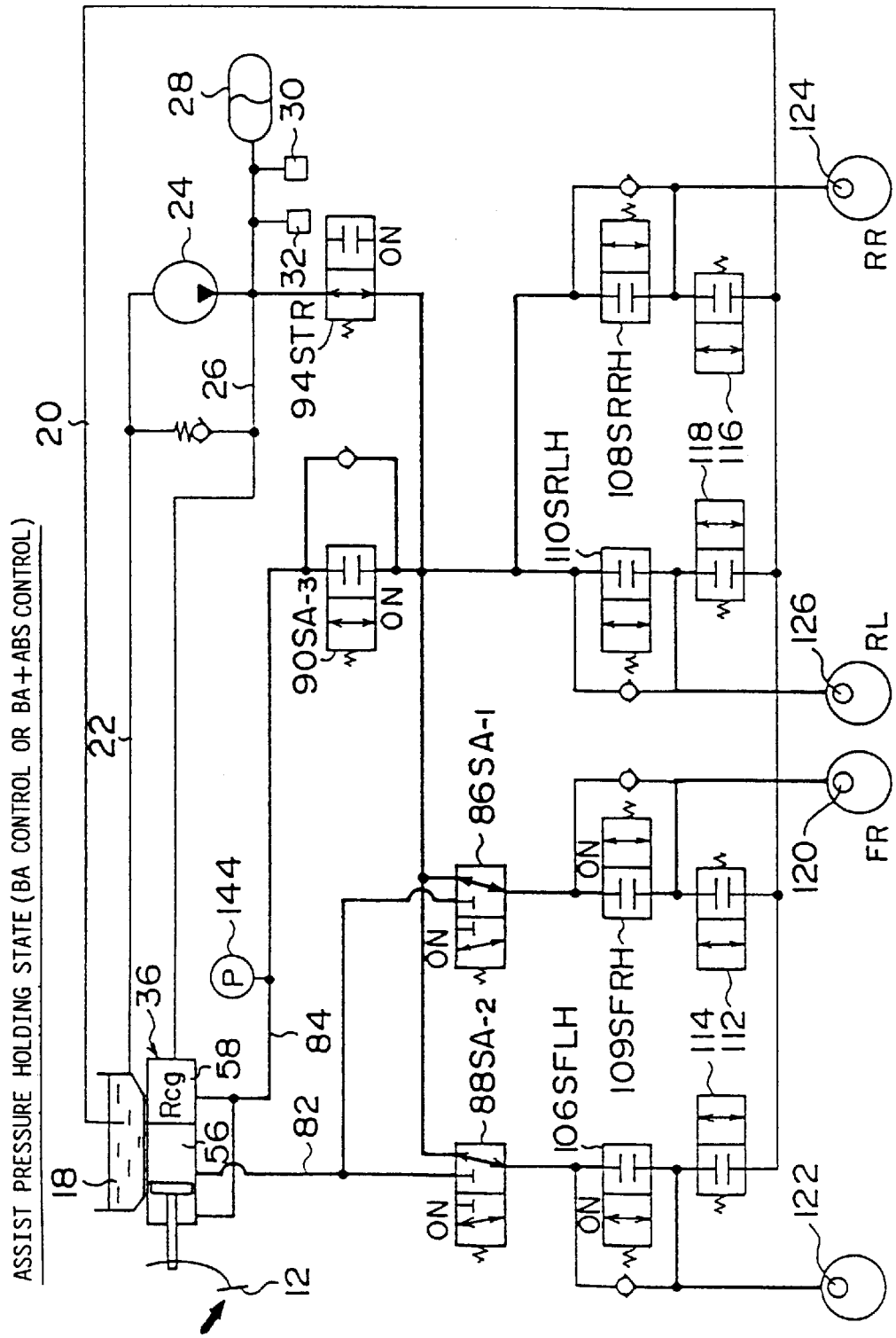
FIG. 4 is an illustration showing an assist pressure holding state of the brake force control apparatus according to the first embodiment of the present invention which is achieved during execution of the BA control or the BA+ABS control.

FIGS. 3 to 4 show a state of the brake force control apparatus for achieving the 3) brake assist function (hereinafter referred to as a BA function). The ECU 10 achieves the BA function by a brake operation which requires a rapid increase in a brake force, that is, by achieving the state shown in FIGS. 3 to 5 after an emergency brake operation has been performed. Hereinafter, a control for achieving the BA function in the brake force control apparatus is referred to as BA control.

FIG. 3 shows an assist pressure increasing state which is performed during execution of the BA control. The assist pressure increasing state is set when the wheel cylinder pressure $P_{W/C}$ of each wheel is needed to be increased during execution of the BA control. In the system according to the present embodiment, the assist pressure increasing state is achieved by turning on $SA_{-1}$ 86, $SA_{-2}$ 88, $SA_{-3}$ 90 and STR 94 as shown in FIG. 3.

In the assist pressure increasing state, all of the wheel cylinders 120 to 126 are connected to the accumulator passage 26. Accordingly, when the assist pressure increasing state is set, the wheel cylinder pressure $P_{W/C}$ of each of the wheels can be increased by using the accumulator as a fluid pressure source. The accumulator stores the accumulator pressure $P_{AAC}$ which is a high-pressure. Thus, in the assist pressure increasing state, the wheel cylinder pressure $P_{W/C}$ of each of the wheels can be increased to a pressure greater than the master cylinder pressure $P_{M/C}$.

In the assist pressure increasing state shown in FIG. 3, the fluid pressure passage 96, 98 and 100 are connected to the accumulator passage 26 as mentioned above, and are connected to the second fluid pressure passage 84 via the check valve 102. Accordingly, when the master cylinder pressure $P_{M/C}$ introduced into the second fluid pressure passage 84 is greater than the wheel cylinder pressure $P_{W/C}$ of each of the wheels, the wheel cylinder pressure $P_{W/C}$ can be increased by using the hydro-booster 36 as a fluid pressure source even in the assist pressure increasing state.

FIG. 4 shows an assist pressure holding state which is achieved during execution of the BA control. The assist pressure holding state is set when the wheel cylinder pressure $P_{W/C}$ of each of the wheels is needed to be maintained during execution of the BA control. The assist pressure holding state can be achieved by turning on $SA_{-1}$ 86, $SA_{-2}$ 88, $SA_{-3}$ 90 and STR 94 and turning on (opening) all holding solenoid valves S**H as shown in FIG. 4.

In the assist pressure holding state, all wheel cylinders 120 to 126 are disconnected from the hydro-booster 36 and are also disconnected from the return passage 20, and a flow of fluid from the accumulator 28 to each of the wheel cylinders 120 to 126 is prevented. Accordingly, when the assist pressure holding state is set, the wheel cylinder pressure $P_{W/C}$ of each of the wheels can be maintained at a constant pressure.

Figure 5:
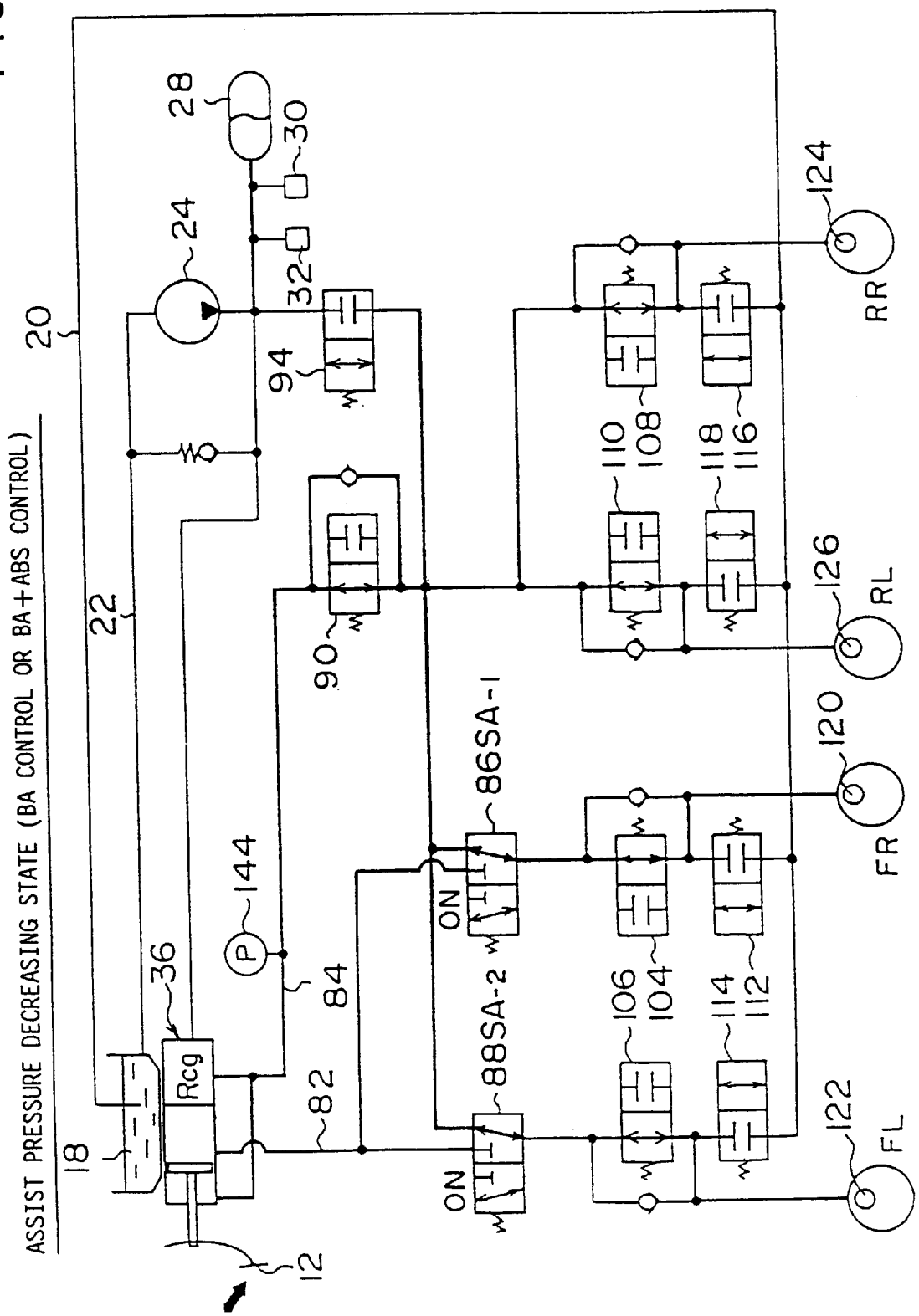
FIG. 5 is an illustration showing an assist pressure decreasing state of the brake force control apparatus according to the first embodiment of the present invention which is achieved during execution of the BA control or the BA+ABS control.

FIG. 5 shows an assist pressure decreasing state which is achieved during execution of the BA control. The assist pressure decreasing state is set when the wheel cylinder pressure $P_{W/C}$ of each of the wheels is needed to be decreased during execution of the BA control. The assist pressure decreasing state can be achieved by turning on $SA_{-1}$ 86 and $SA_{-2}$ 88 as shown in FIG. 5.

In the assist pressure decreasing state, all wheel cylinders 120 to 126 are disconnected from the accumulator 28 and are also disconnected from the return passage 20, and the hydro-booster 36 are connected to each of the wheel cylinders 120 to 126. Accordingly, when the assist pressure decreasing state is set, the wheel cylinder pressure $P_{W/C}$ of each of the wheels can be decreased down to the master cylinder pressure $P_{M/C}$ as a lower limit.

Figure 6:
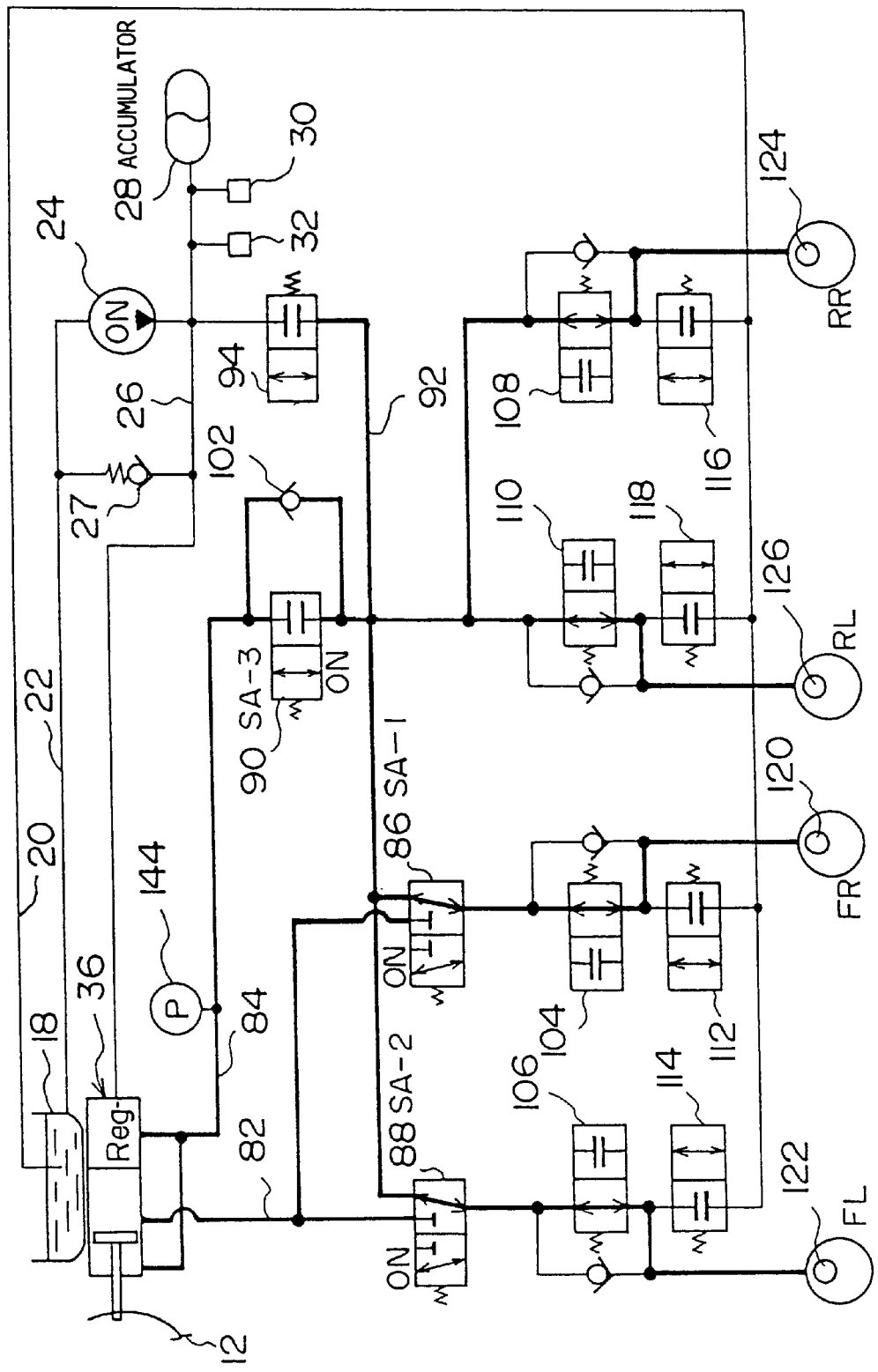
FIG. 6 is an illustration showing an assist pressure correcting and holding state of the brake force control apparatus according to the first embodiment of the present invention which is achieved during execution of the BA control or the BA+ABS control.

FIG. 6 shows an assist pressure correcting and holding state which is achieved during execution of the BA control. The assist pressure correcting and holding state is set when the wheel cylinder pressure $P_{W/C}$ of all of the wheels is needed to be prevented from being increased during execution of the BA control. The assist pressure correcting and holding state can be achieved by turning on $SA_{-1}$ 86, $SA_{-2}$ 88, and $SA_{-3}$ 90 as shown in FIG. 6.

In the assist pressure correcting and holding state, all of the holding solenoid valves S**H are disconnected from both the hydro-booster 36 and the accumulator 28. Accordingly, when the assist pressure correcting and holding state is set, the wheel cylinder pressure $P_{W/C}$ of all of the wheels can be positively prevented from being increased.

Figure 7:
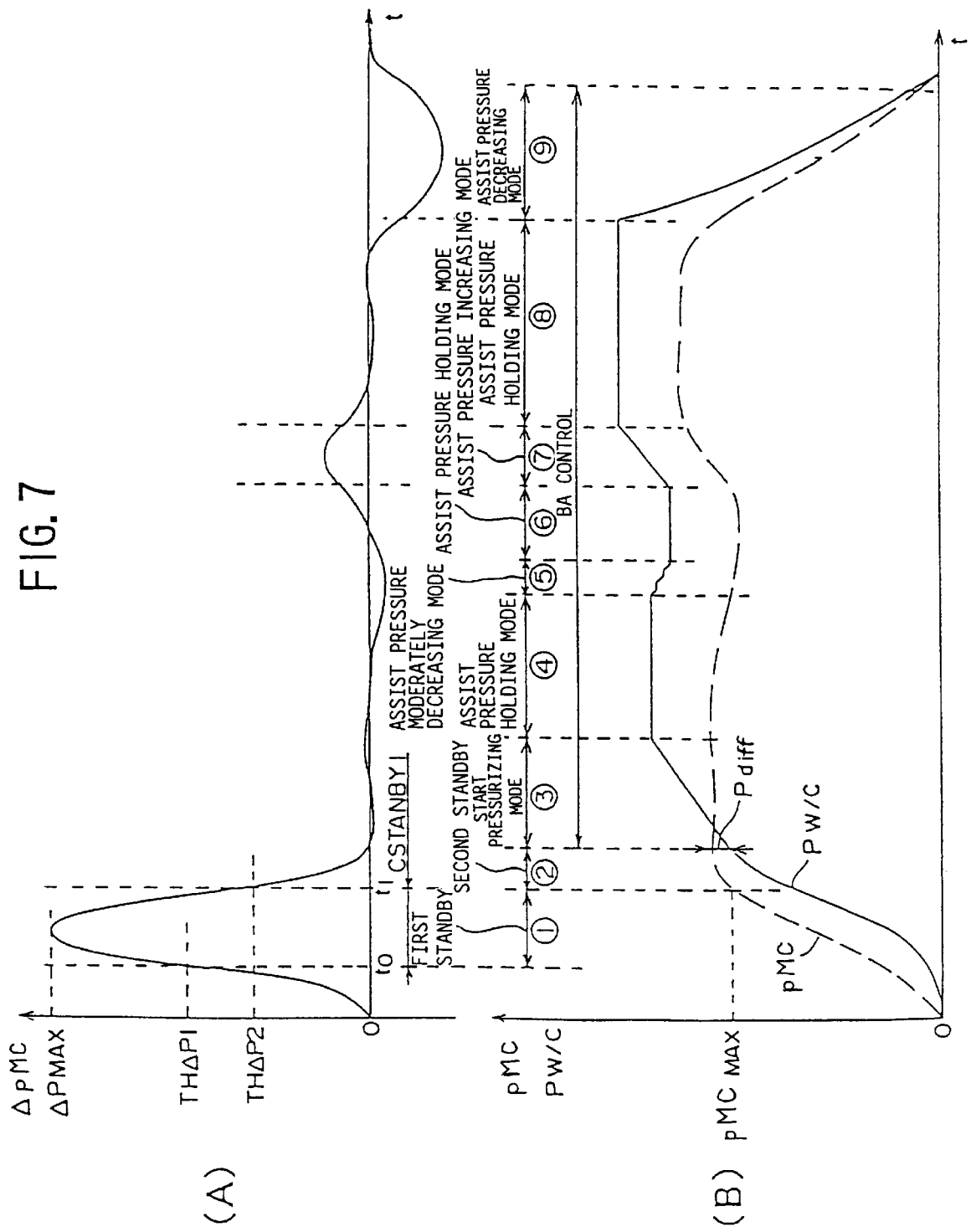
FIG. 7(A) is a diagram showing changes generated in a change rate $\Delta pMC$ of an output signal pMC of a fluid pressure sensor when an emergency brake operation is performed in the brake force control apparatus of the present invention.
FIG. 7(B) is a diagram showing changes generated in the output signal pMC and wheel cylinder pressure $P_{W/C}$ when an emergency brake operation is performed in the brake force control apparatus of the present invention.

FIG. 7 shows an example of a time chart which is achieved when an emergency brake operation is performed by a driver in the brake force control apparatus according to the present embodiment. A curve shown in FIG. 7-(A) indicates an example of a change generated in an amount of change ΔpMC of the output signal pMC per unit time (hereinafter referred to as a change rate ΔpMC) when an emergency brake operation is performed. A curve indicated by a dashed line and a curve indicated by a solid line show examples of changes in the output signal pMC and the wheel cylinder pressure $P_{W/C}$, respectively. In the system according to the present embodiment, the output signal pMC and the change rate ΔpMC are characteristic values of an amount of operation of the brake pedal 12 and an operation speed of the brake pedal 12, respectively.

When an emergency brake operation is performed by the driver, the master cylinder pressure $P_{M/C}$ is immediately increased, as shown by a dashed line in FIG. 7-(B), to an appropriate pressure after the brake operation is started. At this time, as shown in FIG. 7-(A), the change rate ΔpMC of the output signal pMC increases toward the maximum value $ΔP_{MAX}$ in synchronization with the rapid increase in the output signal pMC after the start of the brake operation. Additionally, the change rate ΔpMC of the output signal pMC decreases to a value near zero "0" in synchronization with convergence of the master cylinder pressure $P_{M/C}$ to an appropriate value.

As mentioned-above, the ECU 10 first detects an operation of the brake pedal 12 at a speed exceeding a predetermined speed, specifically, detects the change rate ΔpMC exceeding a first predetermined value THΔP1 when the ECU 10 determines whether or not the emergency brake operation is being performed by the driver. When the ECU 10 detects a value of the change rate ΔpMC which satisfies a relationship ΔpMC>THΔP1, the ECU determines that it is possible that an emergency brake operation is being performed, and shifts to a first standby state (FIG. 7-(B), period ①).

After the ECU 10 is shifted to the first standby state, the ECU 10 counts a time (t2–t1)=CSTANBY1 which is a period for the change rate ΔpMC of the output signal pMC being decreased to a speed less than a second predetermined speed THΔP2. If the elapsed time CSTANBY1 is within a predetermined range, the ECU then determines that an emergency brake operation is being performed by the driver, and shifts to a second standby state (FIG. 7-(B), period ②).

When the master cylinder pressure PM/C is being rapidly increased in association with the emergency brake operation, a relatively large difference Pdiff is generated between the master cylinder pressure $P_{M/C}$ and the wheel cylinder pressure $P_{W/C}$. In such a situation, the wheel cylinder pressure $P_{W/C}$ can be rapidly increased by using the hydro-booster 36 as a fluid pressure source rather than by using the accumulator 28 as a fluid pressure source.

After having shifted to the above-mentioned second standby state, the ECU 10 starts the BA control at a time when the difference Pdiff has become a sufficiently small value, that is, when a transition occurs from a condition in which the wheel cylinder pressure $P_{W/C}$ can be advantageously increased by using hydro-booster 36 as a fluid pressure source to a condition in which the wheel cylinder pressure $P_{W/C}$ can be advantageously increased by using the accumulator 28 as a fluid pressure source. Thus, according to the brake force control apparatus, the wheel cylinder pressure $P_{W/C}$ can be effectively and rapidly increased after start of the emergency brake operation.

In the brake force control apparatus according to the present embodiment, when the BA control is started, first (I) start pressurizing mode is performed (FIG. 7-(B), period ③). The (I) start pressurizing mode can be achieved by maintaining the assist pressure increasing state shown in FIG. 3 during a predetermined pressure increasing time TSTA. As mentioned above, in the assist pressure increasing state, the wheel cylinder pressure $P_{W/C}$ of each of the wheels is increased to a pressure exceeding the master cylinder pressure $P_{M/C}$ by using the accumulator as a fluid pressure source. Accordingly, when the BA control is started, the wheel cylinder pressure $P_{W/C}$ of each of the wheels is rapidly increased to a pressure exceeding the master cylinder pressure $P_{M/C}$ as the (I) start pressurizing mode is performed. Hereinafter, a pressure difference between the wheel cylinder pressure $P_{W/C}$ and the master cylinder pressure $P_{M/C}$ is referred to as an assist pressure Pa.

In the present embodiment, the pressure increasing time $T_{STA}$ is calculated based on the maximum value $\Delta P_{MAX}$ of the change rate ΔpMC generated in a process of an emergency brake operation. Specifically, the pressure increasing time $T_{STA}$ is set to be a longer time as the maximum value $\Delta P_{MAX}$ is increased and is set to be a shorter time as the maximum value $\Delta P_{MAX}$ is decreased.

The maximum value $\Delta P_{MAX}$ of the change rate ΔpMC is increased as the driver intends to more rapidly increase the brake force. Accordingly, when the maximum value $\Delta P_{MAX}$ is a large value, it is appropriate to increase the wheel cylinder pressure $P_{W/C}$ to a pressure greater than the master cylinder pressure $P_{M/C}$ after the BA control is started.

If the pressure increasing time $T_{STA}$ is set as mentioned above based on the maximum value $\Delta P_{MAX}$ after an emergency brake operation is detected, the wheel cylinder pressure $P_{W/C}$ can be more rapidly increased than the master cylinder pressure $P_{M/C}$, that is, a large assist pressure Pa can be generated as the driver intends to more rapidly increase the brake force.

In the brake force control apparatus according to the present embodiment, after the (I) start pressurizing mode is completed, one of the (II) assist pressure increasing mode, the (III) assist pressure decreasing mode, the (IV) assist pressure holding mode, the (V) assist pressure moderately increasing mode and the (VI) assist pressure moderately decreasing mode is set in response to the brake operation by the driver.

When the master cylinder pressure $P_{M/C}$ is rapidly increased during execution of the BA control, it can be determined that the driver is requesting a larger brake force. In the brake force control apparatus according to the present embodiment, in this case, the (II) assist pressure increasing mode is set (FIG. 7-(B), period ⑦). The (II) assist pressure increasing mode can be achieved, similar to the (I) start pressurizing mode, by setting the brake force control apparatus in the assist pressure increasing state. In the assist pressure increasing state, the wheel cylinder pressure $P_{W/C}$ of each of the wheels can be rapidly increased to the accumulator pressure $P_{ACC}$. Thus, according to the above-mentioned process, the intention of the driver can be accurately reflected to the wheel cylinder pressure $P_{W/C}$.

When the master cylinder pressure $P_{M/C}$ is rapidly decreased during execution of the BA control, it can be determined that the driver is requesting a rapid decrease in the brake force. In the present embodiment, in this case, the (III) assist pressure decreasing mode is set (FIG. 7-(B), period ⑨). The (III) assist pressure decreasing mode can be achieved by setting the brake force control apparatus in the assist pressure decreasing state. In the assist pressure decreasing state, the wheel cylinder pressure $P_{W/C}$ of each of the wheels can be rapidly decreased to the master cylinder pressure $P_{M/C}$. Thus, according to the above-mentioned process, the intention of the driver can be accurately reflected to the wheel cylinder pressure $P_{W/C}$.

When the master cylinder pressure $P_{W/C}$ is maintained at a substantially constant value during execution of the BA control, it can be determined that the driver intends to maintain the brake force. In the present embodiment, in this case, the (IV) assist pressure holding mode is set (FIG. 7-(B), periods ④ and ⑧). The (IV) assist pressure holding mode can be achieved by maintaining the assist pressure holding state shown in FIG. 4. In the assist pressure holding state, the wheel cylinder pressure $P_{W/C}$ of each of the wheels can be maintained at a constant value. Thus, according to the above-mentioned process, the intention of the driver can be accurately reflected to the wheel cylinder pressure $P_{W/C}$.

When the master cylinder pressure $P_{M/C}$ is moderately increased during execution of the BA control, it can be determined that the driver is requesting a moderate increase in the brake force. In the present embodiment, in this case, the (V) assist pressure moderately increasing mode is set (not shown in the figure). The (V) assist pressure moderately increasing mode can be achieved by alternatively setting the assist pressure increasing state shown in FIG. 3 and the assist pressure holding state shown in FIG. 4. In the assist pressure moderately increasing state, the wheel cylinder pressure $P_{W/C}$ of each of the wheels can be increased stepwise toward the accumulator pressure $P_{ACC}$. Thus, according to the above-mentioned process, the intention of the driver can be accurately reflected to the wheel cylinder pressure $P_{W/C}$.

When the master cylinder pressure $P_{M/C}$ is moderately decreased during execution of the BA control, it can be determined that the driver is requesting a moderate increase in the brake force. In the present embodiment, in this case, the (VI) assist pressure moderately decreasing mode is set (FIG. 7-(B), period (5)). The (VI) assist pressure moderately decreasing mode can be achieved by alternatively setting the assist pressure decreasing state shown in FIG. 5 and the assist pressure holding state shown in FIG. 4. In the assist pressure moderately decreasing state, the wheel cylinder pressure $P_{W/C}$ of each of the wheels can be decreased stepwise toward the accumulator pressure $P_{ACC}$. Thus, according to the above-mentioned process, the intention of the driver can be accurately reflected to the wheel cylinder pressure $P_{W/C}$.

According to the above-mentioned process, the assist pressure Pa to which the intention of the driver is accurately reflected can be generated immediately after an emergency brake operation is started by the driver. In addition, according to the above-mentioned process, when a brake operation is performed by the driver after the assist pressure Pa is generated by the (I) start pressurizing mode, the wheel cylinder pressure $P_{W/C}$ can be increased or decreased in response to the brake operation. Thus, according to the brake force control apparatus of the present embodiment, it is possible to adequately reflect the driver's intention to the wheel cylinder pressure $P_{W/C}$ while maintaining the assist pressure Pa to be substantially constant during execution of the BA control.

As described above, when an brake operation which intends to decrease the brake fluid pressure, that is, when a pressure decreasing operation is performed during execution of the BA control, the brake force control apparatus discharges the wheel cylinder pressure $P_{W/C}$ of each of the wheels to the hydro-booster 36 by achieving the assist pressure decreasing state shown in FIG. 5. The hydro-booster 36 cannot instantly absorb a large amount of brake fluid. For this reason, when the brake force control apparatus is set in the assist pressure decreasing state, the detected value of the fluid pressure sensor 144 may be temporarily increased.

Figure 8:
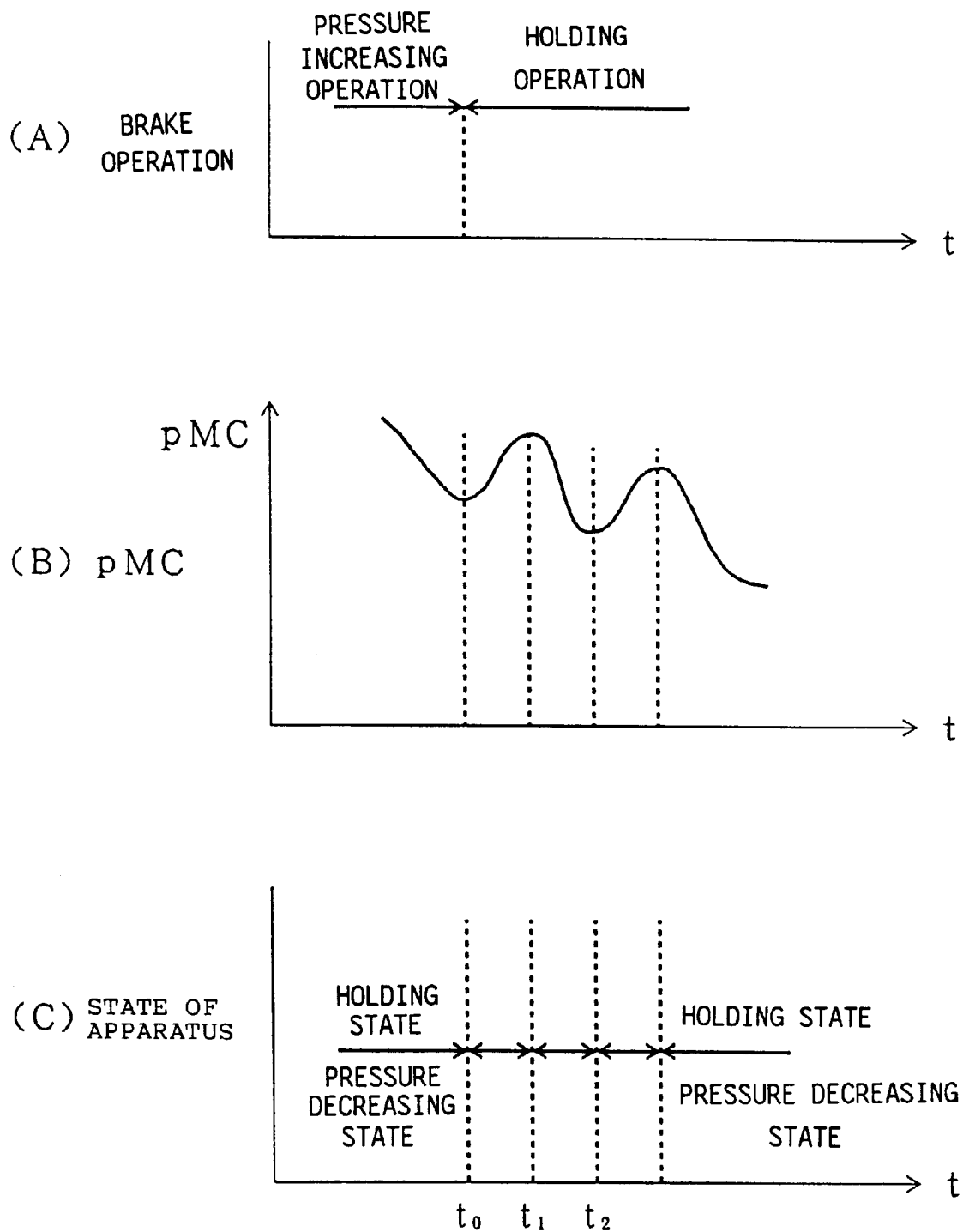
FIG. 8(A) is a time chart showing a change of a brake operation.
FIG. 8(B) is a time chart showing changes of the output signal pMC of the fluid pressure sensor.
FIG. 8(C) is a time chart showing changes of a state achieved in the brake force control apparatus of the present invention.

FIG. 8 is an example of a time chart which results from an operation which intends to maintain the brake fluid pressure, performed after the pressure decreasing operation is performed by the driver. Specifically, FIGS. 8-(A) to 8-(C) show a change in a brake operation by the driver, changes generated in the output signal pMC, and changes of the state of the brake force control apparatus, respectively.

The time charts shown in FIG. 8 result when a holding operation is performed after the pressure decreasing operation is performed by the driver for a very short time in a situation in which the brake force control apparatus is maintained in the assist pressure holding state shown in FIG. 4. If the pressure decreasing operation is performed by the driver when the brake force control apparatus is set in the assist pressure holding state, a fluid pressure in the second fluid pressure passage 84, that is, the master cylinder pressure $P_{M/C}$ decreases and thus the output signal pMC tends to decrease.

As described above, the brake force control apparatus changes its state to the assist pressure decreasing state (FIG. 5) when a rapid decrease is generated in the output signal pMC (at time $t_0$ in FIG. 8). When the brake force control apparatus is set in the assist pressure decreasing state, the wheel cylinders 120 to 126 of each of the wheels are connected to the second fluid pressure passage 84 and the brake fluid which has entered the wheel cylinders 120 to 126 flows out to the second fluid pressure passage 84. As a result, the output signal pMC of the fluid pressure sensor 144 exhibits an increasing trend after the assist pressure decreasing state is achieved (after the time $t_0$).

When the output signal pMC exhibits an increasing trend as described above, the brake force control apparatus determines that the pressure decreasing operation by the driver is finished, and changes its state to the assist pressure holding state from the assist pressure decreasing state (at time $t_1$ shown in FIG. 8). When the state of the brake force control apparatus is changed to the assist pressure holding state as described above, the output signal pMC exhibits a rapidly increasing trend because a flow of the brake fluid from the wheel cylinders of each of the wheels to the second fluid pressure passage 84 is prevented.

When the output signal pMC rapidly decreases as described above, the brake force control apparatus changes its state again to the assist pressure decreasing state (time $t_2$ in FIG. 8-(C) even if the amount of brake operation is maintained (see FIG. 8-(A)). Thus, according to the brake force control apparatus, the wheel cylinder pressure $P_{W/C}$ of each of the wheels may be excessively decreased when the amount of brake operation is maintained.

If the wheel cylinder pressure $P_{W/C}$ of each of the wheels is excessively decreased during execution of the BA control as described above, an adequate deceleration of the vehicle may not be obtained. The brake force control apparatus of the present embodiment determined that the wheel cylinder pressure $P_{W/C}$ of each of the wheels is excessively decreased when the deceleration generated in the vehicle during execution of the BA control is extremely small as compared to a target deceleration which is to be generated, and performs an (VII) assist pressure correcting and increasing mode.

The (VII) assist pressure correcting and increasing mode is achieved by alternately setting the assist pressure increasing state shown in FIG. 3 and the assist pressure holding state shown in FIG. 4 in a situation in which the (IV) assist pressure holding mode is requested. According to the (VII) assist pressure correcting and increasing mode, it is possible to attempt to increase the wheel cylinder pressure $P_{W/C}$ of each of the wheels. Thus, according to the brake force control apparatus of the present embodiment, the driver's intention can be accurately reflected in the wheel cylinder pressure $P_{W/C}$ by correcting the excessive decrease in the wheel cylinder pressure $P_{W/C}$ caused by the fluctuation in the master cylinder pressure $P_{W/C}$.

When the wheel cylinder pressure $P_{W/C}$ of each of the wheels is rapidly increased after the BA control is started in the brake force control apparatus, an excessive slip rate may be generated in any one of the wheels. In such a case, the ECU 10 performs the ABS control in addition to the BA control. Hereinafter this control is referred to as BA+ABS control.

The BA+ABS control is achieved by controlling the holding solenoid valves SH and the pressure decreasing solenoid valves SR so that the above-mentioned (i) pressure increasing mode, (ii) holding mode, or (iii) pressure decreasing mode is appropriately set for the ABS objective wheel while one of the states shown in FIGS. 3 to 6 is set.

That is, when the assist pressure increasing state shown in FIG. 3 or the assist pressure holding state'shown in FIG. 4 is set, the accumulator pressure PACC is provided to each of the holding solenoid valves SH. In this condition, the (i) pressure increasing mode, the (ii) holding mode and the (iii) pressure decreasing mode can be achieved for each of the wheels by appropriately controlling the holding solenoid valves SH and the pressure decreasing solenoid valves SR. Accordingly, when one of the states shown in FIGS. 3 and 4 is set, requirements of the BA+ABS control can be satisfied by controlling the holding solenoid valves SH and the pressure decreasing solenoid valves S**R for the ABS objective wheel in response to requirements by the ABS control.

Additionally, when the assist pressure decreasing state shown in FIG. 5 is set, the master cylinder pressure $P_{M/C}$ is provided to all of the holding solenoid valves SH. In addition, when the assist pressure correcting and holding state shown in FIG. 5 is set, all of the holding solenoid valves SH are disconnected from the hydro booster 36 and the accumulator 28.

In these states, the (ii) holding mode and the (iii) pressure decreasing mode can be set for each of the wheels. The assist pressure decreasing state shown in FIG. 5 is set when the driver intends to decrease the brake force, that is, when the wheel cylinder $P_{W/C}$ of none of the wheels is needed to be increased. On the other hand, the assist pressure correcting and holding state shown in FIG. 6 is set when the wheel cylinder pressure $P_{W/C}$ of all of the wheels is to be prevented from being increased. Accordingly, when these states are set, requirements by the BA+ABS control can be appropriately satisfied if the (ii) holding mode and the (iii) pressure decreasing mode can be set for the ABS objective wheel.

As described above, according to the brake force control apparatus of the present embodiment, requirements by the BA+ABS control can be appropriately satisfied when any of the states shown FIGS. 3 to 6 is required by the BA control. Thus, according to the brake force control apparatus of the present embodiment, the wheel cylinder pressure $P_{W/C}$ of all of the wheels can be controlled to be a fluid pressure which does not cause an excessive slip rate during execution of the BA+ABS control.

When, for example, the vehicle moves from a low friction road to a high friction road after the BA+ABS control is started, it may no longer be necessary to perform the ABS control for any of the wheels. In this case, the ECU 10 ends the ABS control and performs the BA control independently.

During execution of the BA+ABS control, the wheel cylinder pressure $P_{W/C}$ of the ABS objective wheel is controlled to be lower than the wheel cylinder pressure $P_{W/C}$ of the wheels which are not the ABS objective wheels. Accordingly, when the holding solenoid valve S**H for the ABS objective wheel is opened immediately after a condition for ending the ABS control, a rapid increase is generated in the wheel cylinder pressure $P_{W/C}$ of the ABS objective wheel.

The above-mentioned increase generated in the wheel cylinder pressure $P_{W/C}$ of the ABS objective wheel can be avoided by, for example, performing the above-mentioned ABS ending control (the control to alternately achieve the (i) pressure increasing mode and the (ii) pressure decreasing mode for the ABS objective wheel). However, the brake force control apparatus may be set in the assist pressure holding state shown in FIG. 4 when the BA+ABS control is ended. If the above-mentioned ABS ending control is performed when the brake force control apparatus is set in the assist pressure holding state, a phenomenon occurs in which the wheel cylinder for the ABS objective wheel is intermittently connected to the accumulator 28. In this case, the wheel cylinder pressure $P_{W/C}$ of the ABS objective wheel may be increased to a level exceeding the wheel cylinder pressure $P_{W/C}$ of the other wheels up to the accumulator pressure $P_{ACC}$.

If the wheel cylinder pressure $P_{W/C}$ of the ABS objective wheel is excessively increased when the BA+ABS control is ended as described above, a deceleration of the vehicle is generated which is excessively larger than a target deceleration which is to be generated. When such an excessive deceleration is generated, the ECU 10 determines that the wheel cylinder pressure $P_{W/C}$ of the wheels is excessively increased, and performs the (iii) assist pressure correcting and holding mode.

The (iii) assist pressure correcting and holding mode is achieved by setting the brake force control apparatus in the assist pressure correcting and holding state shown in FIG. 6 when the IV) assist pressure holding mode is requested. The wheel cylinder pressure $P_{W/C}$ for all of the wheels can be inhibited from being increased in the assist pressure correcting and holding state, as described above. Thus, according to the brake force control apparatus of the present embodiment, it is possible to avoid the excessive increase in the wheel cylinder pressure $P_{W/C}$ of the ABS objective wheel even if the ABS ending control is performed when the BA+ABS control is ended.

A description will now be given, with reference to FIGS. 9 to 27, of a process performed by the ECU 10 so as to achieve the above-mentioned BA control.

Figure 9:
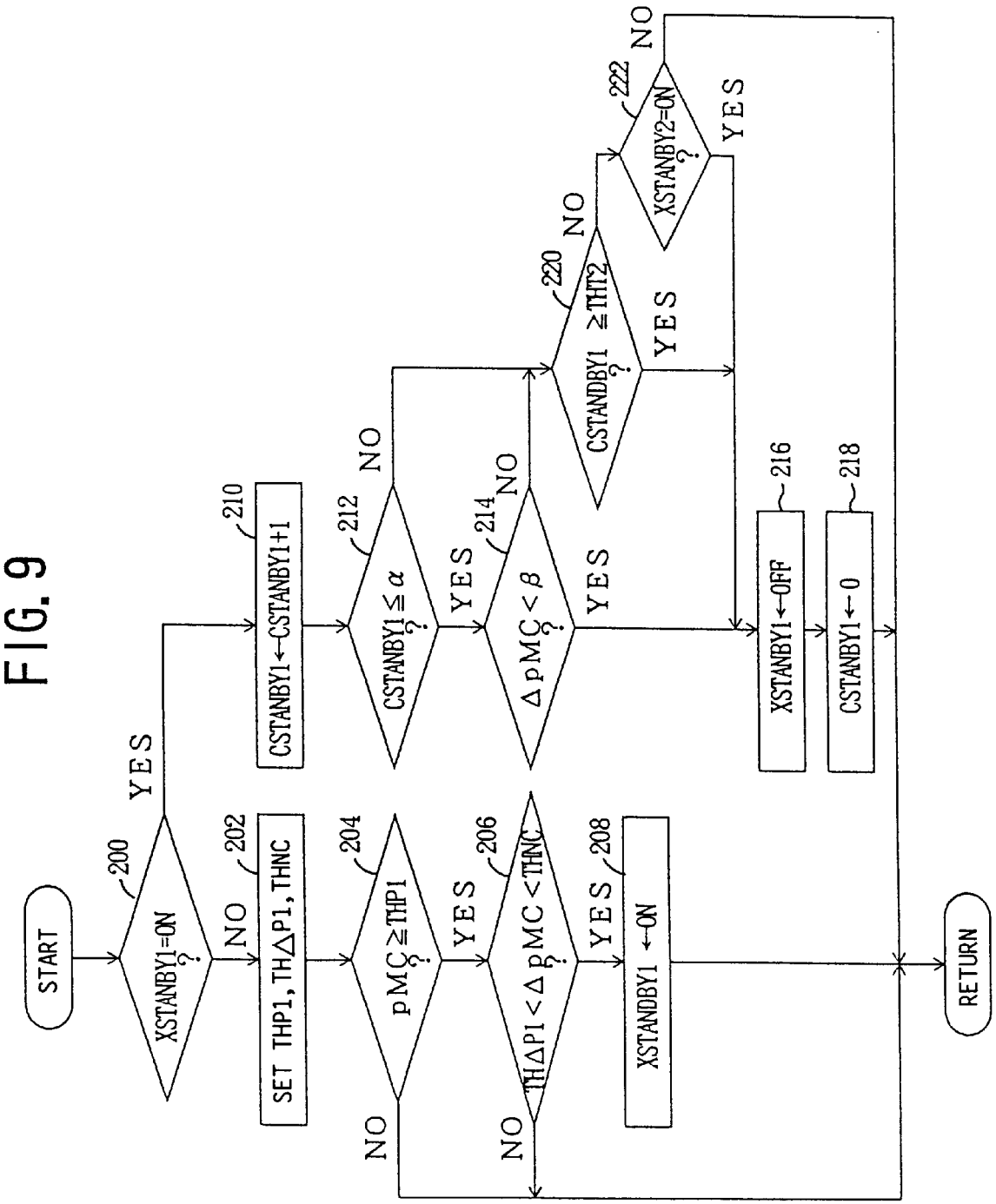
FIG. 9 is a flowchart of an example of a control routine performed to determine an establishment of a first standby state in the brake force control apparatus of the present invention.

FIG. 9 shows a flowchart of an example of a control routine performed by the ECU 10 to distinguish a condition for shifting to the first standby state and distinguish a condition for maintaining the first standby state. The routine shown in FIG. 9 is a periodic interruption routine which is started at predetermined times. When the routine shown in FIG. 9 is started, the process of step 200 is performed first.

In step 200, it is determined whether or not a flag XSTANBY1 is turned on XSTANBY1 is a flag which is turned on when the condition for shifting to the first standby state is established. Accordingly, when the condition for shifting to the first standby state is not established, it is determined that XSTANBY1=ON is not established. In this case, the process of step 202 is performed.

In step 202, a first predetermined amount THP1, a first predetermined rate TH$\Delta$P1 and a noise cut value THNC are set in response to operating conditions of the vehicle. The first predetermined amount THP1, the first predetermined rate TH$\Delta$P1 and the noise cut value THNC are threshold values used for distinguishing the condition for shifting to the first standby state. That is, in the present embodiment, the condition for shifting to the first standby state is determined to be established when the master cylinder pressure $\Delta$pMC and the change rate $\Delta$pMC satisfy relationships pMC>THP1 and TH$\Delta$P1<$\Delta$PMC<THNC as described later. After the first predetermined amount THP1 and the first predetermined rate TH$\Delta$P1 are set in step 202, the the process of step 240 is performed.

In step 204, it is determined whether or not the output signal pMC is greater than the first predetermine amount THP1. If it is determined that $P_{M/C}$>THP1 is not established, it is determined that the condition for shifting to the first standby state is not established, and then the routine is ended. On the other hand, if it is determined that pMC>THP1 is established, the process of step 206 is performed.

In step 206, it is determined whether or not the change rate $\Delta$pMC is greater than the first predetermined rate TH$\Delta$P1 and is smaller than the noise cut value THNC. If it is determined that TH$\Delta$P1<$\Delta P_{M/C}$<THNC is not established, it is determined that the condition for shifting to the first standby state is not established, and the routine is ended. On the other hand, if it is determined that the above condition is established, the process of step 208 is performed.

In step 208, the flag XSTANBY1 is turned on so as to indicate that the condition for shifting to the fist standby state is established. After the process of step 208 is completed, the routine is ended.

If the routine is started after the flag XSTANBY1 is turned on in step 208 in a previous routine, it is determined that XSTANBY1=ON is established in step 200. In this case, the process of step 210 is performed subsequent to step 200.

In step 210, a counter CSTANBY1 is incremented. The counter CSTANBY1 is a counter for counting an elapsed time after the establishment of the condition for shifting to the first standby state. The count time of the counter CSTANBY1 is reset to "0" by an initial process when an operation of the vehicle is started. After the process of step 210 is completed, the process of step 212 is then performed.

In step 212, it is determined whether or not the time counted by the counter CSTANBY1 is less than a predetermined time α. The predetermined time a is a less than the time period during which the change rate ΔpMC is maintained to be a large value when an emergency brake operation is performed. If it is determined that CSTANBY1<α is established, the process of step 214 is performed.

In step 214, it is determined whether or not the change rate ΔpMC is less than a predetermined value β. If it is determined that ΔpMC<β is established, it can be determined that the change rate ΔpMC becomes a small value in a very short time after the condition for shifting to the first standby state is established. In this case, it is determined that the brake operation by the driver is not an emergency brake operation, and then the process of step 216 is performed.

In step 216, the flag XSTANBY1 is turned off so as to cancel the first standby state. After the process of step 216 is performed, the process of step 218 is performed.

In step 218, a count time of the counter CSTANBY1 is reset to "0". After the process of step 218 is completed, the routine is ended.

In the present routine, if it is determined, in step 212, that CSTANBY<α is not established, or if it is determined, in step 214, that ΔpMC<β is not established, it can be determined that a phenomenon, in which the change rate ΔpMC becomes a small value in a very short time after the condition for shifting to the first standby state is established, does not occur. In such a case, the process of step 220 is performed.

In step 220, it is determined whether or not the count value of the counter CSTANBY1 is greater than a second predetermined time THT2. The second predetermined time THT2 is a value for setting an upper limit of the time for maintaining the first standby state after the establishment of the condition for shifting to the first standby state. Accordingly, if it is determined, in step 220, that CSTANBY1>THT2 is established, it can be determined that the time for maintaining the first standby state reaches the upper limit. In such a case, the process of steps 216 and 218 is performed, and then the routine is ended. On the other hand, if it is determined, in step 220 that CSTANBY1>THT2 is not established, it can be determined that the time for maintaining the first standby state has not been reached the upper limit. In such a case, the process of steps 222 is performed.

In step 222, it is determined whether or not a flag XSTANBY2 is turned on. The flag XSTANBY2 is turned on when it is determined that a condition for shifting to a second standby state is established in a routine described later. When it is determined that XSTANBY2=ON is established, it is determined that the first standby state is not needed to be maintained. In this state, the process of steps 216 and 218 is performed, and then the routine is ended. On the other hand, if it is determined that XSTANBY2=ON is not established, it is determined that the first standby condition is needed to be maintained. In this state, no process is performed thereafter, and the routine is ended.

Figure 10:
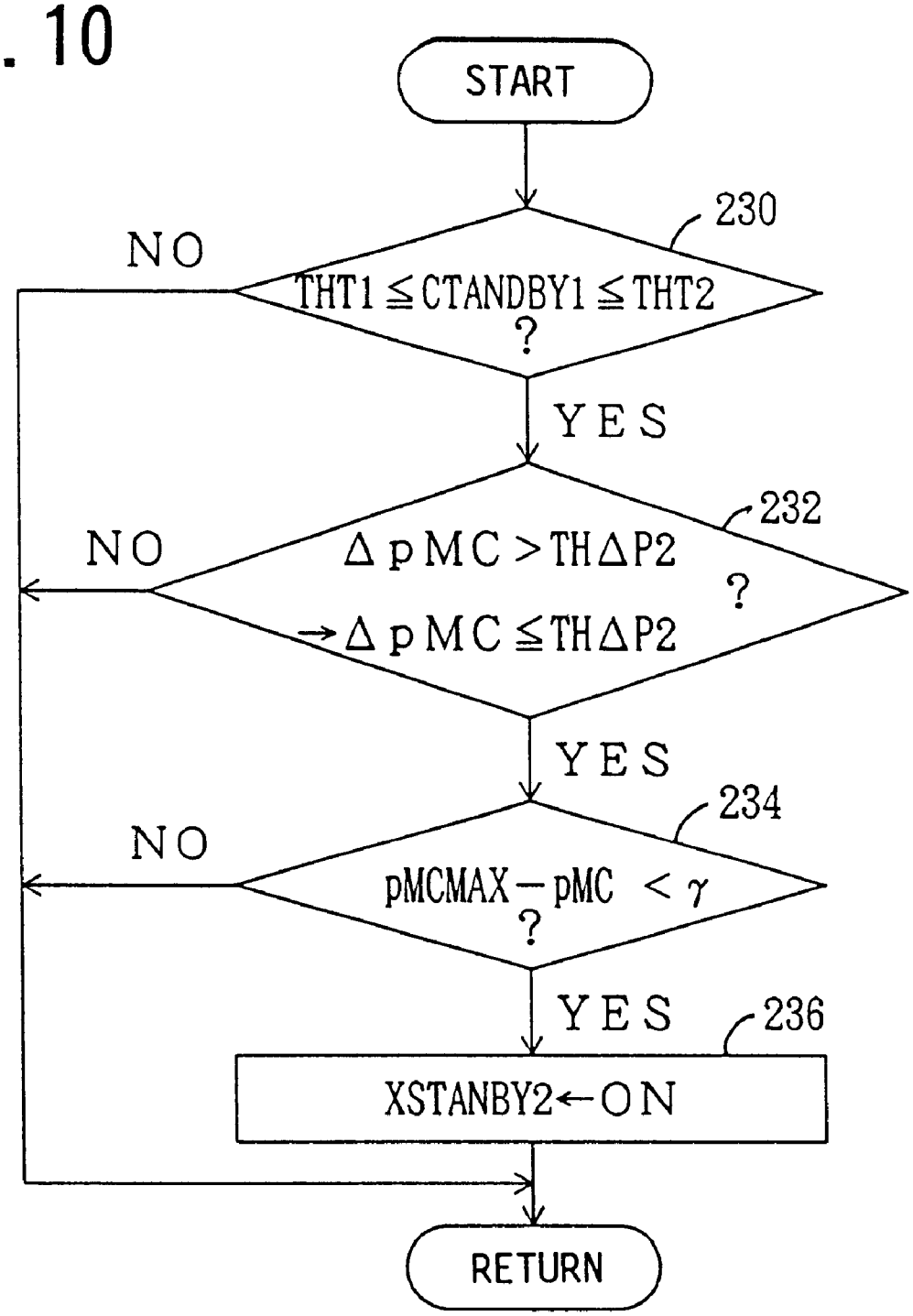
FIG. 10 is a flowchart of an example of a control routine performed to determine an establishment of a second standby state in the brake force control apparatus of the present invention.

FIG. 10 shows a flowchart of an example of a control routine performed by the ECU 10 so as to distinguish a condition for shifting to the second standby state. The routine shown in FIG. 10 is a periodic interruption routine started at predetermined times. When the routine shown in FIG. 10 is started, the process of step 230 is performed first.

In step 230, it is determined whether or not the count time of the counter CSTANBY1, that is, an elapsed time after the establishment of the condition for shifting to the first standby state is greater than the first predetermined time THT1 and is less than the second predetermined time THT2. The second predetermined time THT2 is the upper limit value for maintaining the first standby state. On the other hand, the first predetermined time THT1 is a value which determines a lower limit time for the brake pedal 12 continuing a high-speed operation.

Accordingly, in the brake force control apparatus according to the present embodiment, when the operating speed of the brake pedal 12 becomes a sufficiently small value after the brake operation is started and before THT1≦CSTANBY1 is established, it can be determined that the brake operation is not an emergency brake operation. If it is determined, in step 230, that THT1≦CSTANBY1≦THT2 is not established, no process is performed thereafter, and the routine is ended. On the other hand, if it is determined that the above-mentioned condition is established, the process of step 232 is then performed.

In step 232, it is determined whether or not the change rate ΔpMC is changed from a rate exceeding the second predetermined rate THΔP2 to a rate less than the second predetermined rate THΔP2 from a previous process cycle to the present process cycle. The second predetermined rate THΔP2 is a threshold value for determining whether or not the master cylinder pressure $P_{M/C}$ is rapidly increasing, that is, whether or not the brake pedal 12 is operated at a high speed.

In step 232, if it is determined that the change rate ΔpMC is not changed from a rate exceeding the second predetermined rate THΔP2 to a rate less than the second predetermined rate THΔP2 during a period from the previous process cycle to the present process cycle, it can be determined that the high-speed operation is not completed during a period from the previous process cycle to the present process cycle. In this case, no process is performed thereafter, and the routine is ended.

On the other hand, if it is determined, in step 232, that the change rate ΔpMC is changed from a rate exceeding the second predetermined rate THΔP2 to a rate less than the second predetermined rate THΔP2 during a period from the previous process cycle to the present process cycle, it can be determined that the high-speed operation is completed during a period from the previous process cycle to the present process cycle. In this case, the process of step 234 is performed.

In step 234, it is determined whether or not a difference "pMCMAX-pMC" between the maximum value pMCMAX of the output value pMC detected after the establishment of the first standby state and the output value pMC immediately after the establishment of the condition of step 232 is smaller than a predetermined value γ. If it is determined that PMCMAX-pMC<γ is established, it can be determined that a large pressing force F is still applied to the brake pedal 12. In this case, the process of step 236 is then performed. On the other hand, if it is determined that the condition of step 234 is not established, it is determined that the pressing force to the brake pedal 12 has already been decreased. In this case, the process for shifting to the second standby state is not performed, and the routine is ended.

In step 236, the flag XSTANBY2 is turned on so as to indicate that the second standby condition is established. When the process of step 236 is completed, the routine is ended.

Figure 11:
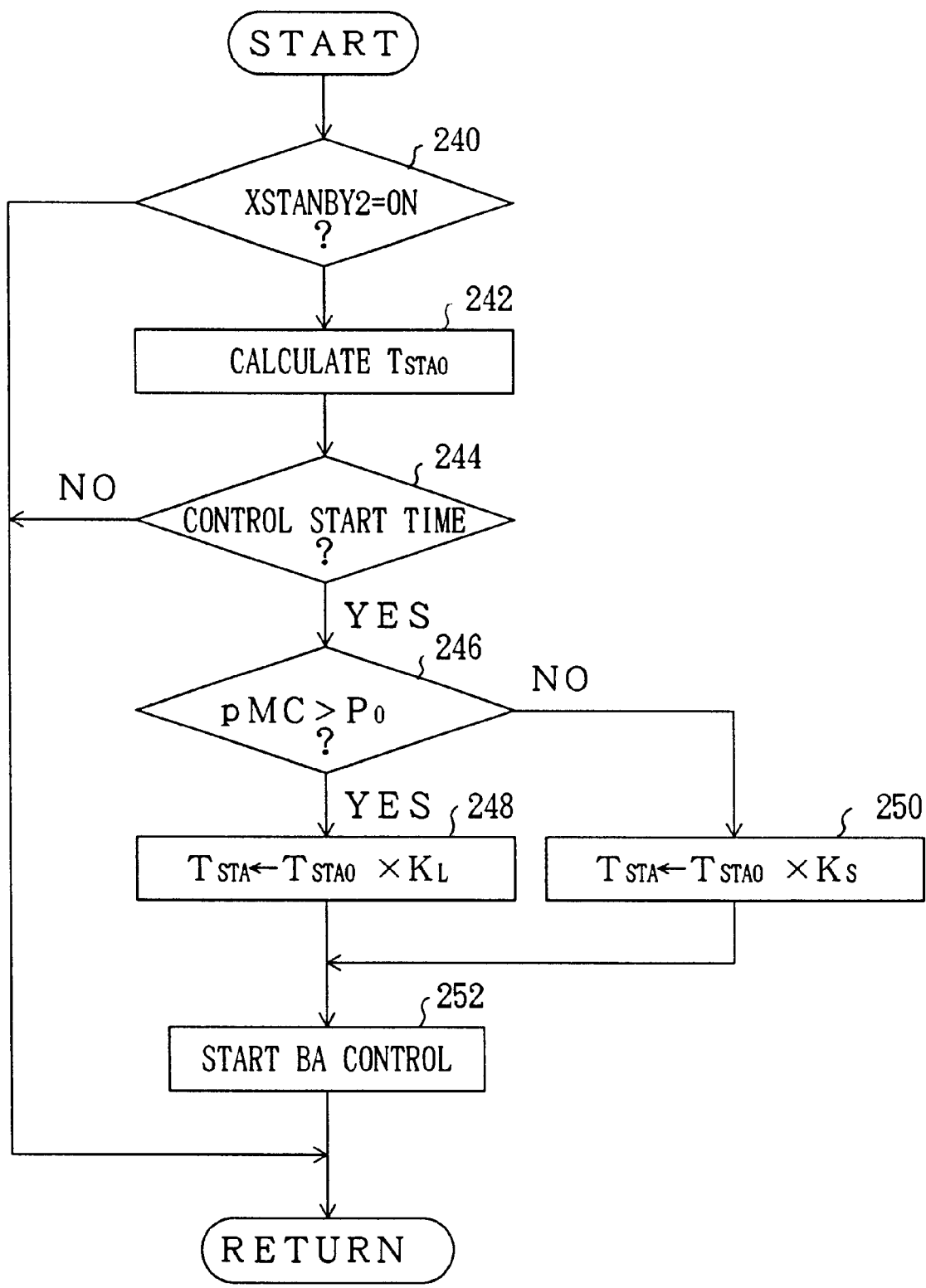
FIG. 11 is a flowchart of an example of a control routine performed to determine an establishment of a condition for starting the BA control and to calculate a pressure increasing time in a start pressurizing mode in the brake force control apparatus of the present invention.

FIG. 11 shows a flowchart of an example of a control routine performed by the ECU 10 so as to distinguish a condition for starting the BA control and calculate a pressure increasing time $T_{STA}$ of the start pressurizing mode. The routine shown in FIG. 11 is a periodic interruption routine started at every predetermined time. When the routine shown in FIG. 11 is started, the process of step 240 is performed first.

In step 240, it is determined whether or not the flag XSTANBY2 is turned on. If it is determined that XSTANBY2=ON is not established, it can be determined that the BA control is not needed to start. In this case, no process is performed thereafter, and the routine is ended. On the other hand, if it is determined that XSTANBY2=ON is established, the process of step 242 is then performed.

In step 242, a reference pressure increasing time $T_{STAO}$ which is a reference value of the pressure increasing time $T_{STA}$ is calculated. The reference pressure increasing time $T_{STAO}$ is determined based on the operating speed of the brake pedal 12 generated during a process of an emergency brake operation by referring to a map stored in the ECU 10. Specifically, the reference pressure increasing time $T_{STAO}$ is determined based on the maximum value $\Delta pMCMAX$ of the change rate $\Delta pMC$ detected after the establishment of the condition for shifting to the first standby state.

Figure 12:
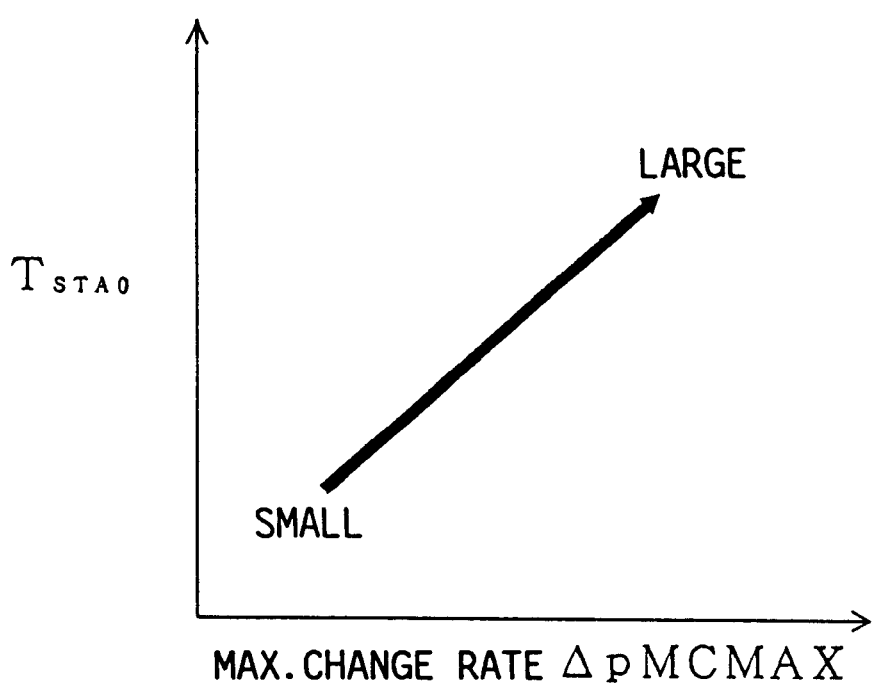
FIG. 12 is an example of a map of a reference pressure increasing time $T_{STAO}$ which is referred to during execution of the control routine shown in FIG. 11.

FIG. 12 is an example of the map referred to in step 242. In the present embodiment, the map of the reference pressure increasing time $T_{STAO}$ is set so that the reference pressure increasing time $T_{STAO}$ is increased as the maximum value $\Delta pMCMAX$ of the change rate $\Delta pMC$ is increased. Accordingly, the reference pressure increasing time $T_{STAO}$ is increased as the operating speed of the brake pedal is increased. When the above process is completed, the process of step 244 is then performed.

In step 244, it is determined whether or not a time for starting the BA control is reached. As mentioned above, in the present embodiment, after an emergency brake operation is performed, the BA control is performed when a condition is established in which use of the accumulator 28 as a fluid pressure source is advantageous over use of the hydrobooster 36 as a fluid pressure source for increasing the wheel cylinder pressure $P_{W/C}$. That is, the BA control is started when the difference Pdiff between the master cylinder pressure $P_{M/C}$ and the wheel cylinder pressure $P_{W/C}$ becomes a sufficiently small value. In step 244, it is determined whether or not such a time is reached. If it is determined that the time for starting the BA control has not been reached, no process is performed thereafter, and the routine is ended. On the other hand, if it is determined that the time for starting the BA control is reached, the process of step 246 is performed.

In step 246, it is determined whether or not the output signal pMC is greater than a predetermined pressure $P_0$. After the BA control is started, the wheel cylinder pressure $P_{W/C}$ is increased by using the accumulator 28 as a fluid pressure source. The change rate $P_{W/C}$ generated when the wheel cylinder pressure $P_{W/C}$ is increased by using the accumulator as a pressure fluid source is decreased as the pressure difference between the wheel cylinder pressure $P_{W/C}$ and the accumulator pressure $P_{ACC}$ is decreased. Accordingly, after the BA control is started, in order to generate the assist pressure Pa by setting the start pressurizing mode, the longer the pressure increasing time $T_{STA}$ must be, the higher the wheel cylinder pressure $P_{W/C}$ at the start time of the BA control.

In step 246, if it is determined that pMC>$P_0$ is established, it can be determined that the wheel cylinder pressure $P_{W/C}$ generated at the start time of the BA control is high. In this case, the process of step 248 is performed so as to increase the pressure increasing time $T_{STA}$ to be a long time. On the other hand, if it is determined that pMC>$P_0$ is not established, it can be determined that the wheel cylinder pressure $P_{W/C}$ generated at the start time of the BA control is low. In this case, the process of step 250 is performed so as to increase the pressure decrease time $T_{STA}$ to be a short time.

In step 248, the pressure increasing time $T_{STA}$ is calculated by multiplying the reference pressure increasing time $T_{STAO}$ calculated in step 242 by a correction factor $K_L$. The correction factor $K_L$ is a factor which is previously prepared to set the pressure increasing time $T_{STA}$ to be a long time.

In step 250, the pressure increasing time $T_{STA}$ is calculated by multiplying the reference pressure increasing time $T_{STAO}$ calculated in step 242 by a correction factor $K_S$. The correction factor $K_S$ is a factor which is previously prepared to set the pressure increasing time $T_{STA}$ to be a short time. After the process of step 248 or step 250 is completed, the process of step 250 is performed.

In step 252, a process for turning off the flag XSTANBY2 is performed and a process for permitting a start of the BA control is performed. When the process of step 252 is performed, thereafter execution of the BA control is enabled. After the process of step 252 is completed, the routine is ended.

FIGS. 13 to 19 and FIG. 20 show flowcharts of an example of a control routine performed by the ECU 10 to achieve the BA function in the brake force control apparatus. The ECU 10 repeatedly performs the control routine shown in FIGS. 13 to 19 after execution of the BA control is permitted in step 252. When the control routine shown in FIGS. 13 to 19 is started, the process of step 260 is performed first.

In step 260, after the BA control is started, it is determined whether or not the (I) start pressurizing mode is ended. If it is determined that the (I) start pressurizing mode has not been ended, the process of step 262 is performed.

In step 262, a timer TMODE is reset. The timer TMODE is a timer which continuously counts up toward a predetermined upper limit value. In the present routine, the timer TMODE is used for counting a continuation time of each of the control modes for achieving the BA function. After the process of step 262 is completed, then, the process of step 264 is performed.

In step 264, a process is performed for setting the brake force control apparatus in the assist pressure increasing state shown in FIG. 3. After the process of step 264 is performed, the wheel cylinder pressure $P_{W/C}$ of each of the wheels starts to increase with a predetermined change rate by using the accumulator 28 as a fluid pressure source. After the process of step 264 is completed, the process of step 266 is then performed.

In step 266, it is determined whether or not the count value of the timer $T_{MODE}$ exceeds the pressure increasing time $T_{STA}$ calculated in step 248 or step 250. If it is determined that $T_{MODE}$>$T_{STA}$ is not established, the process of step 264 is repeated. According to the above process, after the BA control is started and until the pressure increasing time $T_{STA}$ is passed, the brake force control apparatus can be maintained in the assist pressure increasing state. In the present embodiment, the process of steps 260 to 266 achieves the (I) start pressurizing start mode.

As mentioned above, the pressure increasing time $T_{STA}$ is increased to be a longer time as the operating speed of the brake pedal 12 is increased to be a higher speed in a process of an emergency brake operation, that is, as the emergency brake operation requires a more rapid increase in the brake force. Additionally, the pressure increasing time $T_{STA}$ is corrected based on the master cylinder pressure $P_{M/C}$ at the start time of the BA control by considering a pressure increasing slope of the wheel cylinder pressure $P_{W/C}$ during execution of the (I) start pressurizing mode. Thus, according to the brake force control apparatus of the present embodiment, the assist pressure Pa to which a driver's intention is accurately reflected can be generated by setting the (I) start pressurizing mode.

In the brake force control apparatus according to the present embodiment, when the pressure increasing time $T_{STA}$ has passed after the (I) start pressurizing mode is started, it is determined, in step 266, that $T_{MODE} > T_{STA}$ is established. In this case, the process of step 268 and subsequent steps is performed so as to end the (I) start pressurizing mode and start another control mode.

Figure 21:
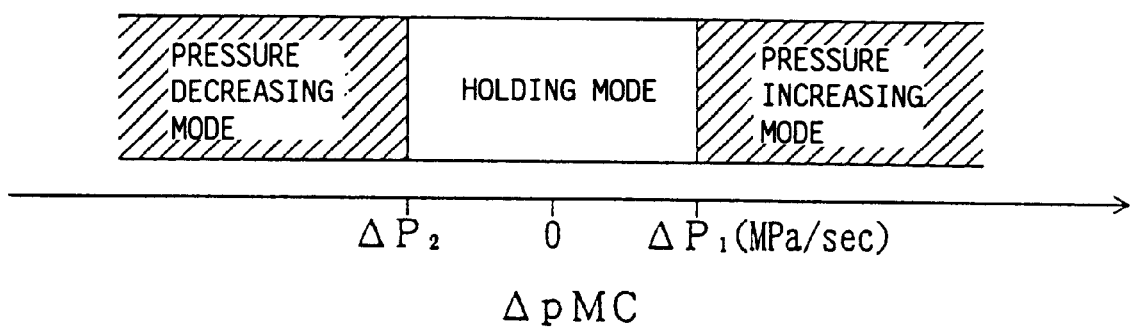
FIG. 21 is a table showing a control mode which is performed subsequent to the start pressurizing mode when the BA control is performed in the brake force control apparatus of the present invention.

FIG. 21 shows an illustration for indicating a table representing a control mode performed subsequent to the (I) start pressurizing mode in relation to the change rate ΔpMC at an end time of the (I) start pressurizing mode. This table is hereinafter referred to as a start pressurizing end time table. In the present embodiment, a control mode which is set subsequent to the (I) start pressurizing mode is determined in accordance with the start pressurizing end time table shown in FIG. 19.

In step 268, the change rate ΔpMC generated in the master cylinder pressure $P_{M/C}$ at the end time of the (I) start pressurizing mode is acquired.

In step 270, it is determined whether or not the thus acquired change rate ΔpMC exceeds a predetermined positive value $ΔP_1$. If it is determined that $P_{M/C} > ΔP1$ (>0) is established, it can be determined that an increase of the brake force is requested by the driver. In this case, the control mode subsequent to the start pressurizing mode is determined to be the (II) assist pressure increasing mode, and then the process of step 272 is performed.

In step 272, a process for setting the brake force control apparatus in the assist pressure increasing state shown in FIG. 3 is performed so as to start the (II) assist pressure increasing mode. After the process of step 272 is performed, the wheel cylinder pressure $P_{W/C}$ of each wheel is rapidly increased by using the accumulator 28 as a fluid pressure source. After the process of step 272 is completed, the process of step 274 is performed.

In step 274, a flag XPAINC is turned on so as to indicate that the control mode currently performed is the (II) assist pressure increasing mode. After the process of step 274 is completed, the routine is ended.

If it is determined, in step 270, that $P_{M/C} > P1$ is not established, the process of step 276 is performed.

In step 276, it is determined whether or not the change rate ΔpMC acquired in step 268 is less than a negative predetermined value $ΔP_2$. If it is determined that ΔpMC<ΔP2 (<0) is established, it can be determined that a request is made by the driver to decrease the brake force. In this case, the control mode subsequent to the (I) start pressurizing mode is determined to be the (III) assist pressure increasing mode, and the process of step 278 is performed.

In step 278, in order to start the (III) assist pressure decreasing mode, a process is performed for setting the brake force control apparatus in the assist pressure decreasing state shown in FIG. 5. After the process of step 278 is performed, the wheel cylinder pressure $P_{W/C}$ of each wheel is decreased down to the master cylinder pressure $P_{W/C}$ as a lower limit. After the process of step 278 is completed, the process of step 280 is then performed.

In step 280, a flag XPARED is turned on so as to indicate that the control mode currently performed is the (III) assist pressure decreasing mode. After the process of step 280 is completed, the routine is ended.

If it is determined, in step 276, that ΔpMC<ΔP2 is not established, that is, if it is determined that the change rate ΔpMC is maintained near "0" when the start pressurizing mode is completed, it can be determined that a request is made by the driver to maintain the brake force. In this case, the process of step 282 is performed.

In step 282, in order to start the (IV) assist pressure holding mode, the a process is performed for setting the brake force control apparatus in the assist pressure decreasing state shown in FIG. 4. After the process of step 282 is performed, the wheel cylinder pressure $P_{W/C}$ of each wheel is maintained without being increased or decreased. After the process of step 278 is completed, the process of step 284 is then performed.

In step 284, a flag XPAHOLD is turned on so as to indicate that the control mode currently performed is the (IV) assist pressure decreasing mode. After the process of step 284 is completed, the routine is ended.

After the process of steps 260 to 284 is performed and when the present routine is started again, it is determined, in step 260, that the (I) start pressurizing mode has already been completed. In this case, the process of step 286 is performed subsequent to step 260.

Figure 14:
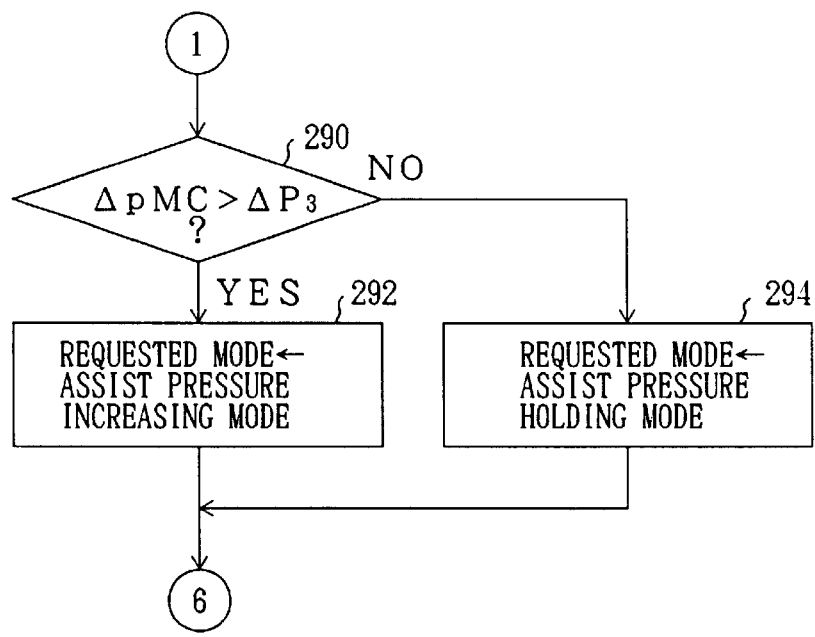
FIG. 14 is a part 2 of a flowchart of an example of a control routine performed to achieve the BA control in the brake force control apparatus of the present invention.

In step 286, the output signal pMC and the change rate ΔpMC is acquired. In step 288, it is determined which control mode is currently performed in the brake force control apparatus. In step 288, if the flag XPAINC is turned on, it is determined that the control mode currently performed is the (II) assist pressure increasing mode. In this case, the process of step 290 shown in FIG. 14 is performed subsequent to step 288.

Figure 22:
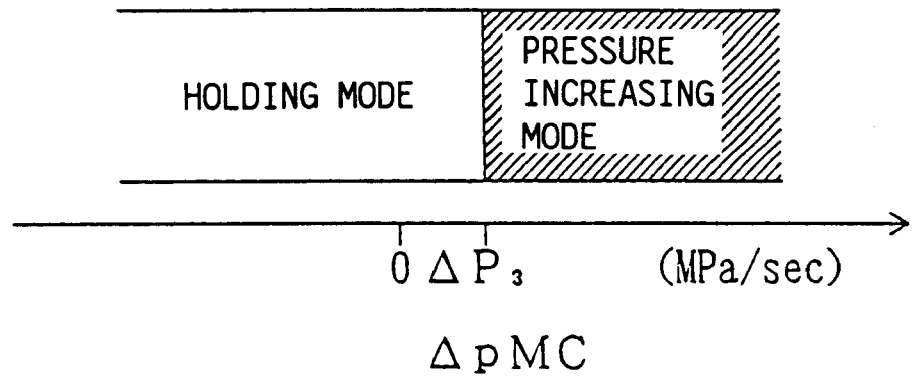
FIG. 22 is a table showing a control mode which is performed subsequent to an assist pressure increasing mode when the BA control is performed in the brake force control apparatus of the present invention.

FIG. 22 shows an illustration for indicating a table representing a control mode performed subsequent to the currently performed mode when the currently performed control mode is the assist pressure increasing mode in relation to the change rate ΔpMC. This table is hereinafter referred to as a pressure increasing time table. In the present embodiment, a control mode which is set subsequent to the (II) assist pressure increasing mode is determined in accordance with the pressure increasing time table shown in FIG. 22 in the process of step 290 and subsequent steps.

In step 290, it is determined whether or not the change rate ΔpMC exceeds a predetermined positive value $ΔP_3$. If it is determined that $ΔpMC > ΔP_3$ (>0) is established, it can be determined that an increase of the brake force is requested by the driver. In this case, the process of step 292 is performed subsequent to step 290. On the other hand, if it is determined that the change rate ΔpMC satisfying the above-mentioned condition is not generated, it can be determined that a request is made by the driver to maintain the brake force. In this case, the process of step 294 is performed subsequent to step 290.

In step 292, in order to enable a further increase in the brake force, a process is performed for requesting a continuous execution of the (II) assist pressure increasing mode, that is, for setting the (II) assist pressure increasing mode as a requested mode.

Figure 19:
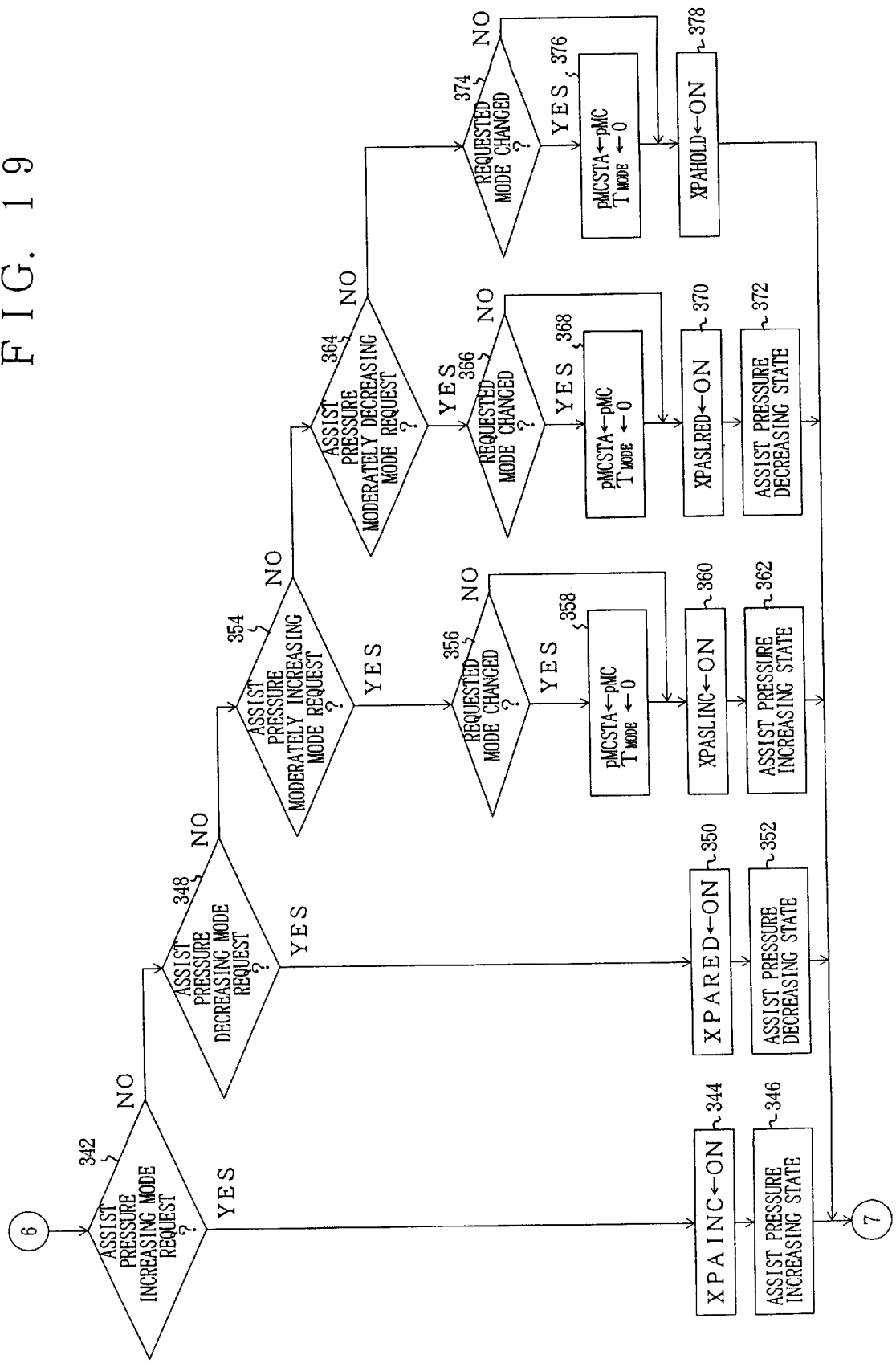
FIG. 19 is a part 7 of a flowchart of an example of a control routine performed to achieve the BA control in the brake force control apparatus of the present invention.

In step 294, in order to enable holding of the brake force, a process is performed for requesting execution of the (IV) assist pressure holding mode, that is, for setting the (IV) assist pressure holding mode as a requested mode. After the process of step 292 or step 294, the process of step 342 shown in FIG. 19 is performed.

Figure 15:
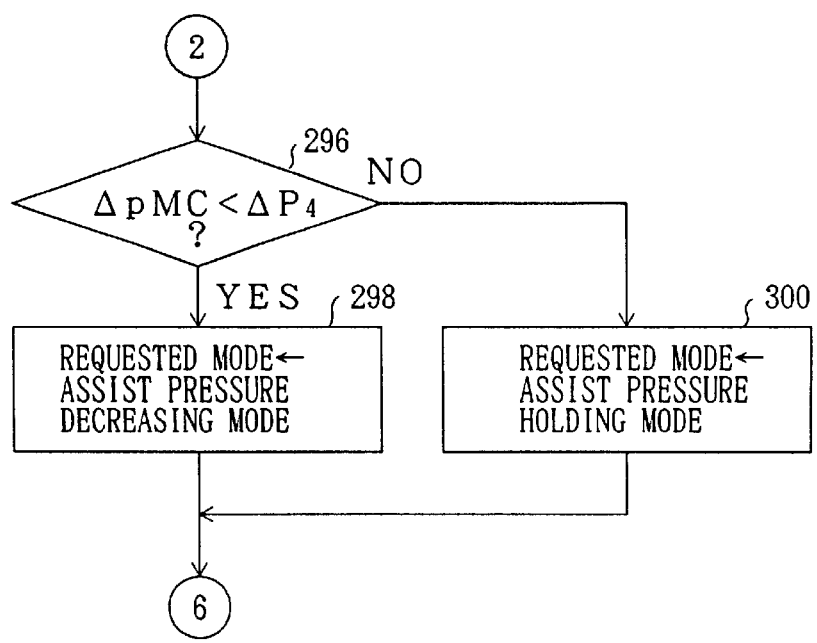
FIG. 15 is a part 3 of a flowchart of an example of a control routine performed to achieve the BA control in the brake force control apparatus of the present invention.

In the present routine, if it is determined, in step 288, that the flag XPARED is turned on, it is determined that the control mode currently performed is the (III) assist pressure decreasing mode. In this case, the process of step 296 shown in FIG. 15 is performed subsequent to step 288.

Figure 23:
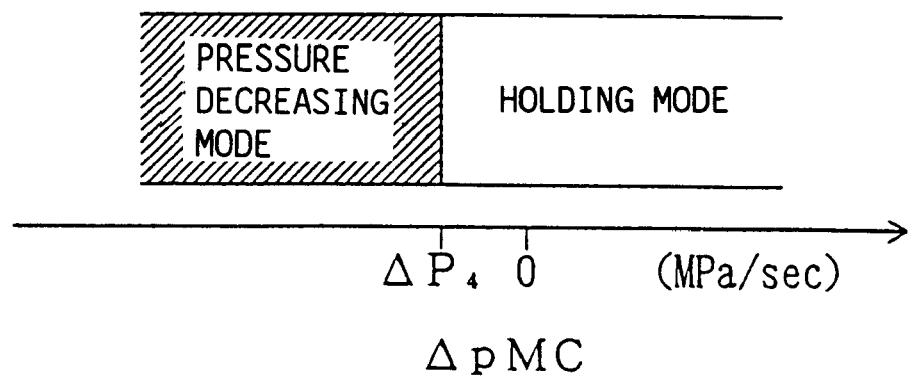
FIG. 23 is a table showing a control mode which is performed subsequent to an assist pressure decreasing mode when the BA control is performed in the brake force control apparatus of the present invention.

FIG. 23 shows an illustration for indicating a table representing a control mode performed subsequent to the currently performed mode when the currently performed control mode is the (III) assist pressure decreasing mode in relation to the change rate ΔpMC. This table is hereinafter referred to as a pressure decreasing time table. In the present embodiment, a control mode which is set subsequent to the (III) assist pressure decreasing mode is determined in accordance with the pressure decreasing time table shown in FIG. 23 in the process of step 296 and subsequent steps.

In step 296, it is determined whether or not a change rate ΔpMC below a predetermined negative value $\Delta P_4$ is generated in the output signal pMC. If it is determined that ΔpMC<$\Delta P_4$ (>0) is established, it can be determined that a decrease of the brake force is requested by the driver. In this case, the process of step 298 is performed subsequent to step 296. On the other hand, if it is determined that the change rate ΔpMC satisfying the above-mentioned condition is not generated, it can be determined that a request is made by the driver to maintain the brake force. In this case, the process of step 300 is performed subsequent to step 296.

In step 298, in order to enable a further decrease in the brake force, a process is performed for requesting a continuous execution of the (III) assist pressure decreasing mode, that is, for setting the (III) assist pressure decreasing mode as a requested mode.

In step 300, in order to enable holding of the brake force, a process is performed for requesting execution of the (IV) assist pressure holding mode, that is, for setting the (IV) assist pressure holding mode as a requested mode. After the process of step 298 or step 300, the process of step 342 shown in FIG. 19 is performed.

Figure 16:
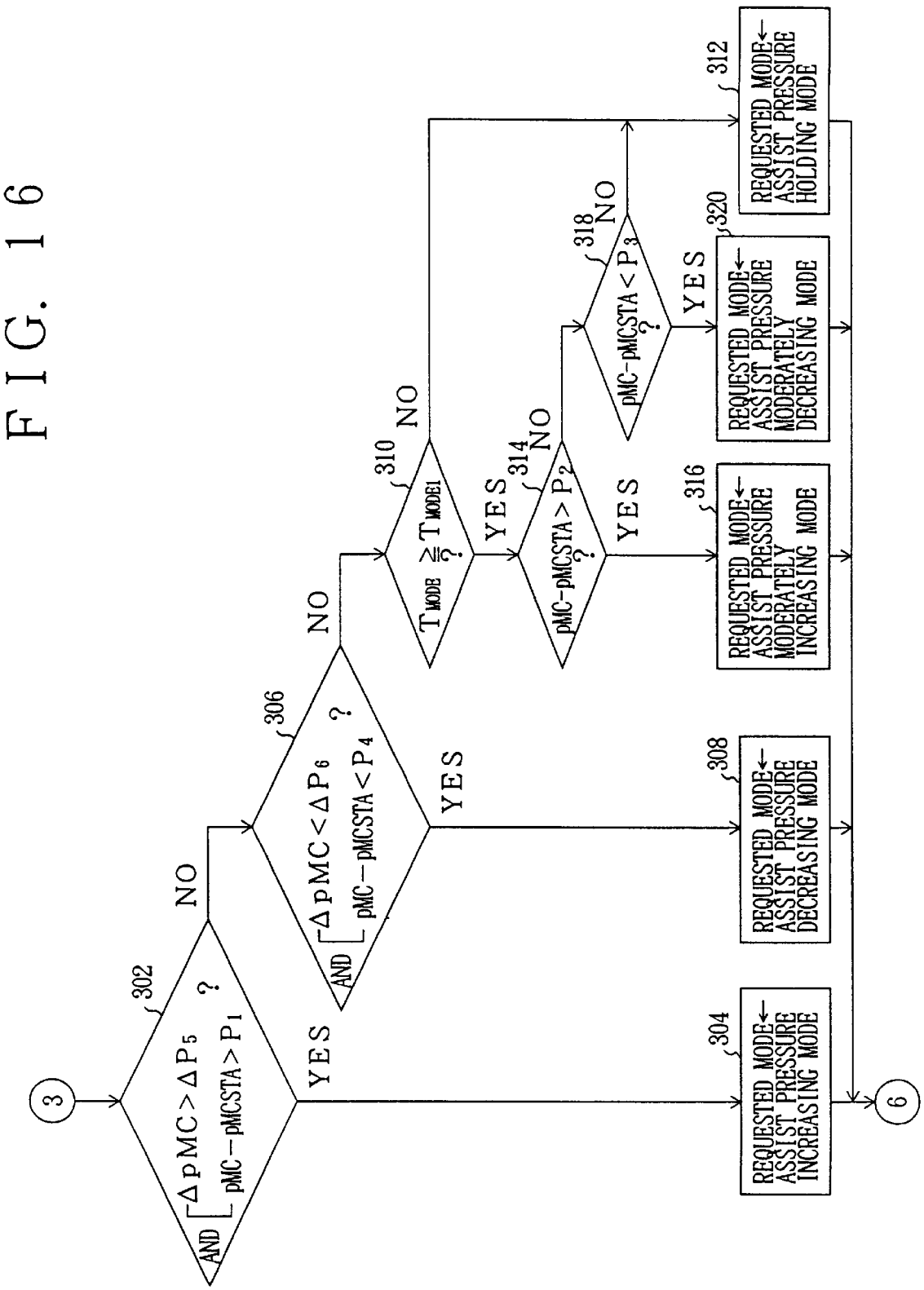
FIG. 16 is a part 4 of a flowchart of an example of a control routine performed to achieve the BA control in the brake force control apparatus of the present invention.

In the present routine, if it is determined, in step 288, that the flag XPAHOLD is turned on, it is determined that the control mode currently performed is the (IV) assist pressure holding mode. In this case, the process of step 302 shown in FIG. 16 is performed subsequent to step 288.

Figure 24:
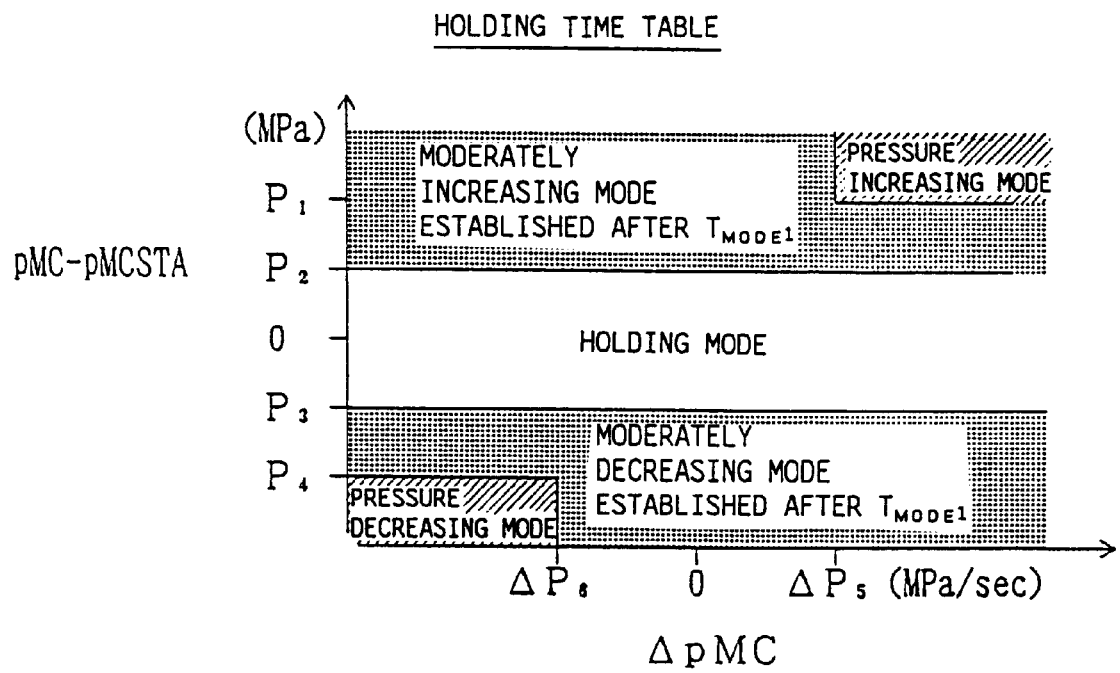
FIG. 24 is a table showing a control mode which is performed subsequent to an assist pressure holding mode when the BA control is performed in the brake force control apparatus of the present invention.

FIG. 24 shows an illustration for indicating a table (hereinafter referred to as a holding time table) representing a control mode performed subsequent to the currently performed mode when the currently performed control mode is the assist pressure holding mode in relation to ① the change rate ΔpMC of the output signal pMC and ② a difference "pMC-pMCSTA" between the output signal pMC and an initial output value pMCSTA. The initial out put value "pMCSTA" is a value of the output signal pMC at a time when the current control mode was started. Accordingly, "pMC-pMCSTA" shown in FIG. 24 corresponds to an amount of change which has been generated in the output signal pMC after the start of the current control mode. In the present embodiment, a control mode which is set subsequent to the (IV) assist pressure holding mode is determined in accordance with the holding time table shown in FIG. 24 in the process of step 302 and subsequent steps.

In step 302, it is determined whether or not a change rate ΔpMC exceeding a predetermined positive value $\Delta P_5$ is generated in the output signal pMC, and whether or not the amount of change "pMC-pMCSTA" exceeding the predetermined positive value $\Delta P_1$ is generated. If it is determined that pMC>$\Delta P_5$ (>0) is established and "pMC-PMCSTA">$P_1$ (>0) is established, it can be determined that a rapid increase of the brake force is requested by the driver who has intended to maintain the brake force. In this case, the process of step 304 is performed subsequent to step 302.

In step 304, in order to enable a rapid increase in the brake force, a process is performed for requesting execution of the (II) assist pressure increase mode, that is, for setting the (II) assist pressure increasing mode as a requested mode. After the process of step 304 is completed, the process of step 342 shown in FIG. 19 is performed.

On the other hand, if the condition of step 302 is not established, it can be determined that the driver does not intend to rapidly increase the brake force. In this case, the process of step 306 is performed.

In step 306, it is determined whether or not a change rate ΔpMC below a predetermined negative value $\Delta P_6$ is generated, and whether or not the amount of change "pMC-PMCSTA" below the predetermined negative value $\Delta P_4$ is generated. If it is determined that ΔpMC<$\Delta P_6$ (<0) is established and "pMC-PMCSTA"<$P_4$ (<0) is established, it can be determined that a rapid decrease of the brake force is requested by the driver who has intended to maintain the brake force. In this case, the process of step 308 is performed subsequent to step 306.

In step 308, in order to enable a rapid decrease in the brake force, a process is performed for requesting execution of the (III) assist pressure decreasing mode, that is, for setting the (III) assist pressure decreasing mode as a requested mode. After the process of step 308 is completed, the process of step 342 shown in FIG. 19 is performed.

On the other hand, if the condition of step 306 is not established, it can be determined that the driver does not intend to rapidly decrease the brake force. In this case, the process of step 310 is performed.

In step 310, it is determined whether or not the count value of the timer $T_{MODE}$ reaches a predetermined time $T_{MODE1}$. The predetermined time $T_{MODE1}$ is a value substantially equal to an upper limit value for a time needed for the amount of change pMC-pMCSTA becoming the predetermined value $P_1$ or less than the predetermined value $P_4$ when the driver operates the brake pedal 12 so as to intend to rapidly change the brake force. Accordingly, if $T_{MODE} \geq T_{MODE1}$ is not established, a possibility of brake operation which intends to rapidly change the brake force cannot be neglected. In such a case, the process of step 312 is performed.

In step 312, the process is performed for requesting a continuous execution of the (IV) assist pressure holding mode, that is, for setting the (IV) assist pressure holding mode as a requested mode. After the process of step 312 is completed, the process of step 342 shown in FIG. 19 is performed.

If it is determined, in step 310, that $T_{MODE} \geq T_{MODE1}$ is not established in a condition in which both the condition of step 302 and the condition of step 306 are not established, it can be determined that a brake operation which intends to rapidly change the brake force is not performed by the driver. In this case, the process of step 314 is performed subsequent to step 310.

In step 314, it is determined whether or not the amount of change pMC-pMCSTA exceeding the predetermined positive value $P_2$ is generated in the output signal pMC. As a result, if it is determined that pMC-PMCSTA>$P_2$ (>0) is established, it can be determined that a moderate increase of the brake force is requested by the driver who has intended to maintain the brake force. In this case, the process of step 316 is performed subsequent to step 314.

In step 316, in order to enable a rapid increase in the brake force, a process is performed for requesting execution of the (V) assist pressure moderately increasing mode, that is, for setting the (V) assist pressure moderately increasing mode as a requested mode. After the process of step 316 is completed, the process of step 342 shown in FIG. 19 is performed.

On the other hand, if the condition of step 314 is not established, it can be determined that the driver is not requesting execution of the (V) assist pressure moderately increasing mode. In this case, the process of step 318 is performed subsequent to step 314.

In step 318, it is determined whether or not the amount of change pMC-pMCSTA below a predetermined negative value $P_3$ is generated. As a result, if it determined that pMC-pMCSTA<$P_3$ (<0) is established, it can be determined that a moderate decrease of the brake force is requested by the driver who has intended to maintain the brake force. In this case, the process of step 320 is performed subsequent to step 318.

In step 320, in order to enable a rapid decrease in the brake force, a process is performed for requesting execution of the (VI) assist pressure moderately decreasing mode, that is, for setting the (VI) assist pressure moderately decreasing mode as a requested mode. After the process of step 320 is completed, the process of step 342 shown in FIG. 19 is performed.

On the other hand, if the condition of step 318 is not established, it can be determined that the driver intends to maintain the brake force, that is, the driver is requesting a continuous execution of the (IV) assist pressure holding mode. In this case, the process of step 312 is performed subsequent to step 318.

Figure 17:
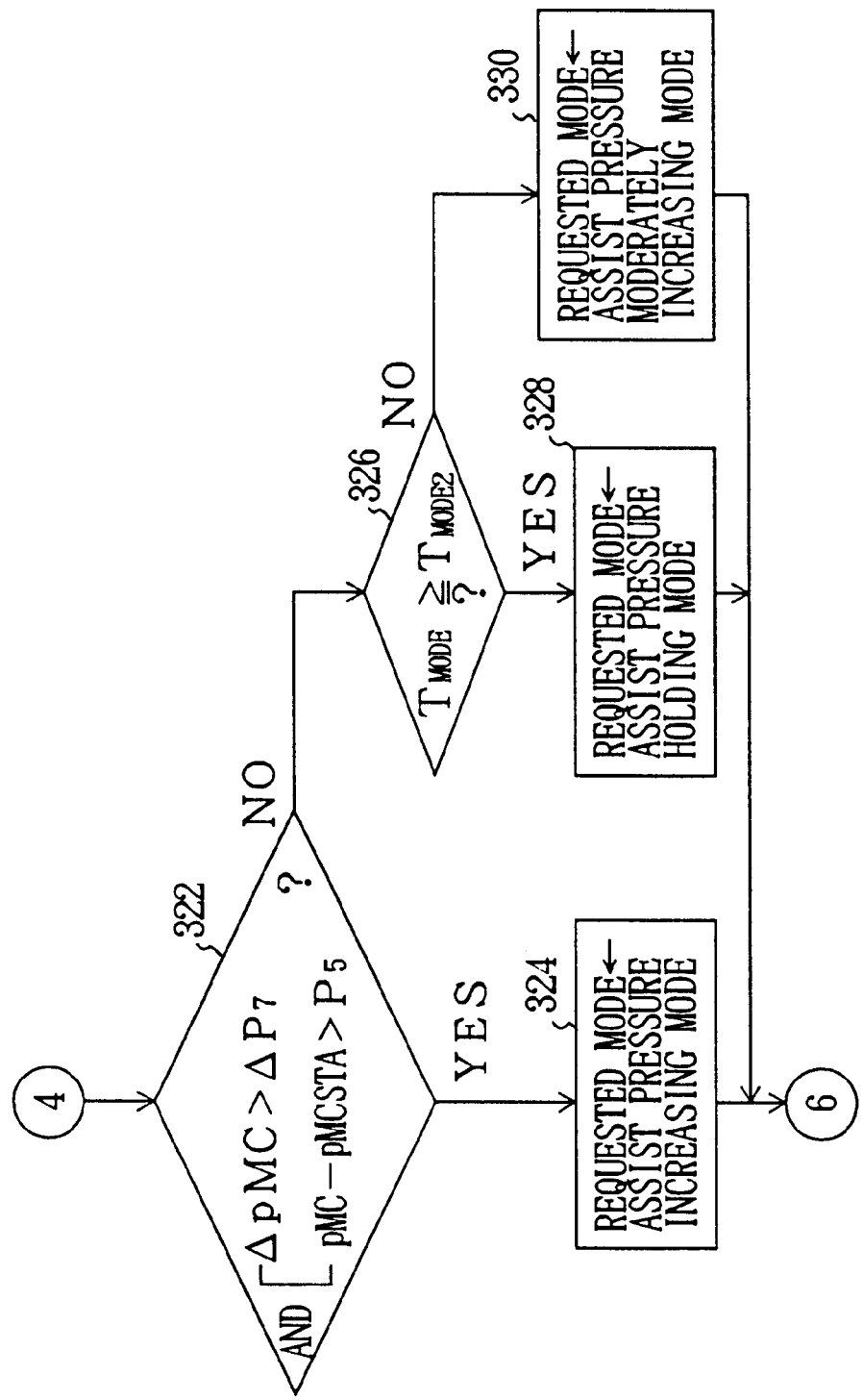
FIG. 17 is a part 5 of a flowchart of an example of a control routine performed to achieve the BA control in the brake force control apparatus of the present invention.

In the present routine, if it is determined, in step 288, that a flag XPASLINC is turned on, it is determined that the currently performed control mode is the (V) assist pressure moderately increasing mode. In this case, the process of step 322 shown in FIG. 17 is performed subsequent to step 288. It should be noted that the flag XPASLINC is a flag which is turned on when the (V) assist pressure moderately increasing mode is selected as the control mode, as described later.

Figure 25:
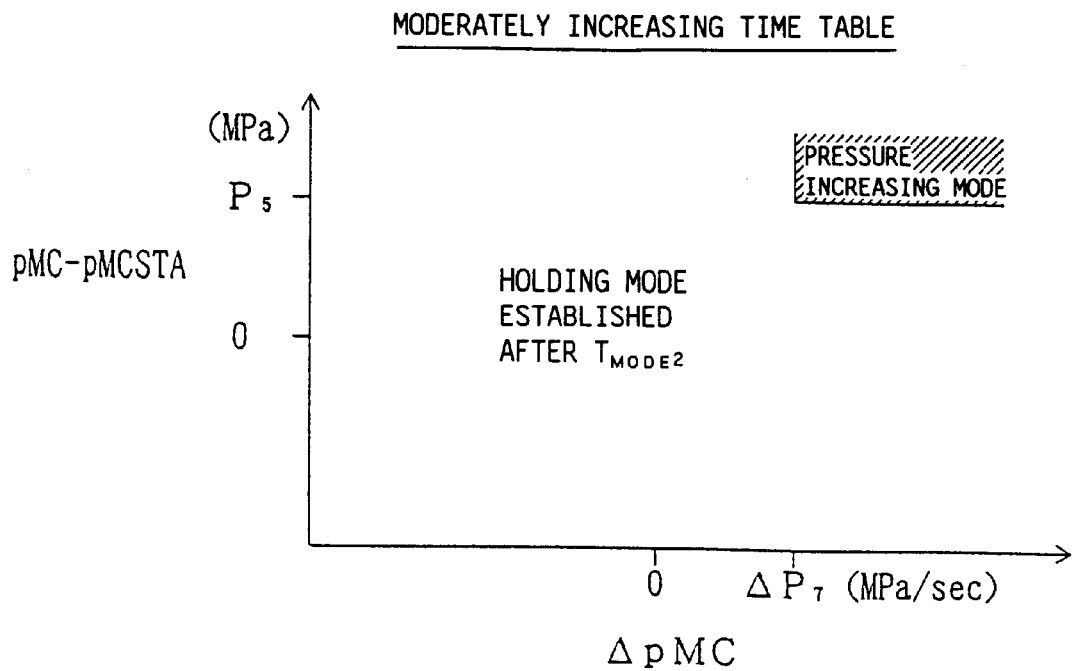
FIG. 25 is a table showing a control mode which is performed subsequent to an assist pressure moderately increasing mode when the BA control is performed in the brake force control apparatus of the present invention.

FIG. 25 shows an illustration for indicating a table representing a control mode performed subsequent to the currently performed mode, when the currently performed control mode is the assist pressure moderately increasing mode, in relation to ① the change rate ΔpMC of the output signal pMC and ② an amount of change pMC-pMCSTA of the output signal pMC. This table is hereinafter referred to as a moderately increasing time table. In the present embodiment, a control mode which is set subsequent to the (V) assist pressure moderately increasing mode is determined in accordance with the moderately increasing time table shown in FIG. 25 in the process of step 322 and subsequent steps.

In step 322, it is determined whether or not a change rate ΔpMC exceeding a predetermined positive value $ΔP_7$ is generated in the output signal pMC, and whether or not the amount of change pPC-PMCSTA exceeding a predetermined positive value $P_5$ (>0) is generated. If it is determined that ΔpMC>$ΔP_7$ (>0) is established and pMC-PMCSTA>$P_5$ (>0) is established, it can be determined that a rapid increase of the brake force is requested by the driver who has intended to moderately increase the brake force. In this case, the process of step 324 is performed subsequent to step 322.

In step 324, in order to enable a rapid increase in the brake force, a process is performed for requesting execution of the (II) assist pressure increasing mode, that is, for setting the (II) assist pressure increasing mode as a requested mode. After the process of step 324 is completed, the process of step 342 shown in FIG. 19 is performed.

On the other hand, if the condition of step 322 is not established, it can be determined that the driver does not intend to rapidly increase the brake force. In this case, the process of step 326 is performed.

In step 326, it is determined whether or not the count value of the timer $T_{MODE}$ reaches a predetermined time $T_{MODE2}$. In the present embodiment, the (V) assist pressure moderately increasing mode is achieved by maintaining the brake force control apparatus in the assist pressure increasing state shown in FIG. 3 for a predetermined short time and then setting the apparatus in the assist pressure holding state again. The predetermined time $T_{MODE2}$ is set to a period during which the brake force control apparatus should be maintained in the assist pressure increasing state when execution of the (V) assist pressure moderately increasing mode is requested.

Accordingly, if it is determined, in step 326, that $T_{MODE} \geq T_{MODE2}$ is established, it can be determined that the period for maintaining the brake force control apparatus being set in the assist pressure increasing state has ended, that is, a time for setting the brake force control apparatus in the assist pressure maintaining state has been reached. In this case, the process of step 328 is performed subsequent to step 326.

In step 328, the process is performed for requesting a continuous execution of the (IV) assist pressure holding mode, that is, for setting the (IV) assist pressure holding mode as a requested mode. After the process of step 328 is completed, the process of step 342 shown in FIG. 19 is performed.

On the other hand, if it is determined, in step 326, that $T_{MODE} \geq T_{MODE2}$ is not established, the period for maintaining the brake force control apparatus in the assist pressure increasing state has not ended. In this case, the process of step 330 is performed subsequent to step 326.

In step 330, a process is performed for requesting execution of the (V) assist pressure moderately increasing mode, that is, for setting the (V) assist pressure moderately increasing mode as a requested mode. After the process of step 330 is completed, the process of step 342 shown in FIG. 19 is performed. According to the above-mentioned process, when the condition for requesting the (II) assist pressure increasing mode (the condition of step 322) is not established after execution of the (V) assist pressure moderately increasing mode is requested, the requested mode can be changed to (IV) assist pressure holding mode after the request is maintained for the predetermined time $T_{MODE2}$.

Figure 18:
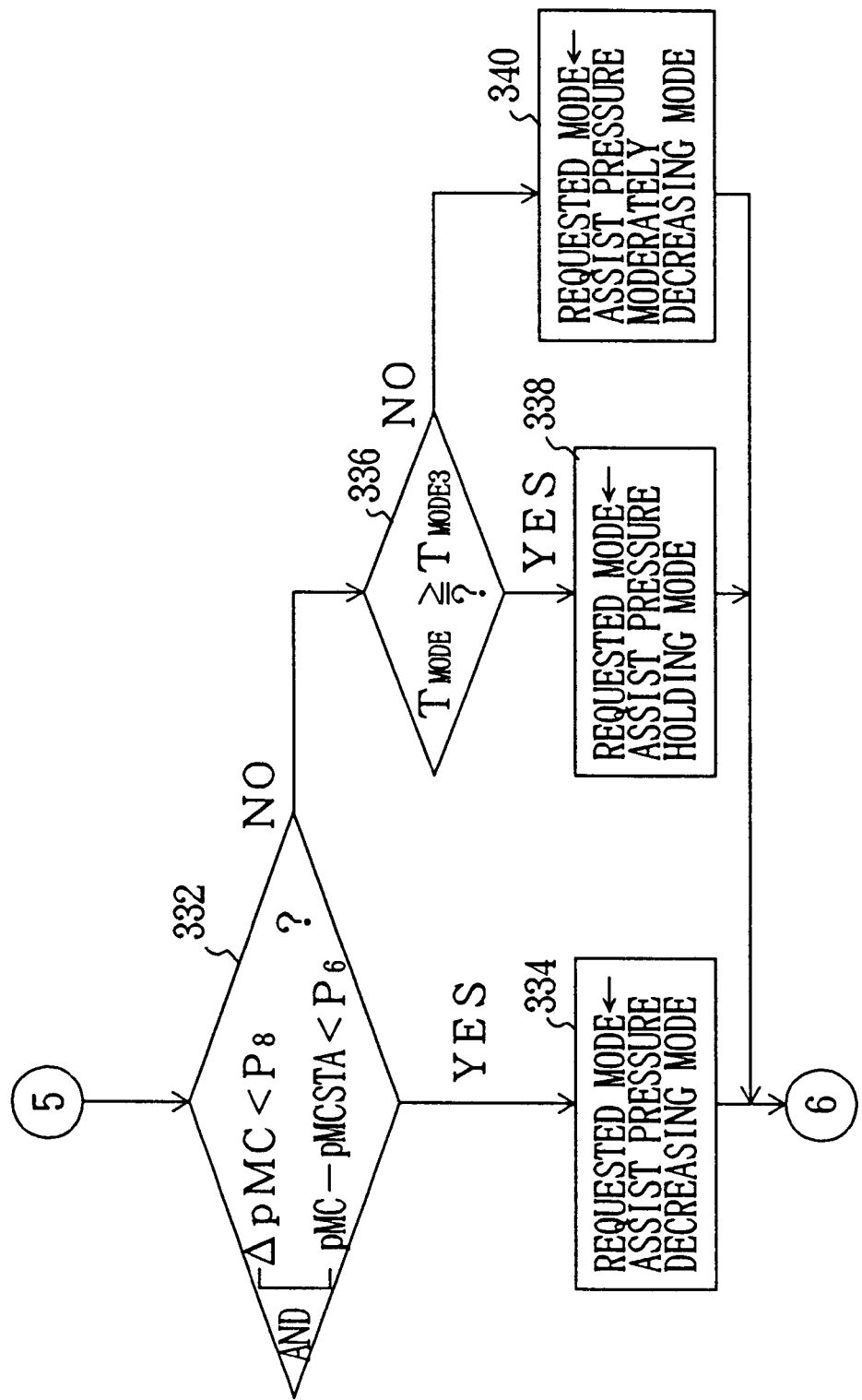
FIG. 18 is a part 6 of a flowchart of an example of a control routine performed to achieve the BA control in the brake force control apparatus of the present invention.

In the present routine, if it is determined, in step 288, that a flag XPASLRED is turned on, it is determined that the currently performed control mode is the (VI) assist pressure moderately decreasing mode. In this case, the process of step 332 shown in FIG. 18 is performed subsequent to step 288. It should be noted that the flag XPASLRED is a flag which is turned on when the (VI) assist pressure moderately decreasing mode is selected as the control mode, as described later.

Figure 26:
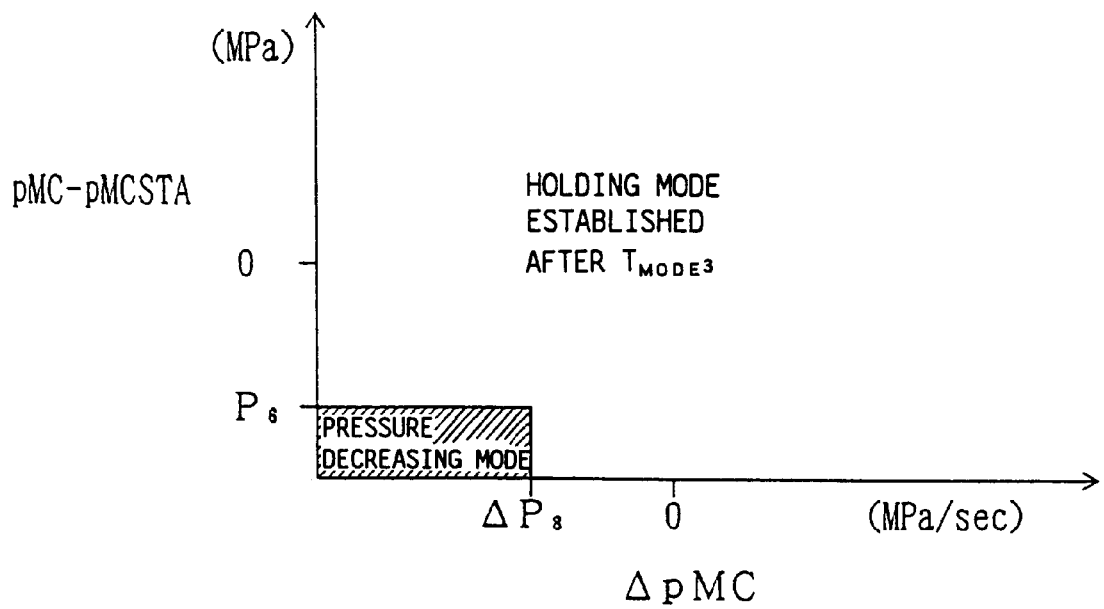
FIG. 26 is a table showing a control mode which is performed subsequent to an assist pressure moderately decreasing mode when the BA control is performed in the brake force control apparatus of the present invention.

FIG. 26 shows an illustration for indicating a table representing a control mode performed subsequent to the currently performed mode, when the currently performed control mode is the (VI) assist pressure moderately decreasing mode, in relation to ① the change rate ΔpMC of the output signal pMC and ② an amount of change pMC-PMCSTA of the output signal pMC. This table is hereinafter referred to as a moderately decreasing time table. In the present embodiment, a control mode which is set subsequent to the (VI) assist pressure moderately decreasing mode is determined in accordance with the moderately decreasing time table shown in FIG. 26 in the process of step 332 and subsequent steps.

In step 332, it is determined whether or not a change rate ΔpMC less than a predetermined negative value $\Delta P_8$ is generated in the output signal pMC, and whether or not the amount of change "$P_{M/C}$-PMCSTA" exceeding a predetermined negative value $P_6$ is generated. If it is determined that ΔpMC<$\Delta P_8$ (<0) is established and pMC-pMCSTA<$P_6$ (<0) is established, it can be determined that a rapid decrease of the brake force is requested by the driver who has intended to moderately increase the brake force. In this case, the process of step 334 is performed subsequent to step 332.

In step 334, In order to enable a rapid decrease in the brake force, a process is performed for requesting execution of the (III) assist pressure decreasing mode, that is, for setting the (II) assist pressure decreasing mode as a requested mode. After the process of step 334 is completed, the process of step 342 shown in FIG. 19 is performed.

On the other hand, if the condition of step 322 is not established, it can be determined that the driver does not intend to rapidly decrease the brake force. In this case, the process of step 336 is performed.

In step 336, it is determined whether or not the count value of the timer $T_{MODE}$ reaches a predetermined time $T_{MODE3}$. In the brake force control apparatus according to the present embodiment, the (VI) assist pressure moderately decreasing mode is achieved by alternatively repeating the assist pressure decreasing state and the assist pressure holding state. The predetermined time $T_{MODE3}$ is set to a period during which the brake force control apparatus should be maintained in the assist pressure decreasing state when execution of the (VI) assist pressure moderately decreasing mode is requested.

Accordingly, if it is determined, in step 336, that $T_{MODE} \geq T_{MODE3}$ is established, it can be determined that the period for maintaining the brake force control apparatus in the assist pressure decreasing state has ended, that is, a time for setting the brake force control apparatus in the assist pressure maintaining state has been reached. In this case, the process of step 338 is performed subsequent to step 336.

In step 338, the process is performed for requesting a continuous execution of the (IV) assist pressure holding mode, that is, for setting the (IV) assist pressure holding mode as a requested mode. After the process of step 338 is completed, the process of step 342 shown in FIG. 19 is performed.

On the other hand, if it is determined, in step 326, that $T_{MODE} \geq T_{MODE3}$ is not established, the period for maintaining the brake force control apparatus in the assist pressure decreasing state has not ended. In this case, the process of step 340 is performed subsequent to step 336.

In step 340, a process is performed for requesting a continuous execution of the (VI) assist pressure moderately decreasing mode, that is, for setting the (VI) assist pressure moderately decreasing mode as a requested mode. After the process of step 340 is completed, the process of step 342 shown in FIG. 19 is performed. According to the above-mentioned process, when the condition for requesting the (III) assist pressure decreasing mode (the condition of step 332) is not established after execution of the (VI) assist pressure moderately decreasing mode is requested, the requested mode can be changed to (IV) assist pressure holding mode after the request is maintained for the predetermined time $T_{MODE3}$.

As mentioned above, according to the present routine, a control mode to be performed next is determined based on the currently performed control mode and the brake operation by the driver, and the determined control mode can be set as a requested mode.

In step 342, it is determined whether or not execution of the (II) assist pressure increasing mode is requested. As a result, if it is determined that the (II) assist pressure increasing mode is requested, the process of step 344 is then performed.

In step 344, the flag XPAINC is turned on, and the flags corresponding to other control modes are turned off. When the process of step 344 is performed, it is determined in the subsequent cycle that the currently performed control mode is the (II) assist pressure increasing mode. After the process of step 344 is completed, the process of step 346 is performed.

In step 346, the brake force control apparatus is set in the assist pressure increasing state shown in FIG. 3. When the process of step 346 is performed, the wheel cylinder pressure $P_{W/C}$ of each wheel is rapidly increased by using the accumulator 28 as a fluid pressure. After the process of step 346 is completed; the routine is ended.

If it is determined, in step 342, that execution of the (II) assist pressure increasing mode is not requested, the process of step 348 is then performed.

In step 348, it is determined whether or not execution of the (III) assist pressure decreasing mode is requested. As a result, if it is determined that the (III) assist pressure decreasing mode is requested, the process of step 350 is then performed.

In step 350, the flag XPARED is turned on, and the flags corresponding to other control modes are turned off. When the process of step 350 is performed, it is determined in the subsequent cycle that the currently performed control mode is the (III) assist pressure decreasing mode. After the process of step 350 is completed, the process of step 352 is performed.

In step 352, the brake force control apparatus is set in the assist pressure decreasing state shown in FIG. 4. When the process of step 352 is performed, the wheel cylinder pressure $P_{W/C}$ of each wheel is rapidly decreased down to the master cylinder pressure $P_{M/C}$ as a lower limit. After the process of step 352 is completed, the routine is ended.

If it is determined, in step 348, that execution of the (III) assist pressure decreasing mode is not requested, the process of step 354 is then performed.

In step 354, it is determined whether or not execution of the (V) assist pressure moderately increasing mode is requested. As a result, if it is determined that the (V) assist pressure moderately increasing mode is requested, the process of step 356 is then performed.

In step 356, it is determined whether or not the requested mode is changed during a period from the immediately proceeding cycle to the present cycle. If it is determined that the requested ode is changed, it can be determined that the (V) assist pressure moderately increasing mode will be performed after the present cycle. In this case, the process of step 358 is performed. On the other hand, if it is determined that the requested mode is not changed in the period from the immediately preceding cycle to the present cycle, it can be determined that the (V) assist pressure moderately increasing mode has been performed from the immediately preceding cycle. In this case, the process of step 358 is skipped, and the process of step 358 is then performed.

In step 358, the current output signal pMC is stored as the start time master cylinder pressure pMCSTA, and the count value of the timer $T_{MODE}$ is cleared to "0". After the process of step 358 is completed, the process of step 360 is performed. According to the above process, the start time master cylinder pressure PSTA and the timer $T_{MODE}$ are cleared to the initial values every time when execution of the (V) assist pressure moderately increasing mode is started.

In step 360, the flag XPASLINC is turned on, and flags corresponding to other control modes are turned off. When the process of step 360 is performed, it is determined in the subsequent cycle that the currently performed control mode is the (V) assist pressure moderately increasing mode. After the process of step 360 is completed, the process of step 362 is then performed.

In step 362, the brake force control apparatus is set in the assist pressure increasing state shown in FIG. 3. After the process of step 362 is completed, the routine is ended. As mentioned above, in the present embodiment, the requested mode is changed to the (IV) assist pressure holding mode when the predetermined time $T_{MODE2}$ has elapsed after the (V) assist pressure moderately increasing mode is rendered to be the request mode. Thus, according to the above-mentioned process, the wheel cylinder pressure $P_{W/C}$ can be stepwise and moderately increased by the predetermined time $T_{MODE2}$ as a unit time every time when execution of the (V) assist pressure moderately increasing mode is requested.

If it is determined, in step 354, that (V) assist pressure moderately increasing mode is not requested, the process of step 364 is performed.

In step 364, it is determined whether or not execution of the (VI) assist pressure moderately decreasing mode is requested. If it is determined that execution of the (VI) assist pressure moderately decreasing mode is requested, the process of step 366 is then performed.

In step 366, it is determined whether or not the requested mode has been changed in the period from the immediately preceding cycle to the present cycle. If it is determined that the requested mode has been changed, it can be determined that the (VI) assist pressure moderately decreasing mode is performed after the present cycle. In this case, the process of step 368 is performed. On the other hand, if it is determined that the requested mode has not been changed during the period from the immediately preceding cycle to the present cycle, it can be determined that the (VI) assist pressure moderately decreasing mode has been performed from the preceding cycle. In this case, the process of step 368 is skipped, and the process of step 370 is then performed.

In step 368, similar to step 358, the current output signal pMC is memorized as the start time master output signal PMCSTA and the timer $T_{MODE}$ is cleared to "0". After the process of step 368 is completed, the process of step 370 is performed. According to the above-mentioned process, the start time master cylinder pressure PSTA and the timer $T_{MODE}$ can be cleared to the initial values every time when the (VI) assist pressure moderately increasing mode is started.

In step 370, the flag XPASLRED is tuned on, and the flags corresponding to other control modes are turned off. When the process of step 370 is performed, it is determined in the subsequent cycle that the currently performed control mode is the (VI) assist pressure moderately decreasing mode. After the process of step 370 is completed, the process of step 372 is performed.

In step 372, the brake force control apparatus is set in the assist pressure decreasing state shown in FIG. 5. After the process of step 372 is completed, the routine is ended. As mentioned above, in the present embodiment, the requested mode is changed to the (IV) assist pressure holding mode when the predetermined time $T_{MODE3}$ has elapsed after the (V) assist pressure moderately increasing mode is rendered to be the request mode. Thus, according to the above-mentioned process, the wheel cylinder pressure $P_{W/C}$ can be stepwise and moderately decreased by the predetermined time $T_{MODE2}$ as a unit time every time when execution of the (VI) assist pressure moderately decreasing mode is requested.

If it is determined, in step 364, that (VI) assist pressure moderately decreasing mode is not requested, it can be determined that execution of the (IV) assist pressure holding mode is requested. In this case, the process of step 374 is performed subsequent to step 364.

In step 374, it is determined whether or not the requested mode has been changed in the period from the immediately preceding cycle to the present cycle. If it is determined that the requested mode has been changed, it can be determined that the (IV) assist pressure holding mode is performed after the present cycle. In this case, the process of step 376 is performed. On the other hand, if it is determined that the requested mode has not been changed during the period from the immediately preceding cycle to the present cycle, it can be determined that the (IV) assist pressure holding mode has been performed from the preceding cycle. In this case, the process of step 376 is skipped, and the process of step 378 is then performed.

In step 376, similar to steps 358 and 368, the current output signal pMC is memorized as the start time output value pMCSTA and the timer $T_{MODE}$ are cleared to "0". After the process of step 376 is completed, the process of step 378 is performed. According to the above-mentioned process, the start time output value PMCSTA and the timer $T_{MODE}$ can be cleared to the initial values every time when the (IV) assist pressure holding mode is started.

In step 378, the flag XPAHOLD is tuned on, and the flags corresponding to other control modes are turned off. When the process of step 378 is finished, the present process cycle is ended.

When the flag XPAHOLD is turned on in step 378, it is determined in the subsequent cycle that the currently performed control mode is the (IV) assist pressure holding mode. The ECU 10 performs the process shown in FIG. 20 together with the above-mentioned process after it is determined that the currently performed control mode is the (IV) assist pressure holding mode.

Figure 20:
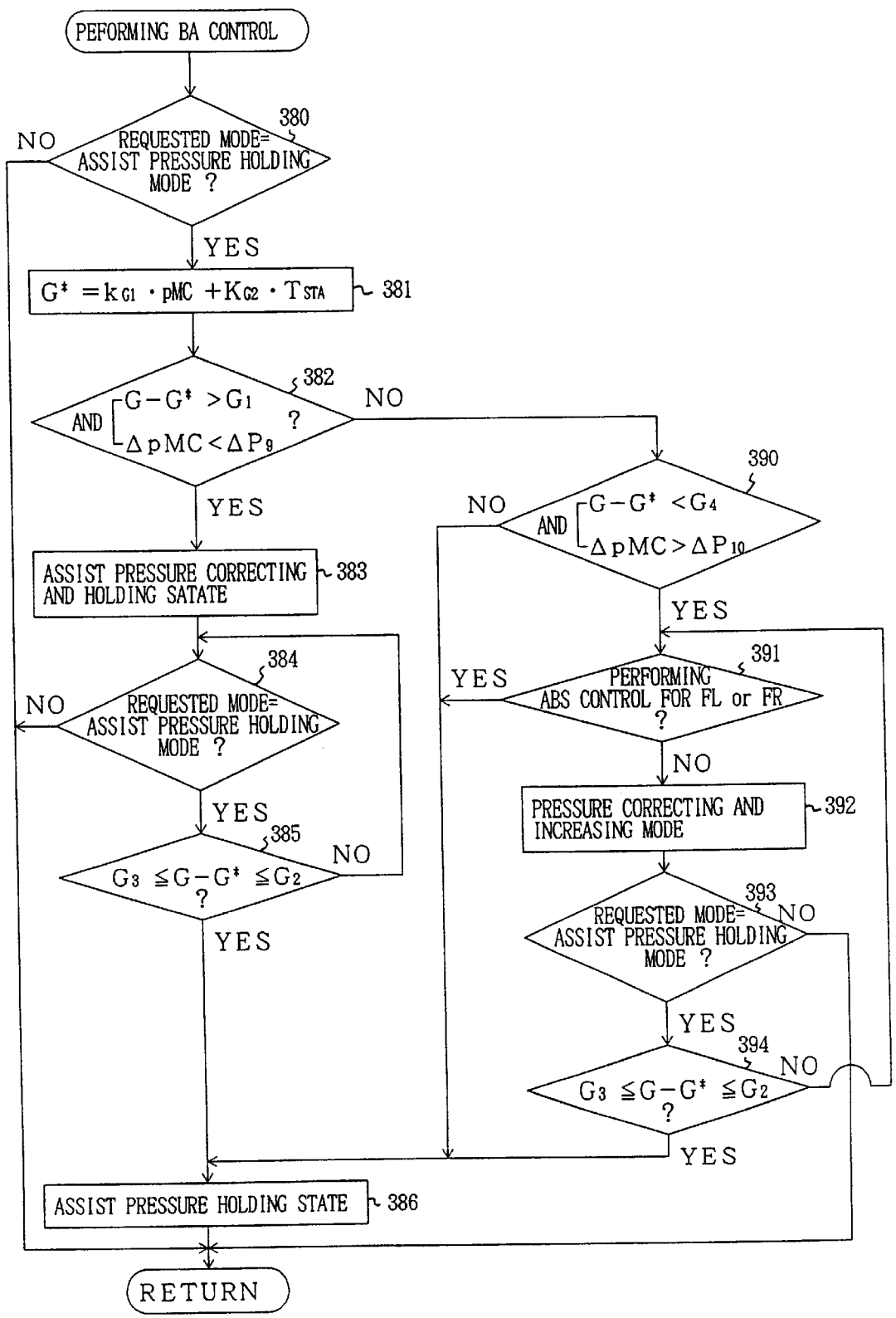
FIG. 20 is a flowchart of an example of a control routine performed to correct a brake fluid pressure to an appropriate fluid pressure in the brake force control apparatus according to the fifth embodiment of the present invention.

FIG. 20 is a flowchart of an example of a control routine performed by the ECU 10 so as to control the state of the brake force control apparatus when the assist pressure holding mode is the requested mode. The routine shown in FIG. 20 is repeatedly started during execution of the BA control. When the routine shown in FIG. 20 is started, the process of step 380 is performed first.

In step 380, it is determined whether or not the requested mode is the assist pressure holding mode. If it is determined that the requested mode is not the assist pressure holding mode, no process is performed thereafter, and the routine is ended. On the other hand, if it is determined that the requested mode is the assist pressure holding mode, then the process of step 381 and subsequent steps is performed.

As described above, the wheel cylinder pressure $P_{W/C}$ of each wheel may be excessively decreased due to a fluctuation generated in the master cylinder pressure $P_{W/C}$ during execution of the BA control according to the brake force control apparatus. Such a decrease in the master cylinder pressure $P_{M/C}$ can be cancelled by achieving the above-mentioned (VII) assist pressure correcting and increasing mode in a situation where it is requested to maintain the wheel cylinder pressure $P_{W/C}$ based on the master cylinder pressure $P_{M/C}$, that is, the assist pressure holding mode is requested as a requested mode.

Additionally, according to the brake force control apparatus, the wheel cylinder pressure $P_{W/C}$ of the ABS objective wheel may be excessively increased due to execution of the ABS ending control when the BA+ABS control is ended, as described above. Such an excessive increase in the wheel cylinder pressure $P_{W/C}$ can be prevented by achieving the above-mentioned (VIII) assist pressure correcting and holding mode in a situation where it is requested to maintain the brake fluid pressure by the BA control, that is, the assist pressure holding mode is requested as a requested mode.

In step 381 and the following steps, the process for achieving the above-mentioned (VII) assist pressure correcting or increasing mode and (VIII) assist pressure correcting and holding mode is performed if needed in a situation where the assist pressure holding mode is requested as a requested mode.

In step 381, the fluid pressure which is supplied to the wheel cylinders 120 to 126 of each wheel, that is, the target deceleration $G^*$ which is to be generated in the vehicle in correspondence with the wheel cylinder pressure $P_{W/C}$ of each wheel is calculated.

As described above, the brake force control apparatus increases the wheel cylinder pressure $P_{W/C}$ of each wheel to a pressure which is higher than the master cylinder pressure $P_{M/C}$ by the assist pressure Pa by performing the (I) start pressurizing mode after the BA control is started. Additionally, the brake force control apparatus controls the wheel cylinder pressure $P_{W/C}$ of each wheel so that the assist pressure Pa is maintained to be substantially constant during execution of the BA control.

In the present embodiment, there is a substantially proportional relationship between the pressure increasing time $T_{STA}$ during which the (I) start pressurizing mode is performed and the assist pressure Pa. Accordingly, the wheel cylinder pressure $P_{W/C}=P_{M/C}+Pa$ generated for each wheel can be represented by the following equation by using the output signal pMC representative of the wheel cylinder pressure $P_{W/C}$, the pressure increasing time $T_{STA}$, and a proportional factor $K_{PA}$:

$$P_{W/C}=pMC+K_{PA} \cdot T_{STA} \qquad (1)$$

A deceleration is generated in a vehicle in accordance with the wheel cylinder pressure $P_{W/C}$. Thus, the target deceleration $G^*$ can be represented by $G^*=K_G \cdot P_{W/C}$, where $K_G$ is a proportional factor. Accordingly, the target deceleration $G^*$ can be represented by the following equation by using the proportional factors $K_{G1}$, $K_{G2}$:

$$G^*=K_{G1} \cdot pMC+K_{G2} \cdot T_{STA} \qquad (2)$$

In step 381, the target deceleration $G^*$ is calculated by assigning the output signal pMC of the fluid pressure sensor 144 and the pressure increasing time $T_{STA}$ set in step 248 or 250 to the above-mentioned equation (2). When the process of step 381 is completed, the process of step 382 is then performed.

Figure 27:
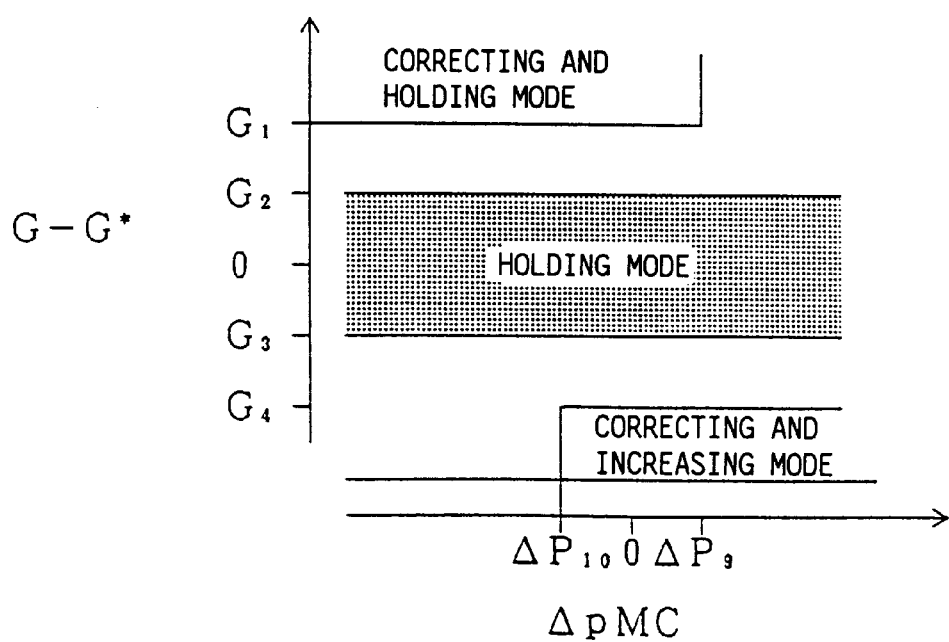
FIG. 27 is a table showing a control mode which is to be performed when an assist pressure correcting mode is set to be a requested mode in the brake force control apparatus according to a second embodiment of the present invention.

FIG. 27 shows an illustration for indicating a table representing a control mode to be performed when the requested mode is the assist pressure holding mode, in relation to ① a difference $G-G^*$ between the deceleration G which is actually generated in the vehicle and the target deceleration $G^*$ and ② the change rate $\Delta pMC$ of the output signal pMC. This table is hereinafter referred to as a correction table. In the present embodiment, a control mode which is to be set when the assist pressure holding mode is requested is determined in accordance with the correction table shown in FIG. 27 in the process of step 332 and subsequent steps.

In step 382, it is determined whether or not the difference $G-G^*$ between the deceleration detected by the deceleration sensor 146 and the target deceleration $G^*$ is greater than a predetermined positive value $G_1$ and the change rate $\Delta pMC$ is smaller than a predetermined positive value $\Delta P_0$. If it is determined that $G-G^*>G_1(>0)$ is established and that $\Delta pMC<\Delta P_0(>0)$ is established, it can be determined that an excessive deceleration is generated as compared to the target deceleration $G^*$ and that a brake operation which intends to increase the brake force is not performed by the driver. The above-mentioned conditions are established when an excessive wheel cylinder pressure $P_{W/C}$ is generated for any of the wheels due to, for example, execution of the ABS ending control. In this case, the process of step 383 is performed subsequent to step 382.

In step 383, a process is performed for achieving the (VIII) assist pressure correcting and holding mode, specifically, for setting the brake force control apparatus in the assist pressure correcting and holding state shown in FIG. 6. After the brake force control apparatus is set in the assist pressure correcting and holding state, the wheel cylinder pressure $P_{W/C}$ of each wheel is inhibited from being increased irrespective of the state of the holding solenoid valves S**H. When the process of step 383 is completed, the process of step 384 is then performed.

In step 384, it is determined whether or not the requested mode is maintained to be the assist pressure holding mode. If the requested mode is changed to a control mode other than the assist pressure holding mode, it can be determined that the driver has performed a brake operation which intends to increase or decrease the brake fluid pressure. In this case, the routine is immediately ended so as to reflect the brake operation in the brake fluid pressure. On the other hand, if the requested mode is maintained to be the assist pressure holding mode, the process of step 385 is then performed.

In step 385, it is determined whether or not the difference $G-G^*$ between the actual deceleration G and the target deceleration $G^*$ is greater than or equal to a predetermined negative value $G_3$ and smaller than or equal to a predetermined value $G_2$. If it is determined that $G_3G-G^* \leq G_2$ is not yet established, it can be determined that the wheel cylinder pressure $P_{W/C}$ of each wheel is not decreased to such a extent that a condition $G-G^* \leq G_2$ is established. In this case, the process of step 383 is performed again so as to continue to correct the wheel cylinder pressure $P_{W/C}$. On the other hand, if it is determined that the above-mentioned condition is established, it can be determined that the wheel cylinder pressure of each wheel has been corrected to an appropriate fluid pressure. In this case, the process of step 386 is performed.

In step 386, the brake force control apparatus is set in the assist pressure holding state shown in FIG. 4. After the brake force control apparatus is set in the assist pressure holding state, the wheel cylinder pressure $P_{W/C}$ can be increased for a wheel for which the holding solenoid valve S**H is set in the open state. When the process of step 386 is completed, the routine is ended.

The ECU 10 achieves the (VIII) assist pressure correcting and holding mode in the brake force control apparatus by performing the process of steps 383 to 385. According to the above-mentioned process, it is possible to prevent an excessive increase in the wheel cylinder pressure $P_{W/C}$ of any of the wheels which is caused by, for example, an interference between the BA control and the ABS control, and thus the driver's intention can be accurately reflected to the wheel cylinder pressure $P_{W/C}$ of each wheel.

If it is determined, after the routine is started, that the condition of step 382 is not established, the process of step 390 is performed subsequent to step 382.

In step 390, it is determined whether or not the difference $G-G^*$ between the actual deceleration G and the target deceleration $G^*$ is smaller than a predetermined negative value $G_4$ and the change rate $\Delta P_{M/C}$ of the output signal pMC is greater than a predetermined positive value $\Delta P_{10}$. If it is determined that $G-G^*<G_4(<0)$ is established and that $\Delta pMC>\Delta P_{10}(>0)$ is established, it can be determined that the actual deceleration is insufficient as compared to the target deceleration $G^*$ and that a brake operation is not performed by the driver which is intended to decrease the brake force. The above-mentioned condition is established when the wheel cylinder pressure $P_{W/C}$ of each wheel is excessively decreased due to a fluctuation of the master cylinder pressure $P_{M/C}$ during execution of the BA control. In this case, the process of step 391 is performed subsequent to step 390.

On the other hand, if it is determined, in step 390, that at least one of $G-G^*<G_4(<0)$ and $\Delta pMC>\Delta P_{10}(>0)$ is not established, it can be determined that the wheel cylinder pressure of each wheel is not needed to be increased. In this case, the process of step 386, that is, the process for setting the brake force control apparatus in the assist pressure holding state is performed, and then the routine is ended.

In step 391, it is determined that the ABS control is being performed with either of the front left or front right wheel FL, FR being the ABS objective wheel. If the ABS control is being performed with the front left or front right wheel FL, FR being the ABS objective wheel, it can be determined that the wheel cylinder pressure of each wheel has been sufficiently increased. In this case, the wheel cylinder pressure $P_{W/C}$ should not be increased even if the actual deceleration G is relatively small as compared to the target deceleration $G^*$. For this reason, if, in step 391, it is determined that the ABS control is being performed with the front left or front right wheel FL, FR being the ABS objective wheel, the process of step 386 is performed and then the routine is ended.

On the other hand, if neither of the front left nor right front wheel is the ABS objective wheel, it can be determined that the brake force can be increased by increasing the wheel cylinder pressure $P_{W/C}$ of each wheel. In this case, the process of step 392 is performed subsequent to step 391.

In step 392, a process is performed for achieving the (VII) assist pressure correcting and increasing mode, specifically, for repeatedly and alternately achieving the assist pressure increasing state shown in FIG. 3 and the assist pressure holding state shown in FIG. 4 with a predetermined period. When the above-mentioned process is performed, the wheel cylinder pressure of each wheel is moderately increased by using the accumulator 28 as a fluid pressure source. When the process of step 392 is completed, the process of step 393 is then performed.

In step 393, it is determined whether or not the requested mode is maintained to be the assist pressure holding mode. If the requested mode is changed to a control mode other than the assist pressure holding mode, it can be determined that a brake operation has been performed by the driver which intends to increase or decrease the brake fluid pressure. In this case, the routine is immediately ended so as to reflect the brake operation to the wheel cylinder pressure $P_{W/C}$. On the other hand, if the requested mode is maintained to be the assist pressure holding mode, the process of step 394 is performed.

In step 394, it is determined whether or not the difference $G-G^*$ between the actual deceleration G and the target deceleration $G^*$ is greater than or equal to a predetermined negative value $G_3$ and smaller than or equal to a predetermined positive value $G_2$. If it is determined that $G_3 \leq G-G^* \leq G_2$ is not yet established, it can be determined that the wheel cylinder pressure $P_{W/C}$ has not increased and corrected to such a extent that the condition $G_3 \leq G-G^*$ is established. In this case, the process of step 391 is performed again so as to continue to increase and correct the wheel cylinder pressure $P_{W/C}$. On the other hand, if it is determined that the above-mentioned condition is established, it can be determined that the wheel cylinder pressure $P_{W/C}$ of each wheel has been corrected to an appropriate fluid pressure. In this case, the process of step 386 is performed and then the routine is ended.

As described above, according to the brake force control apparatus of the present embodiment, it is possible to appropriately increase, decrease, or hold the wheel cylinder pressure of each wheel in response to a brake operation by the driver after the BA control (and the BA+ABS control) is started. In addition, it is possible to correct the wheel cylinder pressure $P_{W/C}$ so that the actual deceleration G is controlled to be a value near the target deceleration $G^*$. Thus, according to the brake force control apparatus, it is possible to extremely accurately generate a brake force to which the driver's intention is reflected after the emergency brake operation is performed by the driver.

In the above-mentioned embodiment, the deceleration sensor 146 corresponds to the "deceleration detecting means", the "difference detecting means" can be achieved by the ECU 10 calculating "$G^*-G$" in step 382, and the "fluid pressure control means" can be achieved by the ECU 10 performing the process of steps 382, 383, 385, 386, 390, 392, The brake force control apparatus according to the present embodiment is suitable for a brake force control apparatus used for a front-engine rear-drive automobile (FR automobile). The brake force control apparatus according to the present embodiment is controlled by an ECU 10. Similar to the above-mentioned first embodiment, the ECU 10 controls an operation of the brake force control apparatus by executing control routines shown in FIGS. 9 to 11 and 13 to 20.

The brake force control apparatus comprises a brake pedal 12. A brake switch 14 is provided near the brake pedal 12. The ECU 10 determined whether or not the brake pedal is depressed based on an output signal of the brake switch 14.

The brake pedal 12 is connected to a vacuum booster 400. The vacuum booster 400 generates an assist force Fa, which has a predetermined power ratio with respect to a brake pressing force F, when the brake pedal is depressed. A master cylinder 402 is fixed to the vacuum booster 400. The master cylinder 402 is of a tandem center valve type, and includes a first hydraulic pressure chamber 404 and a second hydraulic pressure chamber 406. The first hydraulic pressure chamber 404 and the second hydraulic pressure chamber 406 generate a master cylinder pressure $P_{M/C}$ corresponding to a combined force of the brake pressing force F and the assist force Fa.

A reservoir tank 408 is provided above the master cylinder 402. The reservoir tank 408 is connected to a front reservoir passage 410 and a rear reservoir passage 412. The front reservoir passage 410 is connected to a front reservoir cut solenoid valve 414 (hereinafter referred to as SRCF 414). Similarly, the rear reservoir passage 412 is connected to a rear reservoir cut solenoid valve 416 (hereinafter referred to as SRCR 416).

A front pump passage 418 is connected to SRCF 414. Similarly, a rear pump passage 420 is connected to SRCR 416. SRCF 414 is a two-position solenoid valve which disconnects the front reservoir passage 410 and the front pump passage 418 from each other by being turned off and connects them to each other by being turned on. SRCR 416 is a two-position solenoid valve which disconnects the rear reservoir passage 412 and the rear pump passage 420 from each other by being turned off and connects them to each other by being turned on.

A first fluid pressure passage 422 and a second fluid pressure passage 424 are connected to the first hydraulic pressure chamber 404 and the second hydraulic pressure chamber 406 of the master cylinder 402, respectively. The first fluid pressure passage 322 is connected to a right front master cut solenoid valve 326 (hereinafter referred to as SMFR 426) and a left master cut solenoid valve 428 (hereinafter referred to as SMFL 428). The second fluid pressure passage 422 is connected to a rear master cut solenoid valve 430 (hereinafter referred to as SMR 430).

SMFR 426 is connected to a fluid pressure passage 432 provided to a front right wheel FR. Similarly, SMFL 428 is connected to a fluid pressure passage 334 provided to a front left wheel FR. Additionally, SMR 430 is connected to a fluid pressure passage 436 provided to the rear left and rear right wheels RL and RR.

Constant pressure relief valves 438, 440 and 442 are provided inside SMFR 426, SMFL 428 and SMR 430, respectively. SMFR 426 is a two-position solenoid valve which connects the first fluid pressure passage 422 and the fluid pressure passage 432 to each other by being turned off and connects the first fluid pressure passage 422 and the fluid pressure passage 432 via the constant pressure relief valve 438 by being turned on. Additionally, SMFL 428 is a two-position solenoid valve which connects the first fluid pressure passage 422 and the fluid pressure passage 434 to each other by being turned off and connects the first fluid pressure passage 422 and the fluid pressure passage 434 via the constant pressure relief valve 440 by being turned on. Similarly, SMR 430 is a two-position solenoid valve which connects the second fluid pressure passage 424 and the fluid pressure passage 436 to each other by being turned off and connects the second fluid pressure passage 424 and the fluid pressure passage 436 via the constant pressure relief valve 432 by being turned on.

A check valve 444 is provided between the first fluid pressure passage 422 and the fluid pressure passage 432 so as to permit a flow of fluid only in a direction from the first fluid pressure passage 422 to the fluid pressure passage 432. Similarly, a check valve 446 is provided between the first fluid pressure passage 422 and the fluid pressure passage 434 so as to permit a flow of fluid only in a direction from the first fluid pressure passage 22 to the fluid pressure passage 434. Similarly, a check valve 448 is provided between the second fluid pressure passage 424 and the fluid pressure passage 436 so as to permit a flow of fluid only in a direction from the second fluid pressure passage 424 to the fluid pressure passage 436.

Similar to the above-mentioned first embodiment, the fluid pressure passages 432 and 434 provided to the front left and front right wheels and the fluid pressure passage 436 provided to the rear left and rear right wheels are connected to the holding solenoid valves SH, the pressure decreasing solenoid valves SR, the wheel cylinders 120 to 126 and the check valves 128 to 134. Additionally, a front pressure decreasing passage 450 is connected to the holding solenoid valves SFRR 112 and SFLR 114 of the front left and front right wheels. Further, a rear pressure decreasing passage 452 is connected to the holding solenoid valves SRRR 116 and SRLR 118 of the rear left and rear right wheels.

A front reservoir 454 and a rear reservoir 455 are connected to the front pressure decreasing passage 450 and the rear pressure decreasing passage 452, respectively. The front reservoir 454 and the rear reservoir 345 are connected to an inlet of the front pump 460 and an inlet of the rear pump 462 via check valves 456 and 458, respectively. An outlet of the front pump 460 and an outlet of the rear pump 462 are connected to dampers 464 and 466, respectively, so as to absorb pulsation of a discharge pressure. The damper 364 is connected to a front right pump passage 468 provided to the front right wheel FR and a front left pump passage 470 provided to the front left wheel FL. The damper 466 is connected to the fluid pressure passage 436.

The front right pump passage 468 is connected to the fluid pressure passage 432 via a front right pump solenoid valve 472 (hereinafter referred to as SPFL 472). Additionally, the front left pump passage 470 is connected to the fluid pressure passage 434 via a front left pump solenoid valve 474 (hereinafter referred to as SPFR 474). SPFL 472 is a two-position solenoid valve which connects the front right pump passage 368 and the fluid pressure passage 432 to each other by being turned off and disconnects them from each other by being turned on. Similarly, SPFR 474 is a two-position solenoid valve which connects the front left pump passage 470 and the fluid pressure passage 434 to each other by being turned off and disconnects them from each other by being turned on.

A constant pressure relief valve 476 is provided between the fluid pressure passage 432 and the front right pump passage 468 so as to permit a flow of fluid only in a direction from the fluid pressure passage 432 to the front right pump passage 468. A constant pressure relief valve 478 is provided between the fluid pressure passage 434 and the front left pump passage 470 so as to permit a flow of fluid only in a direction from the fluid pressure passage 434 to the front left pump passage 470.

The wheel speed sensors 136, 138, 140 and 142 are provided near the respective wheels. The ECU 10 detects rotational speed VW of each of the wheels based on the outputs of the wheel speed sensors 136 to 132. Additionally, a fluid pressure sensor 144 is provided to the second fluid pressure passage which is connected to the master cylinder 402. The ECU 10 detects the master cylinder pressure $P_{M/C}$ based on an output signal of the fluid pressure sensor 144.

A description will now be given of an operation of the brake force control apparatus according to the present embodiment. The brake force control apparatus according to the present embodiment achieves (1) a regular brake function, (2) an ABS function and (3) a BA function by operating various solenoid valves provided in the fluid circuit.

Figure 28:
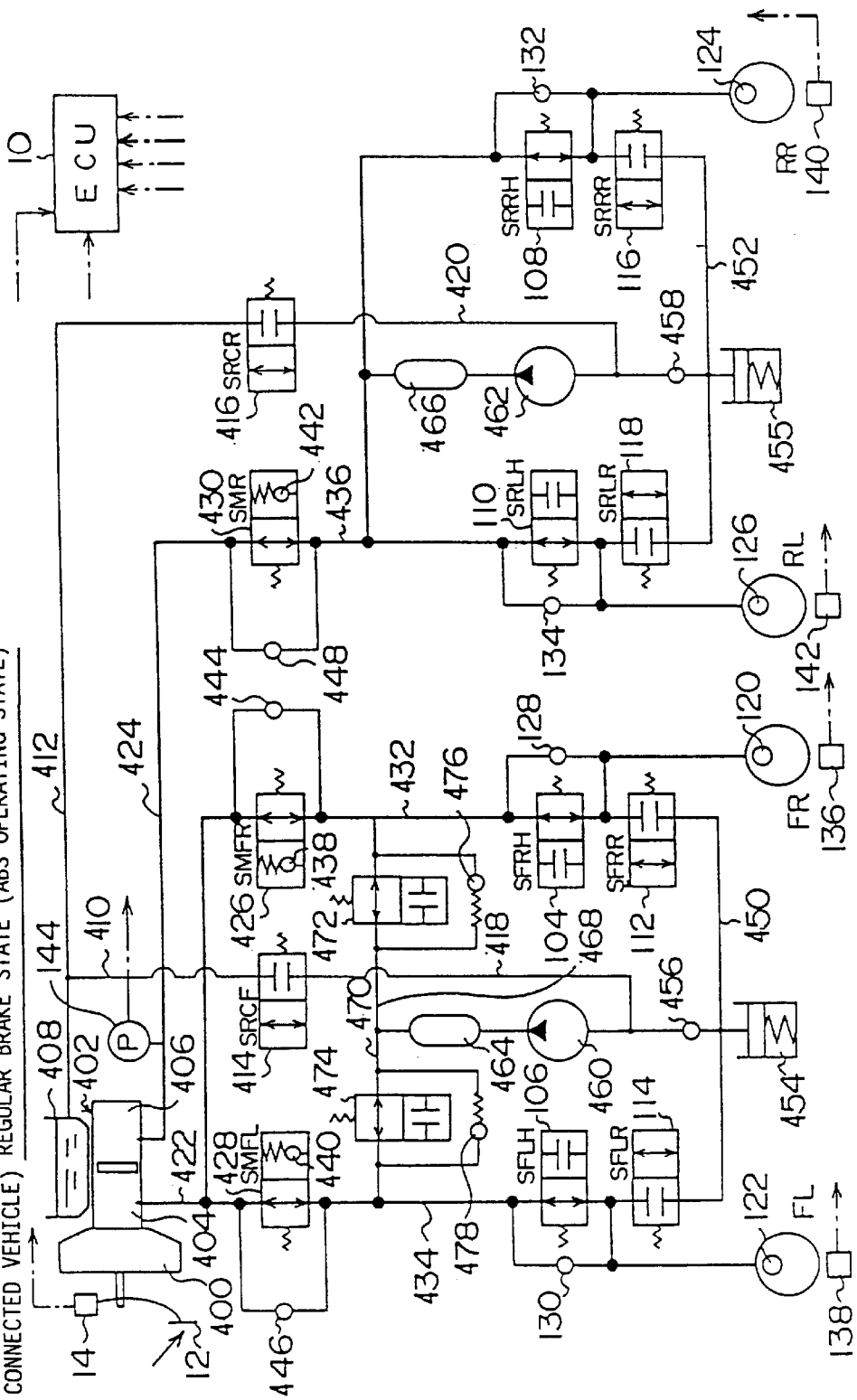
FIG. 28 is a system structure diagram showing a regular brake state and an ABS operating state of a brake force control apparatus according to a second embodiment of the present invention.

The (1) regular brake function is achieved by turning off all of the solenoid valves provided in the brake force control apparatus as shown in FIG. 28. Hereinafter a state shown in FIG. 28 is referred to as a regular brake state. Additionally, a control for achieving the regular brake function in the brake force control function is referred to as a regular brake control.

In the regular brake state shown in FIG. 28, both the wheel cylinders 120 and 122 of the front left and front right wheels FL and FR are connected to the first hydraulic pressure chamber 404 of the master cylinder 302 via the first fluid pressure passage 422. Additionally, both the wheel cylinders 124 and 126 of the rear left and rear right wheels RL and RR are connected to the second hydraulic pressure chamber 406 of the master cylinder 402 via the second fluid pressure passage 424. In this case, the wheel cylinder pressure $P_{W/C}$ of the wheel cylinders 120 to 126 is controlled to be always equal to the master cylinder pressure $P_{M/C}$. Accordingly, the regular brake function can be achieved in the state shown in FIG. 28.

The (2) ABS function can be achieved by turning on the front pump 460 and the rear pump 462 and operating the holding solenoid valves SH and the pressure decreasing solenoid valves SR in response to requirements by the ABS. Hereinafter, a control to achieve the ABS function in the brake force control apparatus is referred to as ABS control.

The ECU 10 starts the ABS control when the vehicle is in a braking state and an excessive slip rate is detected in any one of the wheels. The ABS control is started in a condition where the brake pedal 12 is depressed, that is, in a condition where the master cylinder 302 is generating the master cylinder pressure $P_{M/C}$ which is a high pressure.

During execution of the ABS control, the master cylinder pressure $P_{M/C}$ is introduced into the fluid pressure passages 332 and 334 provided to the front right and front left wheels and the fluid pressure passage 336 provided to the rear left and rear right wheels. Accordingly, in this condition, if the holding solenoid valves SH are open and the pressure decreasing solenoid valves SR are closed, the wheel cylinder pressure $P_{W/C}$ for each of the wheels can be increased. Hereinafter, this state is referred to as (i) a pressure increasing mode.

Additionally, the wheel cylinder pressure $P_{W/C}$ for each wheel can be maintained by closing both the holding solenoid valves SH and the pressure decreasing solenoid valves SR while the ABS control is performed. Hereinafter, this state is referred to as (ii) a holding mode. Further, the wheel cylinder pressure $P_{W/C}$ for each wheel can be decreased by closing the holding solenoid valves SH and opening the pressure decreasing solenoid valves SR while the ABS control is performed. Hereinafter, this state is referred to as (iii) a pressure decreasing mode.

The ECU 10 controls the holding solenoid valves SH and the pressure decreasing solenoid valves SR so that the above-mentioned (i) pressure increasing mode, (ii) holding mode or (iii) pressure increasing mode is appropriately achieved in response to a slip state of each wheel while the ABS control is performed. When the holding solenoid valves SH and the pressure decreasing solenoid valves SR are controlled as mentioned above, the wheel cylinder pressure $P_{W/C}$ for each of the wheels is controlled to be a pressure which does not generate an excessive slip rate in the respective wheels. Thus, according to the above-mentioned control, the ABS function can be achieved in the brake force control apparatus.

The ECU 10 ends the ABS control and sets the brake force control apparatus in the regular brake state in a case where execution of the ABS control is no longer required for each of the wheels, such as when the vehicle has moved from a high friction road to a low friction road. During execution of the ABS control, the wheel cylinder pressure $P_{W/C}$ of the ABS objective wheel is controlled to be lower than the master cylinder pressure $P_{M/C}$. Thus, if the regular brake state is achieved immediately after the condition for ending the ABS control is established, there is a rapid change in the wheel cylinder pressure $P_{W/C}$ of the ABS objective wheel.

In order to avoid such a rapid change in the wheel cylinder pressure $P_{W/C}$, when the condition for ending the ABS control is established, the ECU 10 performs an ABS ending control which operates the holding solenoid valves SH and the pressure decreasing solenoid valves SR so that (i) the pressure increasing mode and the (ii) the holding mode are alternately set for the ABS objective wheel for a predetermined period. According to the ABS ending control the wheel cylinder pressure $P_{W/C}$ of the ABS objective wheel can be moderately increased to a value equal to the master cylinder pressure $P_{M/C}$. Thus, according to the brake force control apparatus of the present embodiment, it is possible to end the ABS control without generating a rapid change in the wheel cylinder pressure $P_{W/C}$ of the ABS objective wheel.

During execution of the ABS control, the brake fluid in the wheel cylinders 120 to 126 enters the front reservoir 454 and the rear reservoir 455 through the front pressure decreasing passage 450 and the rear pressure decreasing passage 452. The brake fluid entering the front reservoir 454 and the rear reservoir 455 is pumped up by the front pump 460 and the rear pump 462, and is supplied to the fluid pressure passages 432, 434 and 436.

A part of the brake fluid supplied to the fluid pressure passages 432, 434 and 436 enters the wheel cylinders 120 to 126 when the pressure increasing mode is achieved. Additionally, the remainder of the brake fluid flows into the master cylinder 402 so as to compensate for the brake fluid which has flowed out. Thus, according to the present embodiment, an excessive travel of the brake pedal 12 is not generated during the ABS control.

Figure 29:
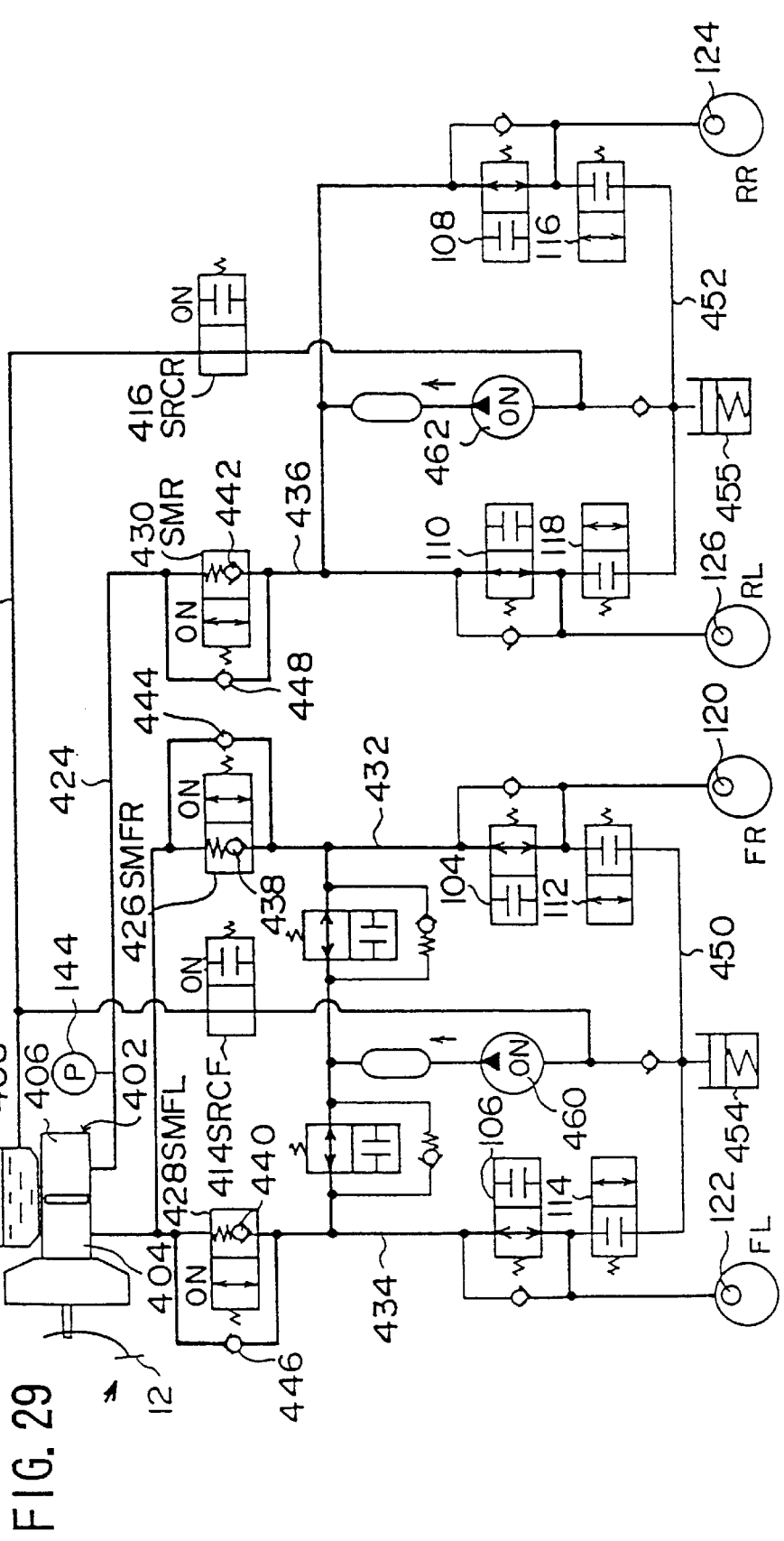
FIG. 29 is an illustration showing an assist pressure increasing state of the brake force control apparatus according to the second embodiment of the present invention which is achieved during execution of the BA control.
Figure 30:
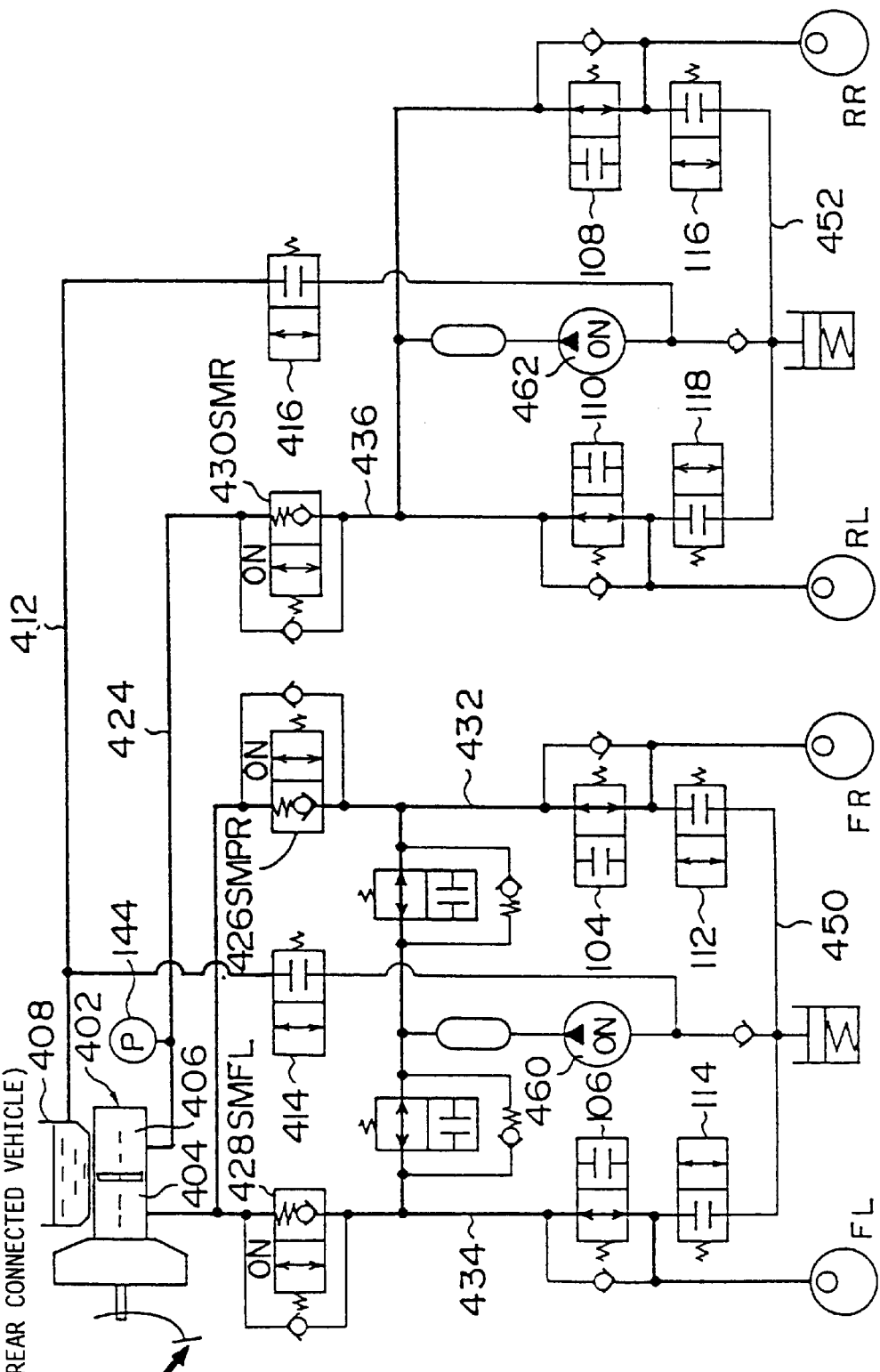
FIG. 30 is an illustration showing an assist pressure holding state of the brake force control apparatus according to the second embodiment of the present invention which is achieved during execution of the BA control.
Figure 31:
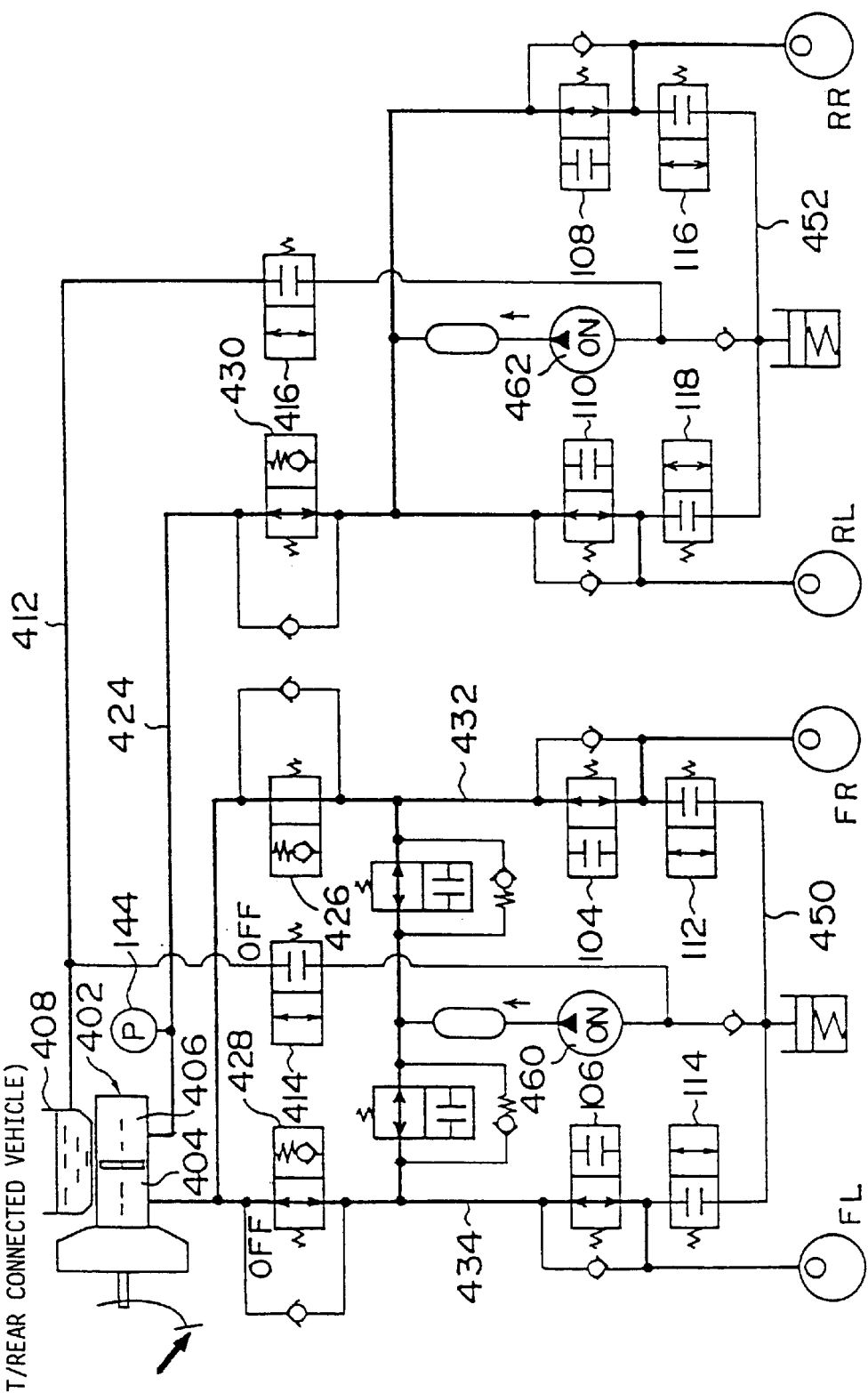
FIG. 31 is an illustration showing an assist pressure decreasing state of the brake force control apparatus according to the second embodiment of the present invention which is achieved during execution of the BA control or the BA+ABS control.

FIGS. 29 to 31 show a state of the brake force control apparatus to achieve the (3) BA function. The ECU achieves the BA function by setting, if necessary, the state shown in FIGS. 29 to 31 after a brake operation for requesting a rapid increase in the brake force is performed by the driver, that is, after an emergency brake operation is performed. Hereinafter, a control for achieving the BA function in the brake force control apparatus is referred to as BA control.

FIG. 29 shows the assist pressure increasing state which is set during execution of the BA control. The assist pressure increasing state is set when the wheel cylinder pressure $P_{W/C}$ of each wheel is needed to be increased during execution of the BA control, that is, when execution of one of (I) start pressurizing mode, (II) assist pressure increasing mode, (III) assist pressure decreasing mode and (V) assist pressure moderately increasing mode is requested.

In the system according to the present embodiment, as shown in FIG. 29, the assist pressure increasing state can be archived by turning on the reservoir cut solenoid valves SRCF 414 and SRCR 416 and the master cut solenoid valves SMFR 426, SMFL 428 and SMR 430 and also turning on the front pump 460 and the rear pump 462.

When the assist pressure increasing state shown in FIG. 29 is set, the brake fluid stored in the reservoir tank 408 is pumped up by the front pump 460 and the rear pump 462, and is supplied to the fluid pressure passages 432, 434 and 436. In the assist pressure increasing state, a flow of the brake fluid in a direction from the fluid pressure passages 432, 434 and 436 to the master cylinder 402 is prevented by SMFR 326, SMFL 328 and SMR 330 until the pressure within the fluid pressure passages 432, 434 and 436 exceeds a valve opening pressure of the constant pressure relief valves 438, 440 and 442 and becomes higher than the master cylinder pressure $P_{M/C}$.

Accordingly, after the assist pressure increasing state shown in FIG. 29 is set, a fluid pressure higher than the master cylinder pressure $P_{M/C}$ is generated in the fluid pressure passages 432, 434 and 436. In the assist pressure increasing state, the wheel cylinders 120 to 126 are connected to the respective fluid pressure passages 332, 334 and 336. Accordingly, after the assist pressure increasing state is set, the wheel cylinder pressure $P_{W/C}$ of each wheel is rapidly increased to a pressure exceeding the master cylinder pressure $P_{M/C}$ by using the front pump 460 and the rear pump 462 as a fluid pressure source.

In the assist pressure increasing state shown in FIG. 29, the fluid pressure passages 432, 434 and 436 are connected to the master cylinder 402 via check valves 444, 446 and 448, respectively. Thus, when the master cylinder pressure $P_{M/C}$ is higher than the wheel cylinder pressure of each wheel, the wheel cylinder pressure $P_{W/C}$ can be increased by using the master cylinder 402 as a fluid pressure source even in the assist pressure increasing state.

FIG. 30 shows the assist pressure holding state which is set during execution of the BA control. The assist pressure holding state is set when the wheel cylinder pressure $P_{W/C}$ of each wheel is needed to be maintained during execution of the BA control, that is, when execution of the (IV) assist pressure holding mode is requested. As shown in FIG. 30, the assist pressure holding state can be achieved by turning on the master cut solenoid valves SMFR 426, SMFL 428 and SMR 430.

In the assist pressure holding state shown in FIG. 30, the front pump 460 and the reservoir tank 408 are disconnected from each other by SRCF 414, and the rear pump 462 and the reservoir tank 408 are disconnected from each other by SRCF 416. Accordingly, in the assist pressure holding state, the brake fluid is not discharged from the front pump 460 and the rear pump 462 to the fluid pressure passages 432, 434 and 436. Additionally, in the assist pressure holding state shown in FIG. 30, the fluid pressure passages 432, 434 and 436 are substantially disconnected from the master cylinder 402 by SMFR 426, SMFL 424 and SMR 430. Thus, in the assist pressure holding state shown in FIG. 30, the wheel cylinder pressure $P_{W/C}$ of each wheel can be maintained at a constant value.

FIG. 31 shows the assist pressure decreasing state which is set during execution of the BA control. The assist pressure decreasing state is set when the wheel cylinder pressure $P_{W/C}$ of each wheel is needed to be decreased during execution of the BA control, that is, when execution of one of the (III) assist pressure decreasing mode and the (VI) assist pressure moderately decreasing mode is requested. As shown in FIG. 31, the assist pressure decreasing state can be achieved by turning off all of the solenoid valves.

In the assist pressure decreasing state shown in FIG. 31, the front pump 460 and the rear pump 462 are disconnected from the reservoir tank 408. Accordingly, the brake fluid is not discharged from the front pump 460 and the rear pump 462 to the fluid pressure passages 432, 434 and 436. Additionally, in the assist pressure decreasing state shown in FIG. 31, the wheel cylinders 120 to 126 of the wheels are connected to the respective fluid pressure passages 332, 334 and 336. Accordingly, when the assist pressure decreasing state is set, the wheel cylinder pressure $P_{W/C}$ of each wheel can be decreased down to the master cylinder pressure $P_{M/C}$ as a lower limit.

In the present embodiment, the ECU 10 achieves the BA function when an emergency brake operation is performed by combining the assist pressure increasing state, assist pressure holding state and the assist pressure decreasing state shown in FIGS. 29 to 31 as is in the above-mentioned first embodiment. Thus, according to the brake force control apparatus of the present embodiment, similar to the above-mentioned first embodiment, when an emergency brake operation is performed by the driver, a brake force conforming to the driver's intention can be immediately generated and the driver's intention can be reflected to the brake force during execution of the BA control.

In the brake force control apparatus according to the present embodiment, after the above-mentioned BA control is started, an excessive slip rate may be generated in any one of the wheels as the wheel cylinder pressure $P_{W/C}$ is rapidly increased. In such a case, the ECU 10 starts the BA+ABS control. A description will now be given, with reference to FIGS. 31 to 33, of an operation of the brake force control apparatus associated with the BA+ABS function.

After the BA+ABS control is started and when a brake operation to increase a brake force is performed by the driver, the brake force control apparatus according to the present embodiment attempts to control the wheel cylinder pressure $P_{W/C}$ for an ABS objective wheel to be at a pressure requested by the ABS control and to increase the wheel cylinder pressure $P_{W/C}$ of other wheels.

Figure 32:
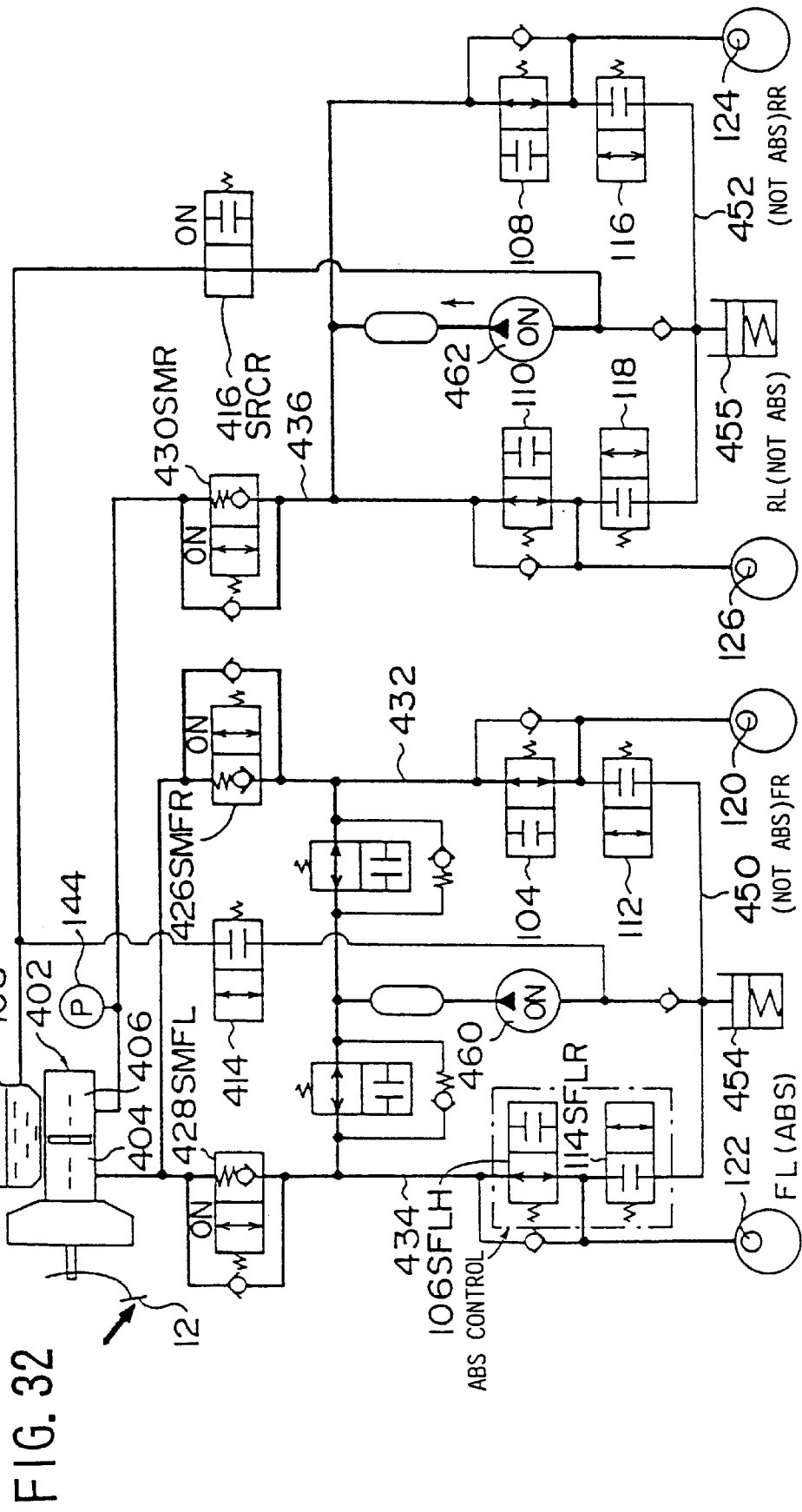
FIG. 32 is an illustration showing an assist pressure increasing state of the brake force control apparatus according to the second embodiment of the present invention which is achieved during execution of the BA+ABS control.

FIG. 32 shows a state which is set to achieve the above-mentioned function during execution of the BA+ABS control in which the front left wheel FL is the ABS objective wheel. Hereinafter, the state shown in FIG. 32 is referred to as an assist pressure increasing ABS state. The assist pressure increasing ABS state can be set by turning on the rear reservoir cut solenoid valve SRCR 416 and the master cur the master cut solenoid valves SMFR 426, SMFL 428 and SMR 430 and turning on the front pump 460 and the rear pump 462, and appropriately controlling, if necessary, the holding solenoid valve SFLH 106 and the pressure decreasing solenoid valve SFLR 114 corresponding to the front left wheel FL.

In the assist pressure increasing ABS state, similar to the assist pressure increasing state shown in FIG. 29, the brake fluid discharged from the rear pump 462 is supplied to the wheel cylinders 124 and 126 corresponding to the rear left and rear right wheels RL and RR. Accordingly, when the assist pressure increasing ABS state is set, the wheel cylinder pressure $P_{W/C}$ of the rear left and rear right wheels RL and RR is increased similar to the case in which the assist pressure increasing state is set during the BA control.

The BA+ABS control in which the front left wheel FL is set to be an ABS objective wheel is started by execution of the (ii) pressure decreasing mode for the front left wheel FL. Accordingly, the brake fluid enters the front reservoir 454 simultaneously when the BA+ABS control is started. In the assist pressure increasing ABS state shown in FIG. 29, the front pump 460 suctions and delivers the thus entering brake fluid in the front reservoir 454.

The brake fluid delivered by the front pump 460 is mainly supplied to the wheel cylinder 120 corresponding to the front right wheel FR, and is also supplied to the wheel cylinder 122 when the (i) pressure increasing mode is performed. According to the above control, the wheel cylinder pressure $P_{W/C}$ corresponding to the front right wheel FR can be increased similar to a case in which the assist pressure increasing state is set during the BA control, while the wheel cylinder pressure $P_{W/C}$ corresponding to the front left wheel FL is controlled to be an appropriate value so that an excessive slip rate is not generated in the front left wheel FL.

As mentioned above, according to the assist pressure increasing ABS state shown in FIG. 32, the wheel cylinder pressure $P_{W/C}$ for the front right wheel FR and the rear left and rear right wheels RL and RR which are not set as the ABS objective wheel can be rapidly increased as is in the case where the assist pressure increasing state is set during the BA control, while the wheel cylinder pressure $P_{W/C}$ for the front left wheel FL which is the ABS objective wheel is controlled to a pressure responding to a request by the ABS control.

After the BA+ABS control is started, the brake force control apparatus according to the present embodiment controls the wheel cylinder pressure $P_{W/C}$ corresponding to the ABS objective wheel to a pressure responding to the ABS control while an attempt is made to maintain the wheel cylinder pressure $P_{W/C}$ of other wheels.

Figure 33:
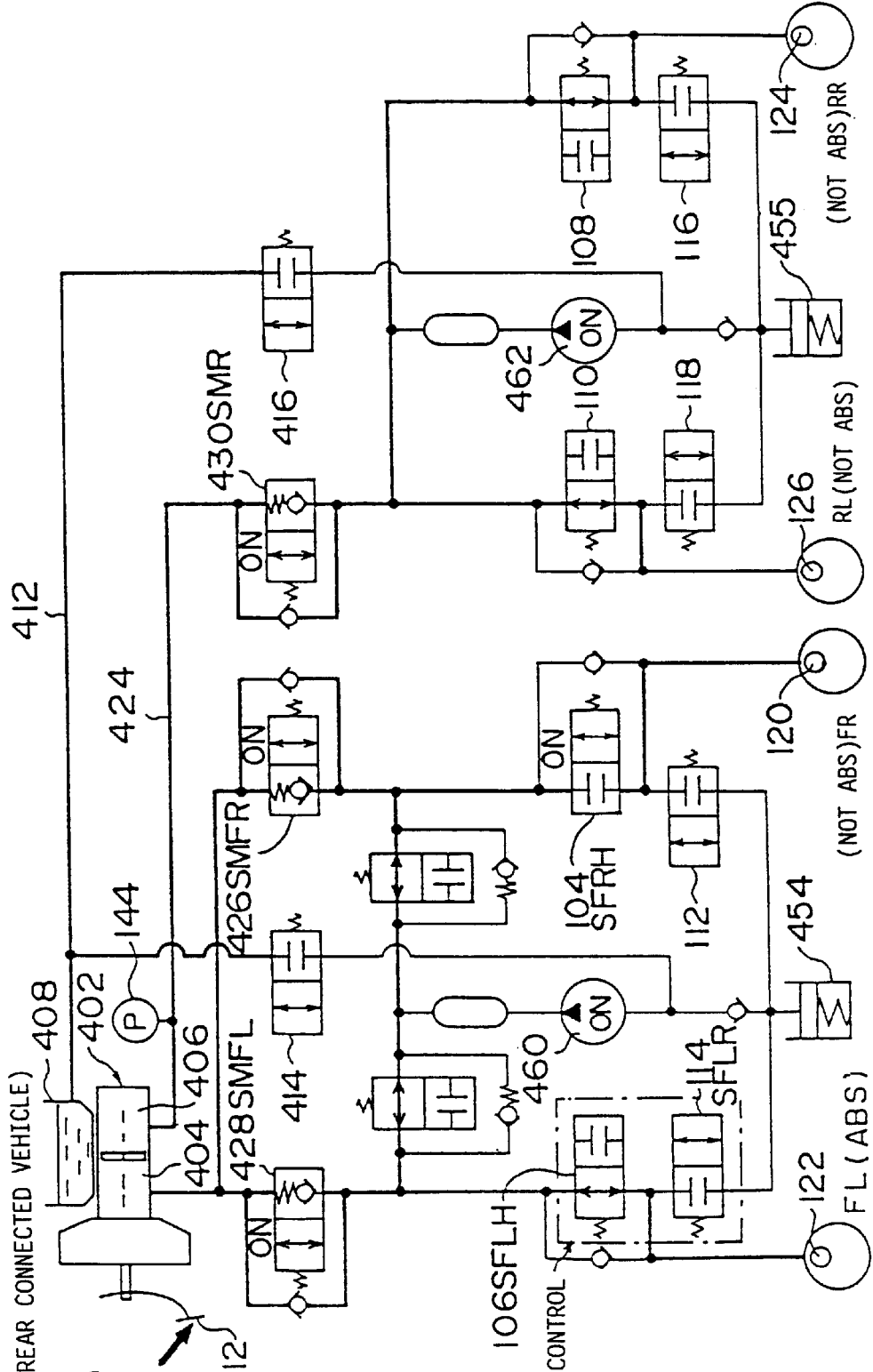
FIG. 33 is an illustration showing an assist pressure holding state of the brake force control apparatus according to the second embodiment of the present invention which is achieved during execution of the BA+ABS control.

FIG. 33 shows a state which is set to, achieve the above-mentioned function during execution of the BA+ABS control in which the front left wheel FL is set to the ABS objective wheel. Hereinafter, the state shown in FIG. 30 is referred to as an assist pressure holding ABS state. The assist pressure holding ABS state can be set by turning on the master cut solenoid valves SMFR 426, SMFL 428 and SMR 430, and turning on the front pump 460 and the rear pump 462, and turning on the holding solenoid valve SFRH 104 corresponding to the front right wheel FR, and appropriately controlling, if necessary, the holding solenoid valve SFLH 106 and the pressure decreasing solenoid valve SFLR 114 corresponding to the front left wheel FL.

In the assist pressure holding ABS state, similar to the assist pressure increasing state shown in FIG. 30, the rear pump 462 is disconnected from the reservoir tank 408. Additionally, the fluid pressure passage 430 is substantially disconnected from the master cylinder 402 as is in the case where the assist pressure holding state is set as shown in FIG. 30. Accordingly, when the assist pressure holding ABS state is set, the wheel cylinder pressure $P_{W/C}$ for the rear left and rear right wheels RL and RR is maintained at a constant value as is in the case where the assist pressure holding state is achieved during the BA control.

The brake fluid discharged from the wheel cylinder 122 is stored in the front reservoir 454 at the same time when the assist pressure holding ABS state is set or before the assist pressure holding ABS state is set. The front pump 460 suctions and delivers the brake fluid stored in the front reservoir 454 while the assist pressure holding ABS state is set.

In the assist pressure holding ABS state, the wheel cylinder 120 corresponding to the front right wheel FR is disconnected from the front pump 460 by SFRH 104. Thus, the brake fluid delivered by the front pump 460 is supplied only to the wheel cylinder 122 corresponding to the front left wheel FL. Additionally, a flow of the brake fluid from the front pump 460 to the wheel cylinder 122 is permitted only when the (i) pressure increasing mode is performed with respect to the front left wheel FL. According to the above control, the wheel cylinder pressure $P_{W/C}$ for the front right wheel FR is maintained at a constant value while the wheel cylinder pressure $P_{W/C}$ for the front left wheel FL is controlled to be an appropriate pressure which does not generate an excessive slip rate in the front left wheel FL.

As mentioned above, according to the assist pressure increasing ABS state shown in FIG. 33, the wheel cylinder pressure $P_{W/C}$ for the front right wheel FR and the rear left and rear right wheels RL and RR which are not the ABS objective wheels can be maintained at a constant value as is in the case where the assist pressure holding state is set during the BA control, while the wheel cylinder pressure $P_{W/C}$ for the front left wheel FL which is the ABS objective wheel is controlled to be an appropriate pressure responding to a request by the ABS control.

After the BA+ABS control is started, the brake force control apparatus according to the present embodiment controls the wheel cylinder pressure $P_{W/C}$ corresponding to the ABS objective wheel to a pressure responding to a request by the ABS control while an attempt is made to decrease the wheel cylinder pressure $P_{W/C}$ of other wheels.

The above-mentioned function can be achieved by appropriately controlling the holding solenoid valves SH and the pressure decreasing solenoid valves SR while the assist pressure decreasing state shown in FIG. 31 is achieved so that one of the (i) pressure increasing mode, the (Ii) holding mode and the (iii) pressure decreasing mode is achieved for the ABS objective wheel. Hereinafter, the state in which the above-mentioned control is performed is referred to as assist pressure decreasing ABS state.

That is, when the assist pressure decreasing ABS state is set, each of the holding solenoid valves is connected to the master cylinder 402. Accordingly, if the assist pressure decreasing ABS state is set, the wheel cylinder pressure $P_{W/C}$ corresponding to the wheels which are not the ABS objective wheel can be decreased down to the master cylinder as a lower limit. Additionally, as for the ABS objective wheel, the wheel cylinder pressure $P_{W/C}$ can be maintained or decreased by setting the (ii) holding mode or the (iii) pressure decreasing mode.

The assist pressure decreasing ABS state is set when the driver intends to decrease the brake force, that is, when there is no need to increase the wheel cylinder pressure $P_{W/C}$ for any one of wheels. Accordingly, the wheel cylinder pressure $P_{W/C}$ of the ABS objective wheel can be appropriately controlled to a pressure required by the BA+ABS control by achieving the (ii) holding mode and the (iii) pressure decreasing mode.

As mentioned above, according to the above-mentioned assist pressure decreasing ABS state, the wheel cylinder pressure $P_{W/C}$ for the front right wheel FR and the rear left and rear right wheels RL and RR which are not the ABS objective wheels can be decreased down to the master cylinder pressure $P_{M/C}$ as a lower limit as is in the case where the assist pressure decreasing state is set during the BA control, while the wheel cylinder pressure $P_{W/C}$ for the front left wheel FL which is the ABS objective wheel is controlled to be an appropriate pressure responding to a requested by the ABS control.

After start of the BA+ABS control, the ECU 10 ends the ABS control and starts the BA control independently in a case where execution of the ABS control is no longer required for each of the wheels, such as when the vehicle has moved from a high friction road to a low friction road. During execution of the ABS+BA control, the wheel cylinder pressure $P_{W/C}$ of the ABS objective wheel is controlled to be lower than the wheel cylinder pressure $P_{W/C}$ of the wheel which are not the ABS objective wheel. Thus, if the holding solenoid valve S**H for the ABS objective wheel is set in the open state immediately after the condition for ending the ABS control is established, there is a rapid change in the wheel cylinder pressure $P_{W/C}$ of the ABS objective wheel.

The rapid change generated in the wheel cylinder pressure of the ABS objective wheel can be prevented by performing the above-mentioned ABS ending control, that is, the control for operating the holding solenoid valve SH and the pressure decreasing solenoid valves SR so that the (i) pressure increasing mode and the (ii) holding mode are alternately achieved for the ABS objective wheel when the BA+ABS control is ended.

However, if the assist pressure holding state shown in FIG. 33 is set when the BA+ABS control is ended, the wheel cylinder pressure $P_{W/C}$ of only the ABS objective wheel is intermittently increased by means of the front pump 460 when the ABS ending control is performed. In this case, the wheel cylinder pressure $P_{W/C}$ of the ABS objective wheel may be excessively increased to a value exceeding the wheel cylinder pressure $P_{W/C}$ of the other wheels.

If the wheel cylinder $P_{W/C}$ of the ABS objective wheel is excessively increased at a time when the BA+ABS control is ended, as described above, a deceleration is generated in the vehicle which is excessively large as compared to a target deceleration which is to be generated. When such an excessively large value of the deceleration G is detected during execution of the BA control, the ECU 10 determines that the wheel cylinder pressure $P_{W/C}$ of any of the wheels is excessively increased and performs the (VIII) assist pressure correcting and holding mode.

In the brake force control apparatus of the present embodiment, the (VIII) assist pressure correcting and holding mode is achieved by closing all of the holding solenoid valves SH and the pressure decreasing solenoid valves SR in a situation where the (IV) assist pressure holding mode is set to be the requested mode. According to the (VIII) assist pressure correcting and holding mode, the wheel cylinder pressure $P_{W/C}$ of all of the wheels can be reliably inhibited from being increased. Thus, according to the brake force control apparatus of the present embodiment, it is possible to reliably prevent an excessive increase in the wheel cylinder pressure $P_{W/C}$ of the ABS objective wheel at a time when the BA+ABS control is ended.

As described above, the brake force control apparatus discharges the wheel cylinder pressure $P_{W/C}$ of each of the wheels into the master cylinder 402 by achieving the assist pressure decreasing state shown in FIG. 31 when a brake force operation which is intended to decrease the brake fluid pressure is performed, that is, when a pressure decreasing operation is performed during execution of the BA control or the BA+ABS control. During the process in which the wheel cylinder pressure $P_{W/C}$ of each of the wheels is discharged into the master cylinder 402, a fluctuation occurs in the pressure within the second fluid pressure passage 424, that is, the master cylinder pressure $P_{M/C}$. Accordingly, similar to the first embodiment, the wheel cylinder pressure $P_{W/C}$ of each of the wheels may excessively decreased after the assist pressure decreasing state is set in the brake force control apparatus of the present embodiment.

If the wheel cylinder pressure $P_{W/C}$ is excessively decreased during execution of the BA control, an adequate deceleration cannot be generated in the vehicle. When the deceleration G generated during execution of the BA control is smaller than the target deceleration G*, the ECU 10 determines that the wheel cylinder pressure $P_{W/C}$ of each of the wheels is excessively decreased and performing the (VII) assist pressure correcting and increasing mode by executing the control routine shown in FIG. 20.

In the present embodiment, the (VII) assist pressure correcting and increasing mode is achieved by alternately setting the assist pressure increasing state and the assist pressure holding state or by alternately setting the assist pressure increasing ABS state and the assist pressure holding ABS state in a situation where the (IV) assist pressure holding mode is set to be the requested mode. According to the assist pressure correcting and increasing mode, the wheel cylinder pressure $P_{W/C}$ of the wheels other than the ABS objective wheel can be increased and corrected to be an adequate fluid pressure. Thus, according to the brake force control apparatus of the present embodiment, it is possible to generate a wheel cylinder pressure $P_{W/C}$ to which the driver's intention is accurately reflected by correcting the excessive decrease in the wheel cylinder pressure $P_{W/C}$.

Figure 34:
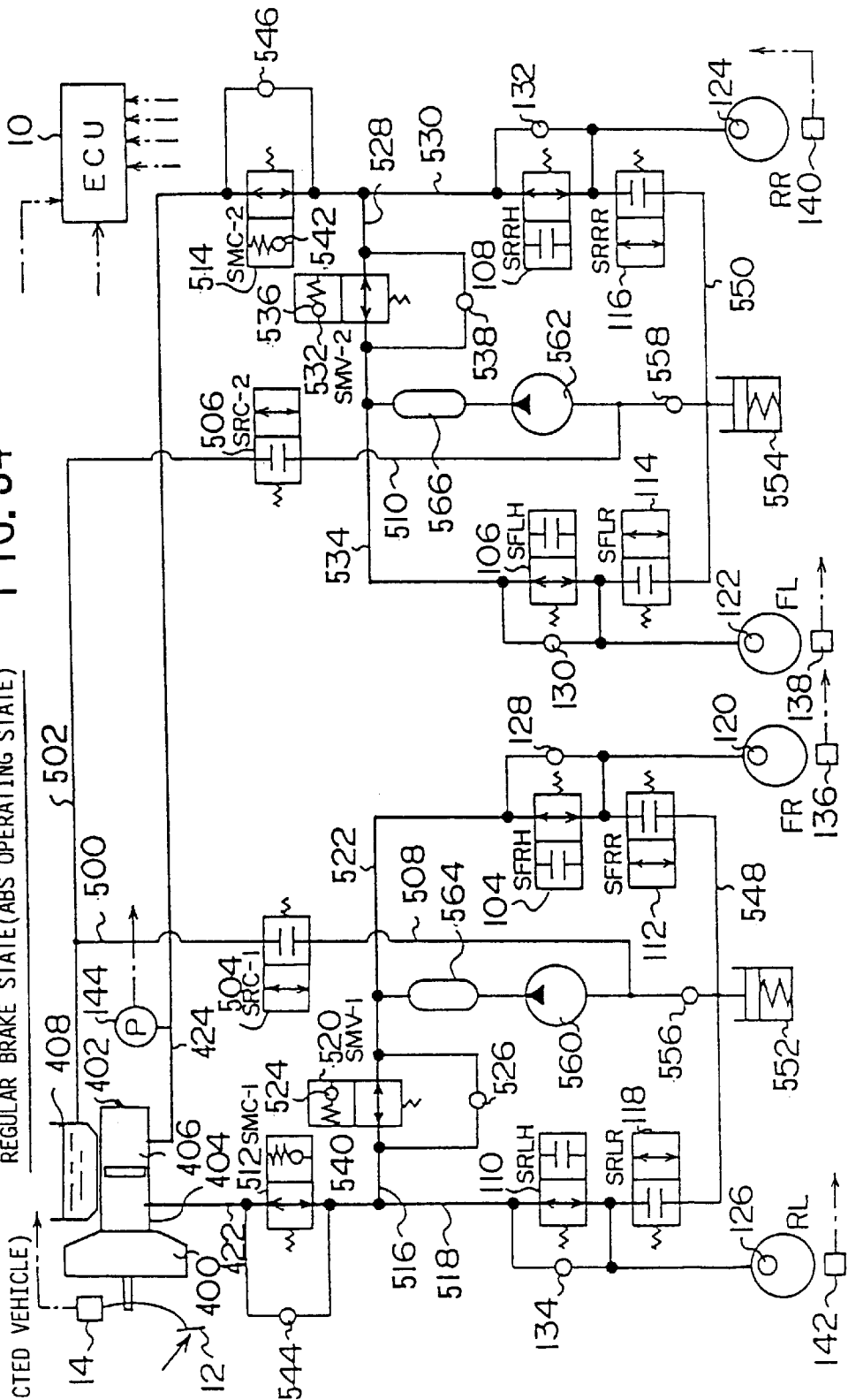
FIG. 34 is a system structure diagram showing a regular brake state and an ABS operating state of a brake force control apparatus according to a third embodiment of the present invention.

A description will now be given, with reference to FIGS. 34 to 39, of a third embodiment of the present invention. FIG. 34 shows a system structure diagram of a pump-up type brake force control apparatus (hereinafter simply referred to as a brake and 394.

Additionally, in the above-mentioned embodiment, the fluid pressure sensor 144 corresponds to the "amount of brake operation detecting means", the "target deceleration setting means" and the "assist deceleration adding means" can be achieved by the ECU 10 performing the process of step 381, and the "basic deceleration detecting means" can be achieved by the ECU 10 calculating "$K_{G1} \cdot pMC$" in step 381.

Further, in the above-mentioned embodiment, the "ABS mechanism" can be achieved by performing the ABS control in the brake force control apparatus, and the "pressure increasing inhibiting means" can be achieved by the ECU 10 performing the process of step 391.

Additionally, in the above-mentioned embodiment, the "fluid pressure control means" can be achieved by the ECU 10 performing the process of steps 382 to 394, the "pressure correcting and holding means" can be achieved by the ECU 10 performing the process of steps 382, 383, the "pressure correcting and holding interrupting means" can be achieved by the ECU 10 performing the process of step 384, the "pressure correcting and increasing means" can be achieved by the ECU 10 performing the process of steps 390 and 392, and the "pressure correcting and increasing interrupting means" can be achieved by the ECU 10 performing the process of step 393.

A description will now be given, with reference to FIGS. 28 to 33, of a second embodiment of the present invention. FIG. 28 shows a system structure diagram of a pump-up type brake force control apparatus (hereinafter simply referred to as a brake force control apparatus) according to the second embodiment of the present invention. In FIG. 10, parts that are the same as the parts shown in FIG. 1 are given the same reference numerals, and descriptions thereof will be omitted. force control apparatus) according to the third embodiment of the present invention. In FIG. 34, parts that are the same as the parts shown in FIG. 28 are given the same reference numerals, and descriptions thereof will be omitted.

The brake force control apparatus according to the present embodiment is suitable for a brake force control apparatus used for a front-engine front-drive automobile (FF automobile). The brake force control apparatus according to the present embodiment is controlled by an ECU 10. Similar to the above-mentioned first embodiment and the second embodiment, the ECU 10 controls an operation of the brake force control apparatus by executing control routines shown in FIGS. 9 to 11 and 13 to 20.

The brake force control apparatus comprises a brake pedal 12. A brake switch 14 is provided near the brake pedal 12. The ECU 10 determined whether or not the brake pedal is depressed based on an output signal of the brake switch 14.

The brake pedal 12 is connected to a vacuum booster 400. The vacuum booster 400 is fixed to a master cylinder 402. A first hydraulic pressure chamber 404 and a second hydraulic pressure chamber 406 are formed in the master cylinder 402. The master cylinder pressure $P_{M/C}$ is generated in the first hydraulic pressure chamber 404 and the second hydraulic pressure chamber 406, the master cylinder pressure $P_{M/C}$ corresponding to a combined force of a brake force F and an assist force Fa generated by the vacuum booster 400.

A reservoir tank 408 is provided above the master cylinder 402. The reservoir tank 408 is connected to a first reservoir passage 500 and a second reservoir passage 502. The first reservoir passage 500 is connected to a first reservoir cut solenoid valve 504 (hereinafter referred to as $SRC_{-1}$ 504). Similarly, the second reservoir passage 502 is connected to a second reservoir cut solenoid valve 506 (hereinafter referred to as $SRC_{-2}$ 506).

A first pump passage 508 is connected to $SRC_{-1}$ 504. Similarly, a second pump passage 510 is connected to $SRC_{-2}$ 506. $SRC_{-1}$ 504 is a two-position solenoid valve which disconnects the first reservoir passage 500 and the first pump passage 508 from each other by being turned off and connects them to each other by being turned on. $SRC_{-2}$ 506 is a two-position solenoid valve which disconnects the second reservoir passage 502 and the second pump passage 510 from each other by being turned off and connects them to each other by being turned on.

A first fluid pressure passage 422 and a second fluid pressure passage 424 are connected to the first hydraulic pressure chamber 404 and the second hydraulic pressure chamber 406 of the master cylinder 402, respectively. The first fluid pressure passage 422 is connected to a first master cut solenoid valve 512 (hereinafter referred to as $SMC_{-1}$ 512) and a second master cut solenoid valve 514 (hereinafter referred to as $SMV_{-2}$ 514).

$SMC_{-1}$ 512 is connected to a first pump pressure passage 516 and a fluid pressure passage 518 provided to a rear left wheel RL. The first pump pressure passage 516 is connected to a first pump solenoid valve 520 (hereinafter referred to as $SMV_{-1}$ 520). $SMV_{-1}$ 520 is connected to a fluid pressure passage 522 provided to the front right wheel FR. A constant pressure relief valve 524 is provided in $SMV_{-1}$ 520. $SMV_{-1}$ 520 is a two-position solenoid valve which connects the first pump pressure passage 516 and the fluid pressure passage 522 to each other by being turned off and disconnects them from each other by being turned on. A check valve 526 is provided between the first pump pressure passage 516 and the fluid pressure passage 522 so as to permit a flow of fluid only in a direction from the first pump pressure passage 516 and the fluid pressure passage 522.

$SMC_{-2}$ 514 is connected to a second pump pressure passage 528 and a fluid pressure passage 530 provided to a rear right wheel RR. The second pump pressure passage 528 is connected to a second pump solenoid valve 532 (hereinafter referred to as $SMV_{-2}$ 532). $SMV_{-2}$ 532 is connected to a fluid pressure passage 534 provided to the front left wheel FL. A constant pressure relief valve 536 is provided in $SMV_{-2}$ 532. $SMV_{-2}$ 532 is a two-position solenoid valve which connects the second pump pressure passage 528 and the fluid pressure passage 534 to each other by being turned off and disconnects them from each other by being turned on. A check valve 538 is provided between the second pump pressure passage 528 and the fluid pressure passage 534 so as to permit a flow of fluid only in a direction from the second pump pressure passage 528 and the fluid pressure passage 534.

Constant pressure relief valves 540 and 542 are provided inside $SMC_{-1}$ 512 and $SMC_{-2}$ 514, respectively. $SMC_{-1}$ 512 is a two-position solenoid valve which connects the first fluid pressure passage 422 and the fluid pressure passage 518 (and the first pump pressure passage 516) to each other by being turned off and connects them to each other via the constant pressure relief valve 540 by being turned on. $SMC_{-2}$ 514 is a two-position solenoid valve which connects the second fluid pressure passage 424 and the fluid pressure passage 530 (and the second pump pressure passage 518) to each other by being turned off and connects them to each other via the constant pressure relief valve 542 by being turned on.

A check valve 544 is provided between the first fluid pressure passage 422 and the fluid pressure passage 518 so as to permit a flow of fluid only in a direction from the first fluid pressure passage 422 to the fluid pressure passage 518. Similarly, a check valve 546 is provided between the second fluid pressure passage 424 and the fluid pressure passage 530 so as to permit a flow of fluid only in a direction from the second fluid pressure passage 424 to the fluid pressure passage 530.

Similar to the above-mentioned first and second embodiments, the fluid pressure passages 516, 522, 528 and 534 provided to the front left and front right wheels and the rear left and rear right wheels are connected to the holding solenoid valves SH, the pressure decreasing solenoid valves SR, the wheel cylinders 120 to 126 and the check valves 128 to 134. Additionally, a first pressure decreasing passage 548 is connected to the holding solenoid valves SFRR 112 and SRLR 118 of the front right and rear left wheels FR and RF. Further, a second pressure decreasing passage 550 is connected to the holding solenoid valves SFLR 114 and SRRRR 116 of the front left and rear right wheels FL and RR.

A first reservoir 552 and a second reservoir 550 are connected to the first pressure decreasing passage 548 and the second pressure decreasing passage 550, respectively. The first reservoir 552 and the second reservoir 554 are connected to an inlet of the first pump 560 and an inlet of the second pump 562 via check valves 556 and 558, respectively. An outlet of the first pump 560 and an outlet of the second pump 562 are connected to dampers 564 and 566, respectively, so as to absorb pulsation of a discharge pressure. The dampers 564 and 566 are connected to the fluid pressure passages 522 and 534, respectively.

The wheel speed sensors 136, 138, 140 and 142 are provided near the respective wheels. The ECU 10 detects rotational speed VW of each of the wheels based on the outputs of the wheel speed sensors 136 to 142. Additionally, a fluid pressure sensor 144 is provided to the second fluid pressure passage 424 which is connected to the master cylinder 402. The ECU 10 detects the master cylinder pressure $P_{M/C}$ based on an output signal of the fluid pressure sensor 144.

A description will now be given of an operation of the brake force control apparatus according to the present embodiment. The brake force control apparatus according to the present embodiment achieves (1) a regular brake function, (2) an ABS function and (3) a BA function by operating various solenoid valves provided in the fluid circuit.

The (1) regular brake function is achieved by turning off all of the solenoid valves provided in the brake force control apparatus as shown in FIG. 34. Hereinafter a state shown in FIG. 34 is referred to as a regular brake state. Additionally, a control for achieving the regular brake function in the brake force control apparatus is referred to as a regular brake control.

In the regular brake state shown in FIG. 34, the wheel cylinders 120 and 126 of the front right and rear left wheels FR and RL are connected to the first hydraulic pressure chamber 404 of the master cylinder 402 via the first fluid pressure passage 422. Additionally, the wheel cylinders 122 and 124 of the front left and rear right wheels FL and RR are connected to the second hydraulic pressure chamber 406 of the master cylinder 402 via the second fluid pressure passage 424. In this case, the wheel cylinder pressure $P_{W/C}$ of the wheel cylinders 120 to 126 is controlled to be always equal to the master cylinder pressure $P_{M/C}$. Accordingly, the regular brake function can be achieved in the state shown in FIG. 34.

The (2) ABS function can be achieved by turning on the first pump 560 and the second pump 562 and operating the holding solenoid valves SH, and the pressure decreasing solenoid valves SR in response to requirements by the ABS. Hereinafter, a control to achieve the ABS function in the brake force control apparatus is referred to as ABS control.

During execution of the ABS control, the master cylinder pressure $P_{M/C}$ is introduced into the four fluid pressure passages 518, 522, 528 and 534 provided to the front right and front left wheels and the rear left and rear right wheels. Accordingly, in this condition, if the holding solenoid valves SH are open and the pressure decreasing solenoid valves SR are closed, the wheel cylinder pressure $P_{W/C}$ for each of the wheels can be increased. Hereinafter, this state is referred to as (i) pressure increasing mode.

Additionally, the wheel cylinder pressure $P_{W/C}$ for each wheel can be maintained by closing both the holding solenoid valves SH and the pressure decreasing solenoid valves SR while the ABS control is performed. Hereinafter, this state is referred to as (ii) holding mode. Further, the wheel cylinder pressure $P_{W/C}$ for each wheel can be decreased by closing the holding solenoid valves SH and opening the pressure decreasing solenoid valves SR while the ABS control is performed. Hereinafter, this state is referred to as (iii) pressure decreasing mode.

The ECU 10 controls the holding solenoid valves SH and the pressure decreasing solenoid valves SR so that the above-mentioned (i) pressure increasing mode, (ii) holding mode and (iii) pressure increasing mode are achieved, if necessary, in response to a slip state of each wheel while the ABS control is performed. When the holding solenoid valves SH and the pressure decreasing solenoid valves SR are controlled as mentioned above, the wheel cylinder pressure $P_{W/C}$ for each of the wheels is controlled to be a pressure which does not generate an excessive slip rate in the respective wheels. Thus, according to the above-mentioned control, the ABS function can be achieved in the brake force control apparatus.

The ECU 10 ends the ABS control and sets the brake force control apparatus in the regular brake state in a case where execution of the ABS control is no longer required for each of the wheels, such as when the vehicle has moved from a high friction road to a low friction road. When the condition for ending the ABS control is established, the ECU 10 performs the ABS ending control, that is the control for operating the holding solenoid valve SH and the pressure decreasing solenoid valve SR so that the (i) pressure increasing mode and the (ii) holding mode are alternately achieved for the ABS objective wheel for a predetermined period. Thus, according to the brake force control apparatus of the present embodiment, it is possible to end the ABS control without generating a rapid change in the wheel cylinder pressure $P_{W/C}$ of the ABS objective wheel.

When the pressure decreasing mode is performed during execution of the ABS control, the brake fluid stored in the wheel cylinders 120 to 126 flows into the first reservoir 522 and the second reservoir 554 through the first pressure decreasing passage 548 and the second pressure decreasing passage. The brake fluid which has entered the first reservoir 552 and the second reservoir 554 is pumped up by the first pump 560 and the second pump 562, and is supplied to the fluid pressure passages 522, 534.

A part of the brake fluid supplied to the fluid pressure passages 522, 534 flows into the wheel cylinders 120 to 126 when the (i) pressure increasing mode is performed for each of the wheels. The remainder of the brake fluid flows into the master cylinder 402 so as to compensate for the brake fluid which has flowed out. Thus, according to the system of the present embodiment, an excessive stroke of the brake pedal is not generated during execution of the ABS control.

Figure 35:
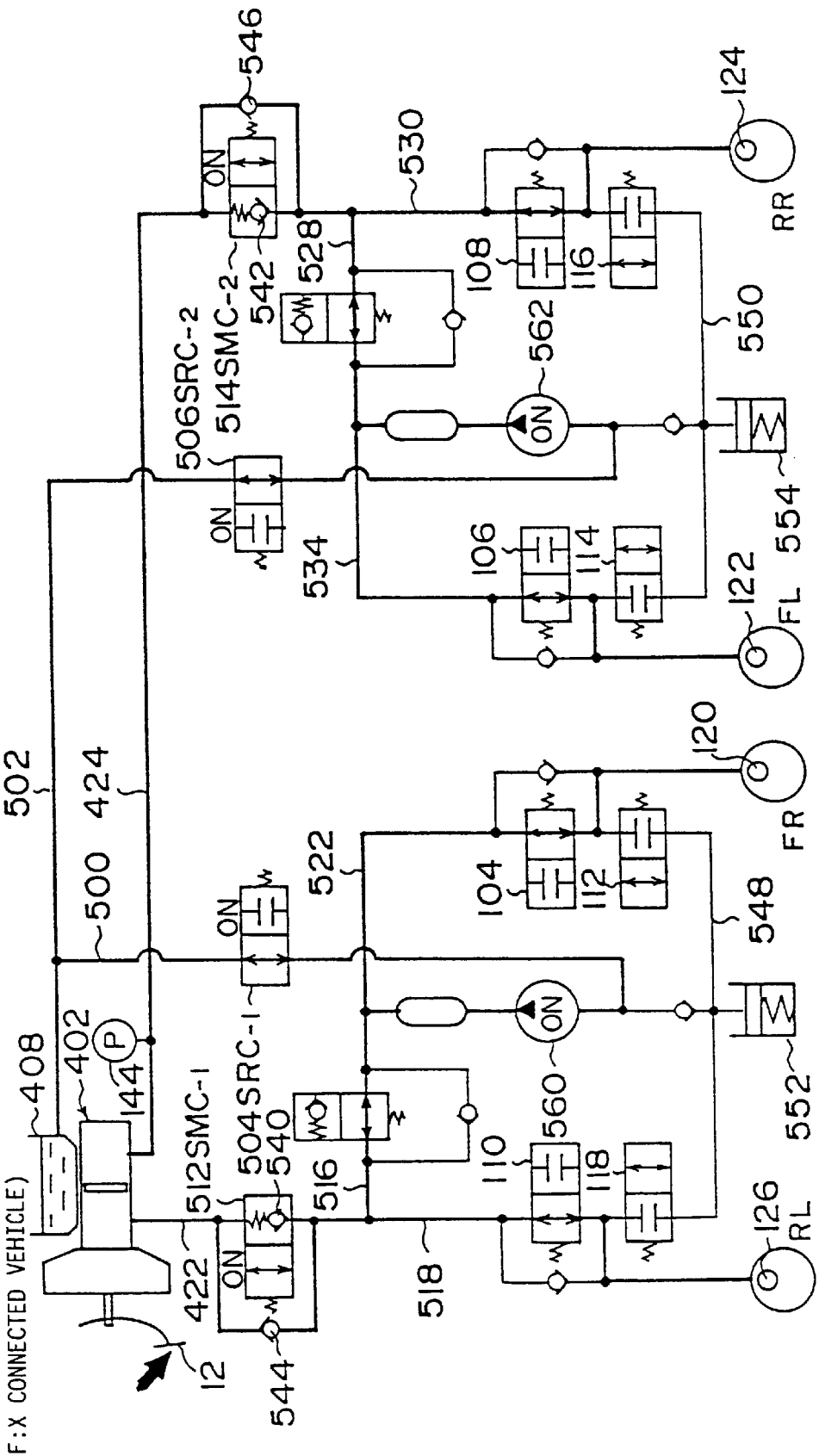
FIG. 35 is an illustration showing an assist pressure increasing state of the brake force control apparatus according to the third embodiment of the present invention which is achieved during execution of the BA control.
Figure 37:
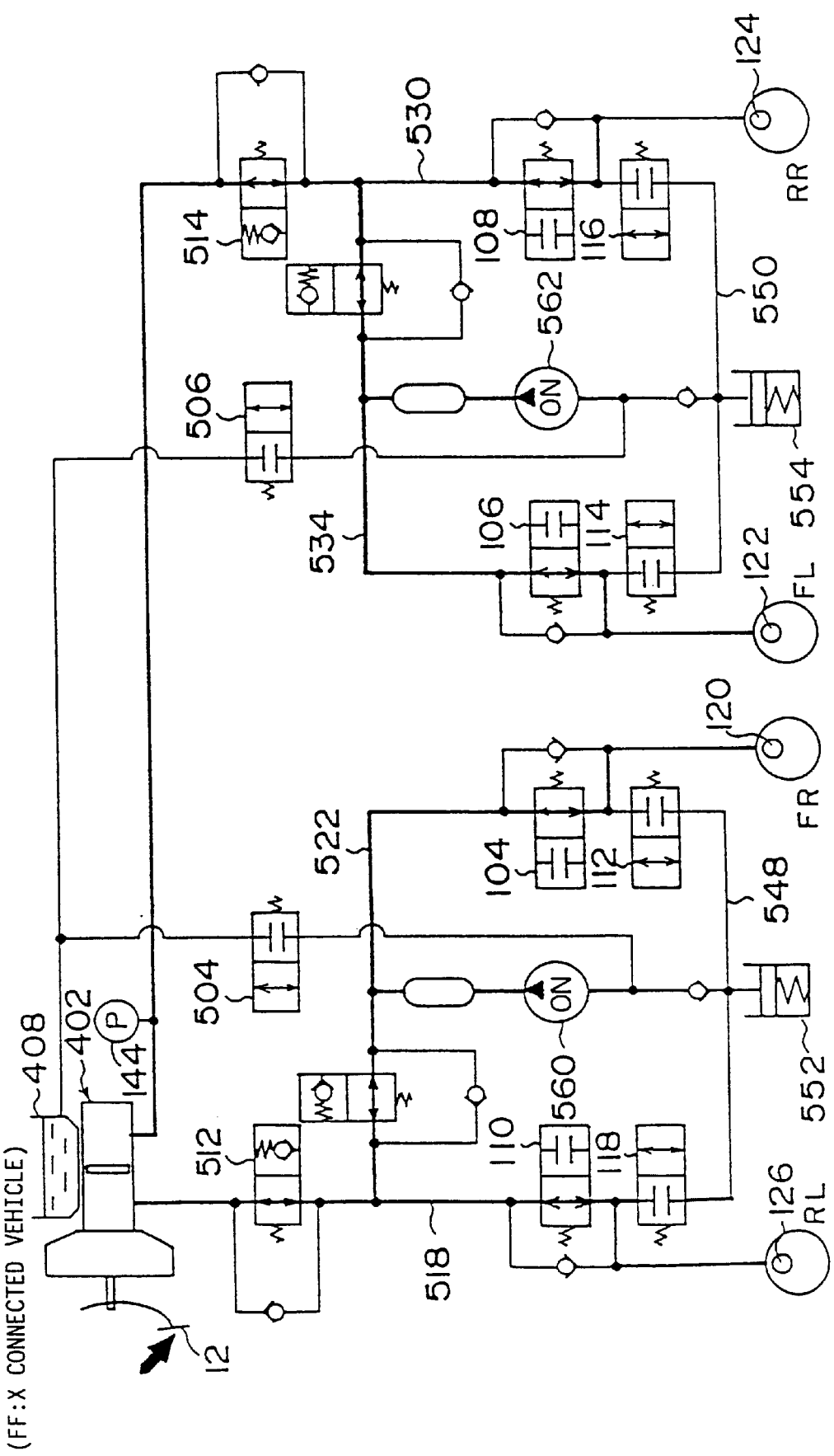
FIG. 37 is an illustration showing an assist pressure decreasing state of the brake force control apparatus according to the third embodiment of the present invention which is achieved during execution of the BA control or the BA+ABS control.

FIGS. 35 to 37 show a state of the brake force control apparatus to achieve the ③ BA function. The ECU achieves the BA function by setting, if necessary, the state shown in FIGS. 35 to 37 after a brake operation for requesting a rapid increase in the brake force is performed by the driver, that is, after an emergency brake operation is performed. Hereinafter, a control for achieving the BA function in the brake force control apparatus is referred to as BA control.

FIG. 35 shows the assist pressure increasing state which is set during execution of the BA control. The assist pressure increasing state is set when the wheel cylinder pressure $P_{W/C}$ of each wheel is needed to be increased during execution of the BA control, that is, when execution of one of (I) start pressurizing mode, (II) assist pressure increasing mode, (III) assist pressure decreasing mode and (V) assist pressure moderately increasing mode is requested.

In the system according to the present embodiment, as shown in FIG. 35, the assist pressure increasing state can be archived by turning on the reservoir cut solenoid valves $SRC_{-1}$ 504 and $SRC_{-2}$ 506 and the master cut solenoid valves $SMC_{-1}$ 512 and $SMC_{-2}$ 514 and also turning on the first pump 560 and the second pump 562.

When the assist pressure increasing state is set during execution of the BA control, the brake fluid stored in the reservoir tank 408 is pumped up by the first pump 560 and the second pump 562, and is supplied to the fluid pressure passages 522 and 534. In the assist pressure increasing state, the fluid pressure passage 522 is connected to each of the wheel cylinder 120 of the front right wheel FR and the wheel cylinder 126 of the rear left wheel RL. Additionally, in the assist pressure increasing state, a flow of the brake fluid in a direction from the fluid pressure passage 522 to the master cylinder 402 is prevented by $SMC_{-1}$ 512 until the pressure within the fluid pressure passages 522 exceeds a valve opening pressure of the constant pressure relief valves 540 and becomes higher than the master cylinder pressure $P_{M/C}$.

Similarly, in the assist pressure increasing state, the fluid pressure passage 534 is connected to each of the wheel cylinder 122 of the front left wheel FL and the wheel cylinder 124 of the rear right wheel RR. Additionally, in the assist pressure increasing state, a flow of the brake fluid in a direction from the fluid pressure passage 534 to the master cylinder 402 is prevented by $SMC_{-2}$ 514 until the pressure within the fluid pressure passages 534 exceeds a valve opening pressure of the constant pressure relief valves 542 and becomes higher than the master cylinder pressure $P_{M/C}$.

Accordingly, after the assist pressure increasing state shown in FIG. 35 is set, the wheel cylinder pressure $P_{W/C}$ of each wheel is rapidly increased to a pressure exceeding the master cylinder pressure $P_{M/C}$ by using the first pump 560 and the second pump 462 as a fluid pressure source. Thus, the brake force can be rapidly increased in the assist pressure increasing state shown in FIG. 35.

In the assist pressure increasing state shown in FIG. 35, the fluid pressure passages 518, 522, 528 and 530 are connected to the master cylinder 402 via check valves 544 and 546, respectively. Thus, when the master cylinder pressure $P_{M/C}$ is higher than the wheel cylinder pressure $P_{W/C}$ of each wheel, the wheel cylinder pressure $P_{W/C}$ can be increased by using the master cylinder 402 as a fluid pressure source even in a state where the BA function is performed.

FIG. 36 shows the assist pressure holding state which is set during execution of the BA control. The assist pressure holding state is set when the wheel cylinder pressure $P_{W/C}$ of each wheel is needed to be maintained during execution of the BA control, that is, when execution of the (IV) assist pressure holding mode is requested. As shown in FIG. 36, the assist pressure holding state can be achieved by turning on the master cut solenoid valves $SMC_{-1}$ 512 and $SMC_{-2}$ 514.

In the assist pressure holding state shown in FIG. 36, the first pump 560 and the reservoir tank 408 are disconnected from each other by $SRC_{-1}$ 504, and the second pump 562 and the reservoir tank 408 are disconnected from each other by $SRC_{-2}$ 506. Accordingly, in the assist pressure holding state, the brake fluid is not discharged from the first pump 560 and the second pump 562 to the fluid pressure passages 522 and 534. Additionally, in the assist pressure holding state shown in FIG. 36, the fluid pressure passages 518, 522, 530 and 534 are substantially disconnected from the master cylinder 402 by $SMC_{-1}$ 512 and $SMC_{-2}$ 514. Thus, in the assist pressure holding state shown in FIG. 36, the wheel cylinder pressure $P_{W/C}$ of each wheel can be maintained at a constant value.

FIG. 37 shows the assist pressure decreasing state which is set during execution of the BA control. The assist pressure decreasing state is set when the wheel cylinder pressure $P_{W/C}$ of each wheel is needed to be decreased during execution of the BA control, that is, when execution of one of the (III) assist pressure decreasing mode and the (VI) assist pressure moderately decreasing mode is requested. As shown in FIG. 37, the assist pressure decreasing state can be achieved by turning off all of the solenoid valves.

In the assist pressure decreasing state shown in FIG. 37, the first pump 560 and the second pump 562 are disconnected from the reservoir tank 408. Accordingly, the brake fluid is not discharged from the first pump 560 and the second pump 562 to the fluid pressure passages 522 and 534. Additionally, in the assist pressure decreasing state, each of the wheel cylinders 120 to 126 of the wheels is connected to the master cylinder 402. Accordingly, when the assist pressure decreasing state is set, the wheel cylinder pressure $P_{W/C}$ of each wheel can be decreased down to the master cylinder pressure $P_{M/C}$ as a lower limit.

In the present embodiment, the ECU 10 achieves the BA function when an emergency brake operation is performed by combining the assist pressure increasing state, assist pressure holding state and the assist pressure decreasing state shown in FIGS. 35 to 37 as is in the above-mentioned first embodiment. Thus, according to the brake force control apparatus of the present embodiment, similar to the above-mentioned first and second embodiments, it is possible to reflect the driver's intention in the wheel cylinder pressure $P_{W/C}$ while maintaining the assist pressure Pa to be a substantially constant value during execution of the BA control.

In the brake force control apparatus according to the present embodiment, after the above-mentioned BA control is started, an excessive slip rate may be generated in any one of the wheels as the wheel cylinder pressure $P_{W/C}$ is rapidly increased. In such a case, the ECU 10 starts the BA+ABS control. A description will now be given, with reference to FIGS. 37, 38 and 39, of an operation of the brake force control apparatus associated with the BA+ABS function.

After the BA+ABS control is started and when a brake operation to increase a brake force is performed by the driver, the brake force control apparatus according to the present embodiment attempts to control the wheel cylinder pressure $P_{W/C}$ for an ABS objective wheel to be at a pressure requested by the ABS control and to increase the wheel cylinder pressure $P_{W/C}$ of other wheels.

Figure 38:
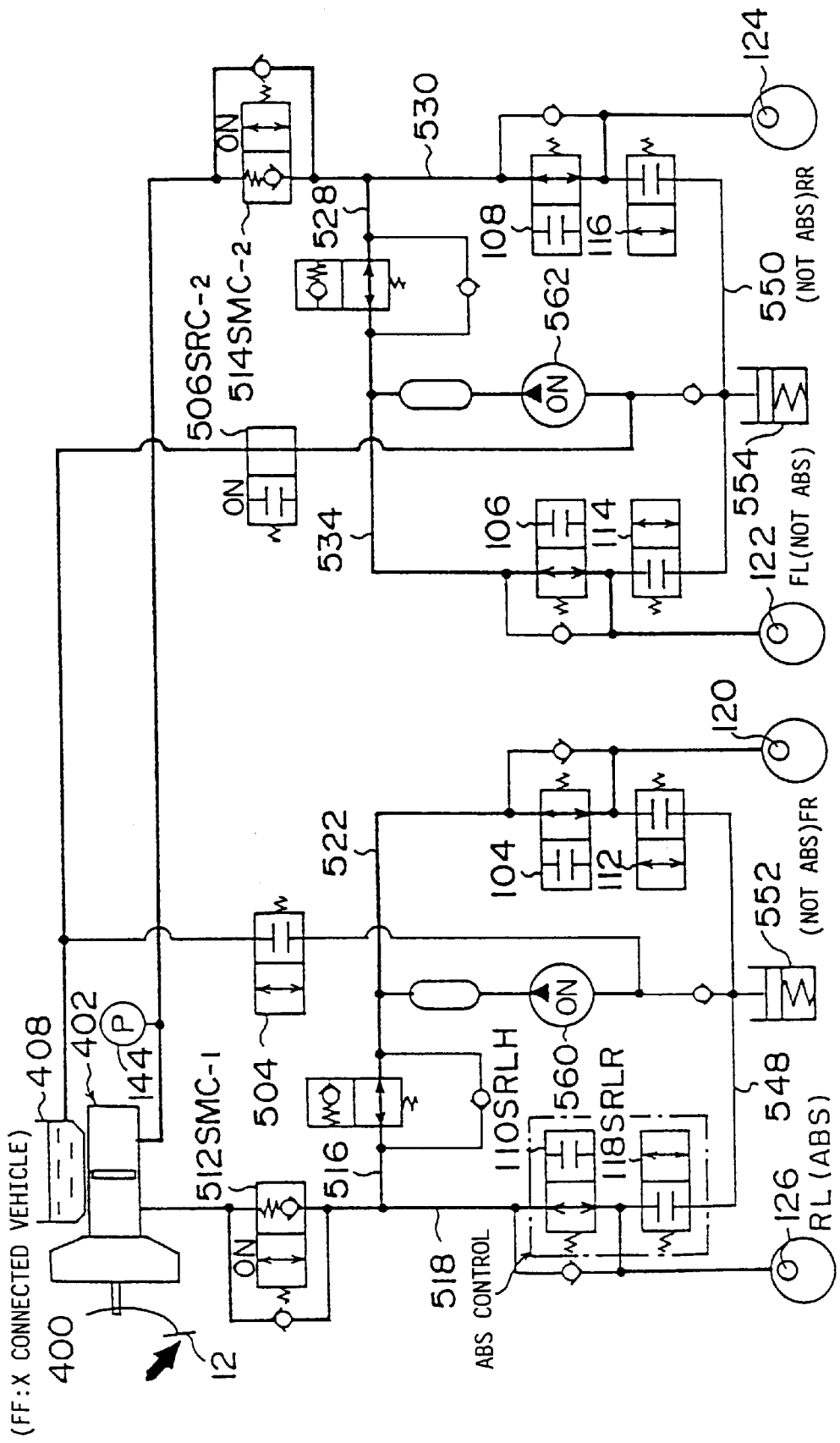
FIG. 38 is an illustration showing an assist pressure increasing state of the brake force control apparatus according to the third embodiment of the present invention which is achieved during execution of the BA+ABS control.

FIG. 38 shows a state which is set to achieve the above-mentioned function during execution of the BA+ABS control in which the rear left wheel RL is the ABS objective wheel. Hereinafter, the state shown in FIG. 38 is referred to as an assist pressure increasing ABS state. The assist pressure increasing ABS state can be set by turning on the second reservoir cut solenoid valve $SRC_{-2}$ 506 and the master cut solenoid valves $SMC_{-1}$ 512 and $SMC_{-2}$ 514 and turning on the first pump 560 and the second pump 562, and appropriately controlling, if necessary, the holding solenoid valve SRLH 110 and the pressure decreasing solenoid valve SRLR 118 corresponding to the rear right wheel RL.

In the assist pressure increasing ABS state, similar to the assist pressure increasing state shown in FIG. 35, the brake fluid discharged from the second pump 562 is supplied to the wheel cylinders 122 and 124 corresponding to the front left and rear right wheels FL and RR. Accordingly, when the assist pressure increasing ABS state is set, the wheel cylinder pressure $P_{W/C}$ of the wheels FL and RR is increased similar to the case in which the assist pressure increasing state is set during the BA control.

The BA+ABS control in which the rear left wheel RL is set to be an ABS objective wheel is started by execution of the (ii) pressure decreasing mode for the rear left wheel RL. Accordingly, the brake fluid enters the first reservoir 552 simultaneously when the BA+ABS control is started. In the assist pressure increasing ABS state shown in FIG. 35, the first pump 560 suctions and delivers the thus entering brake fluid.

The brake fluid delivered by the first pump 560 is mainly supplied to the wheel cylinder 120 corresponding to the front right wheel FR, and is also supplied to the wheel cylinder 126 when the (i) pressure increasing mode is performed. According to the above control, the wheel cylinder pressure $P_{W/C}$ corresponding to the front right wheel FR can be increased similar to a case in which the assist pressure increasing state is set during the BA control, while the wheel cylinder pressure $P_{W/C}$ corresponding to the rear left wheel RL is controlled to be an appropriate value so that an excessive slip rate is not generated in the rear left wheel RL.

As mentioned above, according to the assist pressure increasing ABS state shown in FIG. 38, the wheel cylinder pressure $P_{W/C}$ for the front left and front right wheels FL and FR and the rear right wheel RR which are not set as the ABS objective wheel can be rapidly increased as is in the case where the assist pressure increasing state is set during the BA control, while the wheel cylinder pressure $P_{W/C}$ for the rear left wheel RL which is the ABS objective wheel is controlled to a pressure responding to a request by the ABS control.

After the BA+ABS control is started, the brake force control apparatus according to the present embodiment controls the wheel cylinder pressure $P_{W/C}$ corresponding to the ABS objective wheel to a pressure responding to the ABS control while an attempt is made to maintain the wheel cylinder pressure $P_{W/C}$ of other wheels.

Figure 39:
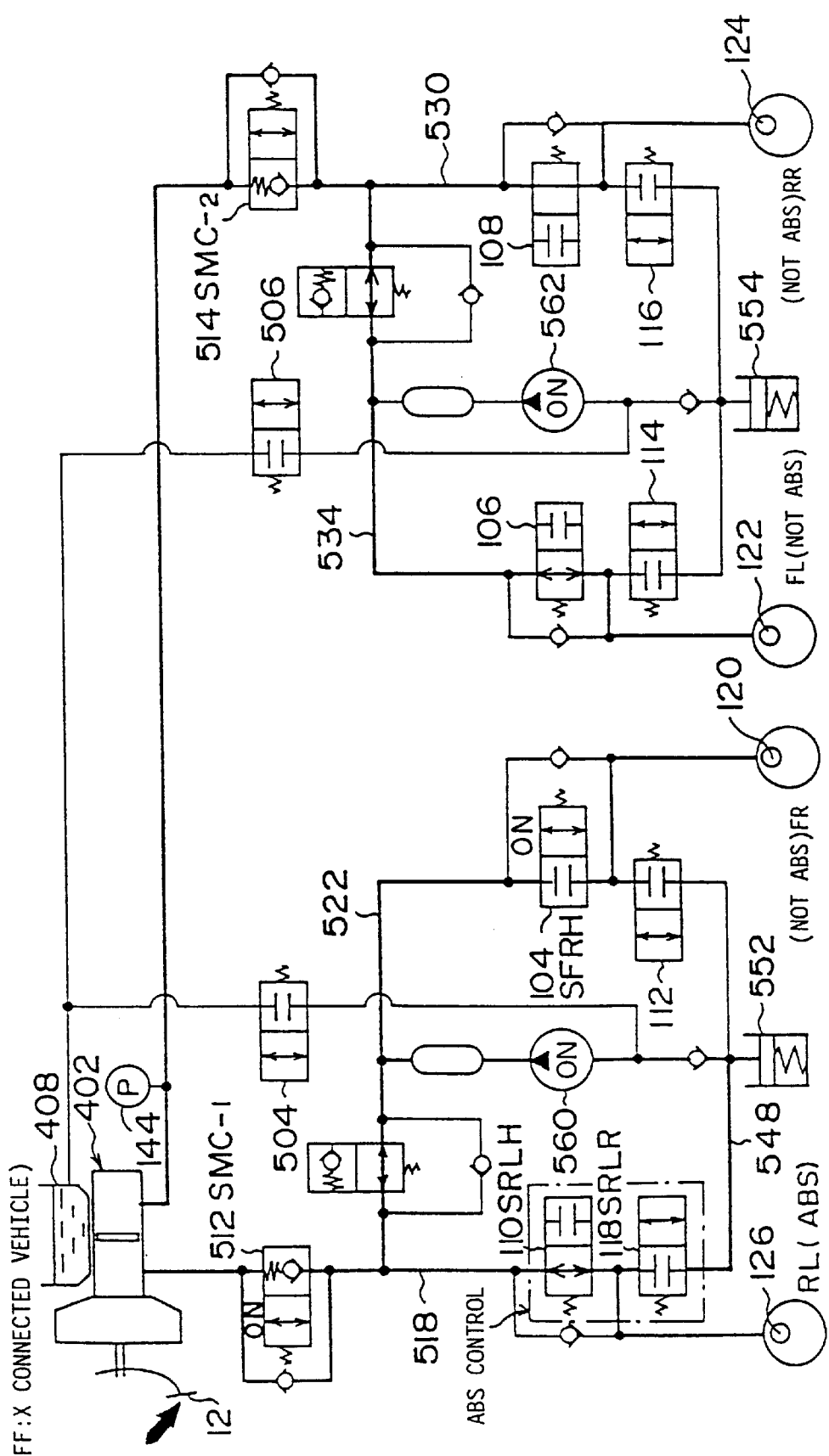
FIG. 39 is an illustration showing an assist pressure holding state of the brake force control apparatus according to the third embodiment of the present invention which is achieved during execution of the BA+ABS control.

FIG. 39 shows a state which is set to achieve the above-mentioned function during execution of the BA+ABS control in which the front left wheel FL is set to the ABS objective wheel. Hereinafter, the state shown in FIG. 36 is referred to as an assist pressure holding ABS state. The assist pressure holding ABS state can be set by turning on the master cut solenoid valves $SMC_{-1}$ 512 and $SMC_{-2}$ 514, and turning on the first pump 560 and the second pump 562, and turning on the holding solenoid valve SFRH 104 corresponding to the front right wheel FR, and appropriately controlling, if necessary, the holding solenoid valve SRLH 110 and the pressure decreasing solenoid valve SRLR 118 corresponding to the rear left wheel RL.

In the assist pressure holding ABS state, similar to the assist pressure increasing state shown in FIG. 36, the second pump 562 is disconnected from the reservoir tank 408. Additionally, the fluid pressure passages 530 and 534 are substantially disconnected from the master cylinder 402 as is in the case where the assist pressure holding state is set as shown in FIG. 36. Accordingly, when the assist pressure holding ABS state is set, the wheel cylinder pressure $P_{W/C}$ for the front left and rear right wheels FL and RR is maintained at a constant value as is in the case where the assist pressure holding state is achieved during the BA control.

The brake fluid discharged from the wheel cylinder 126 is stored in the first reservoir 552 at the same time when the assist pressure holding ABS state is set or before the assist pressure holding ABS state is set. The first pump 560 suctions and delivers the brake fluid stored in the first reservoir 552 while the assist pressure holding ABS state is set.

In the assist pressure holding state, the wheel cylinder 120 corresponding to the front right wheel FR is disconnected from the first pump 560 by SFRH 104. Thus, the brake fluid delivered by the first pump 560 is supplied only to the wheel cylinder 126 corresponding to the rear left wheel RL. Additionally, a flow of the brake fluid from the first pump 560 to the wheel cylinder 126 is permitted only when the (i) pressure increasing mode is performed with respect to the rear left wheel RL. According to the above control, the wheel cylinder pressure $P_{W/C}$ for the front right wheel FR is maintained at a constant value while the wheel cylinder pressure $P_{W/C}$ for the rear left wheel RL is controlled to be an appropriate pressure which does not generate an excessive slip rate in the rear left wheel RL.

As mentioned above, according to the assist pressure increasing ABS state shown in FIG. 39, the wheel cylinder pressure $P_{W/C}$ for the front left and front right wheels FL and FR and the rear right wheel RR which are not the ABS objective wheels can be maintained at a constant value as is in the case where the assist pressure holding state is set during the BA control, while the wheel cylinder pressure $P_{W/C}$ for the rear left wheel RL which is the ABS objective wheel is controlled to be an appropriate pressure responding to a request by the ABS control.

After the BA+ABS control is started, the brake force control apparatus according to the present embodiment controls the wheel cylinder pressure $P_{W/C}$ corresponding to the ABS objective wheel to a pressure responding to a request by the ABS control while an attempt is made to decrease the wheel cylinder pressure $P_{W/C}$ of other wheels.

The above-mentioned function can be achieved by appropriately controlling the holding solenoid valves SH and the pressure decreasing solenoid valves SR while the assist pressure decreasing state shown in FIG. 37 is achieved so that one of the (i) pressure increasing mode, the (ii) holding mode and the (iii) pressure decreasing mode is achieved for the ABS objective wheel. Hereinafter, the state in which the above-mentioned control is performed is referred to as assist pressure decreasing ABS state.

That is, when the assist pressure decreasing ABS state is set, each of the holding solenoid valves is connected to the master cylinder 402. Accordingly, if the assist pressure decreasing ABS state is set, the wheel cylinder pressure $P_{W/C}$ corresponding to the wheels which are not the ABS objective wheel can be decreased down to the master cylinder as a lower limit. Additionally, as for the ABS objective wheel, the wheel cylinder pressure $P_{W/C}$ can be maintained or decreased by setting the (ii) holding mode or the (iii) pressure decreasing mode.

The assist pressure decreasing ABS state is set when the driver intends to decrease the brake force, that is, when there is no need to increase the wheel cylinder pressure $P_{W/C}$ for any one of wheels. Accordingly, the wheel cylinder pressure $P_{W/C}$ of the ABS objective wheel can be appropriately controlled to a pressure required by the BA+ABS control by achieving the (ii) holding mode and the (iii) pressure decreasing mode.

As mentioned above, according to the above-mentioned assist pressure decreasing ABS state, the wheel cylinder pressure $P_{W/C}$ for the front left and front right wheels FL and FR and the rear right wheel RR which are not the ABS objective wheels can be decreased down to the master cylinder pressure $P_{M/C}$ as a lower limit as is in the case where the assist pressure decreasing state is set during the BA control, while the wheel cylinder pressure $P_{W/C}$ for the rear left wheel RL which is the ABS objective wheel is controlled to be an appropriate pressure responding to a requested mode by the ABS control.

In a case where execution of the ABS control is no longer required for each of the wheels, such as when the vehicle has moved from a high friction road to a low friction road, after the BA+ABS control is started, the ECU 10 ends the ABS control and performs the BA control independently. When controls are switched in this way, the ECU performs the above-mentioned ABS ending control for the ABS objective wheel for a predetermined time so that a rapid change is not generated in the wheel cylinder pressure $P_{W/C}$ of the ABS objective wheel.

However, if the assist pressure holding state shown in FIG. 36 is set at a time when the BA+ABS control is ended, the wheel cylinder pressure $P_{W/C}$ of only the ABS objective wheel is intermittently increased by means of the first pump 560 when the ABS ending control is performed. In this case, the wheel cylinder pressure $P_{W/C}$ of the ABS objective wheel may be excessively increased exceeding the wheel cylinder pressure $P_{W/C}$ of the other wheels.

If the wheel cylinder pressure $P_{W/C}$ of the ABS objective wheel is excessively increased when the BA+ABS control is ended as described above, an excessively large deceleration is generated in the vehicle as compared to the target deceleration which is to be generated. When such an excessive value of the deceleration G is detected, the ECU determines that the wheel cylinder pressure $P_{W/C}$ of any of the wheels is excessively increased and performs the (VIII) assist pressure correcting and holding mode by executing the control routine shown in FIG. 20.

In the brake force control apparatus of the present embodiment, the (VIII) assist pressure correcting and holding mode is achieved by closing all of the holding solenoid valves SH and the pressure decreasing solenoid valves SR in a situation where the (IV) assist pressure holding mode is set to be the requested mode. According to the (VIII) assist pressure correcting and increasing mode, the wheel cylinder pressure $P_{W/C}$ of all of the wheels can be reliably inhibited from being increased. Thus, according to the brake force control apparatus of the present embodiment, it is possible to prevent a rapid increase in the wheel cylinder pressure $P_{W/C}$ of the ABS objective wheel when the BA+ABS control is ended.

As described above, the brake force control apparatus discharges the wheel cylinder pressure $P_{W/C}$ of each of the wheels into the master cylinder 402 by setting the assist pressure decreasing state shown in FIG. 37 when a brake operation which is intended to decrease the brake fluid pressure is performed, that is, when a pressure decreasing operation is performed during execution of the BA control or the BA+ABS control. During the process in which the wheel cylinder pressure $P_{W/C}$ of each of the wheels is discharged into the master cylinder 402, a fluctuation occurs in the master cylinder pressure $P_{M/C}$ detected by the fluid pressure sensor 144. For this reason, similar to the first and second embodiments, the wheel cylinder pressure $P_{W/C}$ of each of the wheel may be excessively decreased after the assist pressure decreasing state is set in the brake force control apparatus of the present embodiment.

If the wheel cylinder pressure $P_{W/C}$ of each of the wheels is excessively decreased during execution of the BA control, an adequate deceleration can not be generated in the vehicle. When the deceleration G, whose value is smaller than the target deceleration, is generated during execution of the BA control, the ECU 10 determines that the wheel cylinder pressure $P_{W/C}$ of each of the wheels is excessively decreased and performs the (VII) assist pressure correcting and increasing mode by executing the control routine shown in FIG. 20.

In the present embodiment, the (VII) assist pressure correcting and increasing mode is achieved by alternately setting the assist pressure increasing state and the assist pressure holding state or by alternately setting the assist pressure increasing ABS state and the assist pressure holding ABS state in a situation where the (IV) assist pressure holding mode is set to be the requested mode. According to the (VII) assist pressure correcting and increasing mode, the wheel cylinder pressure of the wheels other than the ABS objective wheel can be increased and corrected to be an adequate fluid pressure. Thus, according to the brake force control apparatus of the present embodiment, it is possible to correct the excessive decrease in the wheel cylinder pressure $P_{W/C}$ and generate a wheel cylinder pressure $P_{W/C}$ to which the driver's intention is accurately reflected.

Figure 40:
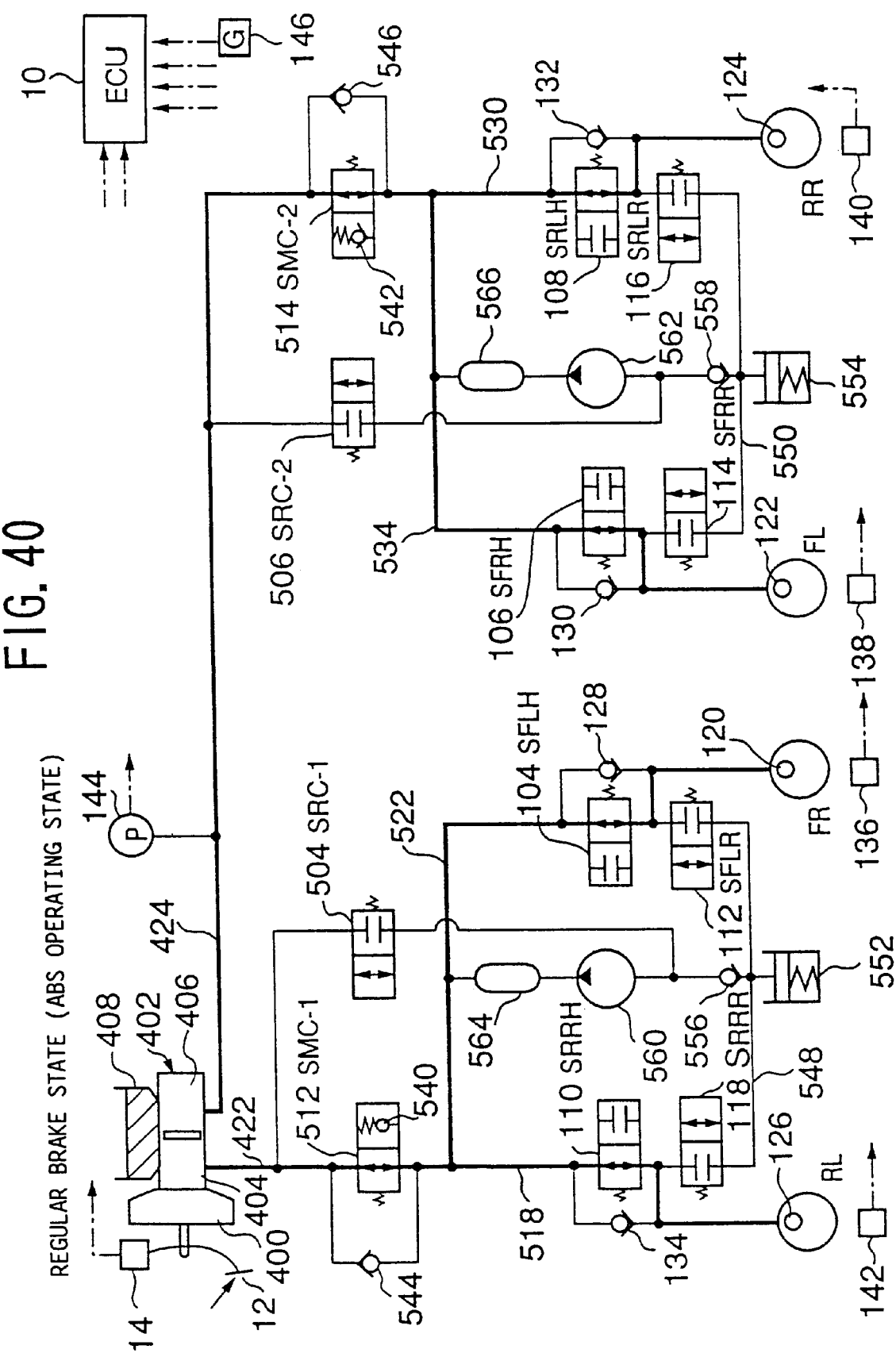
FIG. 40 is a system structure diagram showing a regular brake state and an ABS operating state of a brake force control apparatus according to a fourth embodiment of the present invention.

A description will now be given, with reference to FIGS. 40 to 45, of a fourth embodiment of the present invention. FIG. 40 shows a system structure diagram of an inline type brake force control apparatus (hereinafter simply referred to as a brake force control apparatus) according to the fourth embodiment of the present invention. The brake force control apparatus of the present embodiment is suitable for a brake force control apparatus used for a front-engine front-drive automobile (FF automobile).

In the brake force control apparatus of the present embodiment, inlets of the first pump 560 and the second pump 562 are connected to the master cylinder 402 via the first fluid pressure passage 422 or the second fluid pressure passage 424. Accordingly, the first pump 560 and the second pump 562 suck up the brake fluid from the maser cylinder 402. In the brake force control apparatus of the present embodiment, the ECU 10 performs a control routine which consists of a process shown in FIG. 45 and the process shown in FIGS. 14 to 19, as well as the control routines shown in FIGS. 9 to 11 and FIG. 20.

Now, a description will be given of an operation of the brake force control apparatus of the present embodiment. The brake force control apparatus of the present embodiment achieves (1) a regular brake function, (2) an ABS function, and (3) a BA function by operating various solenoid valves provided in the fluid circuit.

The (1) regular brake function is achieved by turning off all of the solenoid valves provided in the brake force control apparatus as shown in FIG. 40. Hereinafter, the state shown in FIG. 40 is referred to as a regular brake state. Additionally, a control for achieving the regular brake function is referred to as a regular brake control.

In the regular brake state shown in FIG. 40, both the wheel cylinder 120 of the front right wheel FR and the wheel cylinder 126 of the rear left wheel RL are connected to the first hydraulic pressure chamber 404 of the master cylinder 402 via the first fluid pressure passage 422. Additionally, the wheel cylinder 122 of the front left wheel FL and the wheel cylinder 124 of the rear right wheel RR are connected to the second hydraulic pressure chamber 406 of the master cylinder 402 via the second fluid pressure passage 424. In this case, the wheel cylinder pressure $P_{W/C}$ of the wheel cylinders 120 to 126 is controlled to be equal to the master cylinder pressure $P_{M/C}$. Accordingly, the regular brake function is achieved in the state shown in FIG. 40.

The (2) ABS function is achieved by turning on the first pump 560 and the second pump 562 and appropriately operating the holding solenoid valves SH and the pressure decreasing solenoid valves SR in response to requirements by ABS in the state shown in FIG. 40. Hereinafter, a control for achieving the ABS function in the brake force control apparatus is referred to ABS function.

During execution of the ABS control, all of the four fluid pressure passages 518, 522, 530, 534 provided to the respective wheels are supplied with the master cylinder pressure $P_{M/C}$ which is a high pressure. Accordingly, the wheel cylinder pressure $P_{W/C}$ of each of the wheels can be increased by opening the holding solenoid valves SH and closing the pressure decreasing solenoid valves SR in such a situation. Hereinafter, this state is referred to as (i) a pressure increasing mode.

Additionally, the wheel cylinder pressure $P_{W/C}$ of each of the wheels can be maintained by closing both the holding solenoid valves SH and the pressure decreasing solenoid valves SR during execution of the ABS control. Hereinafter, this state is referred to as (ii) a holding mode. Further, the wheel cylinder pressure $P_{W/C}$ can be decreased by closing the holding solenoid valves SH and opening the pressure decreasing solenoid valves SR during execution of the ABS control. Hereinafter, this state is referred to as (iii) a pressure decreasing mode.

The ECU 10 controls the holding solenoid valves SH and the pressure decreasing solenoid valves SR in response to a slip state of each wheel so that the above-mentioned (i) pressure increasing mode, (ii) holding mode, and (iii) pressure decreasing mode are appropriately achieved for each of the wheels during execution of the ABS control. If the holding solenoid valves SH and the pressure decreasing solenoid valves SR are controlled as described above, the wheel cylinder pressure $P_{W/C}$ of all of the wheels is controlled to be an appropriate pressure so that an excessive slip rate is not generated in the respective wheels. Thus, according to the above-mentioned control, the ABS function can be achieved in the brake force control apparatus.

Figure 41:
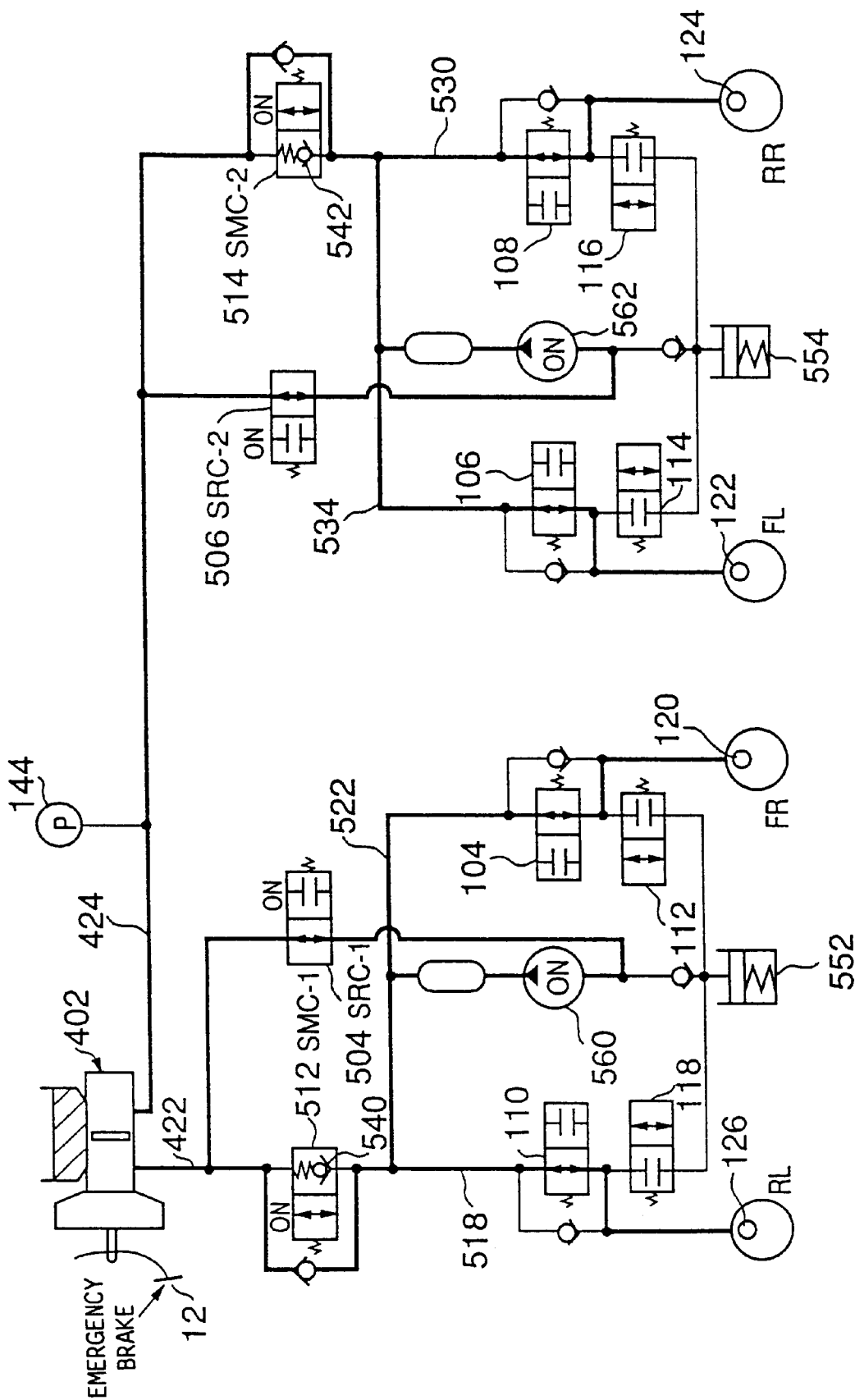
FIG. 41 is an illustration showing an assist pressure increasing state of the brake force control apparatus according to the fourth embodiment of the present invention which is achieved during execution of the BA control.
Figure 42:
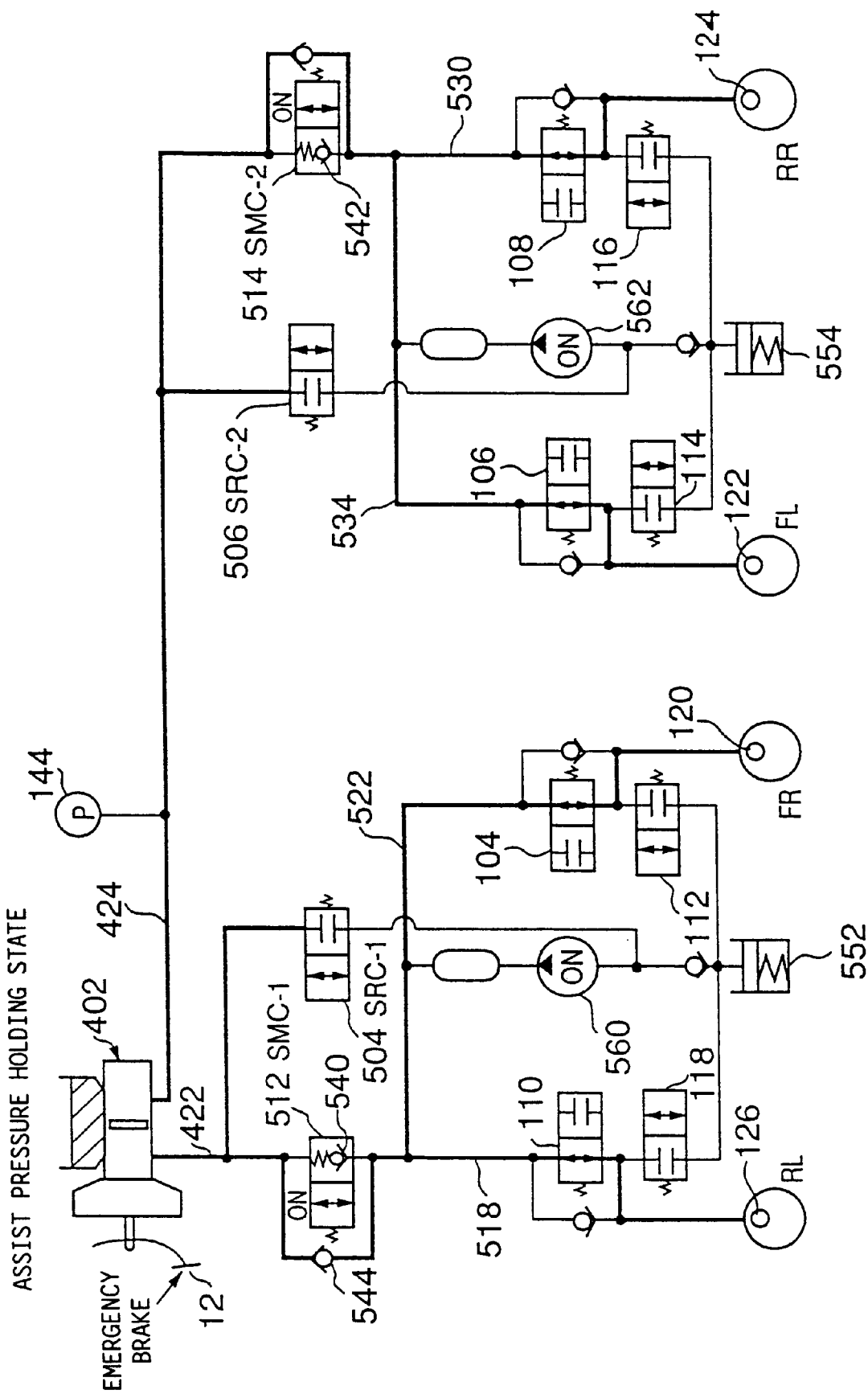
FIG. 42 is an illustration showing an assist pressure holding state of the brake force control apparatus according to the fourth embodiment of the present invention which is achieved during execution of the BA control.
Figure 43:
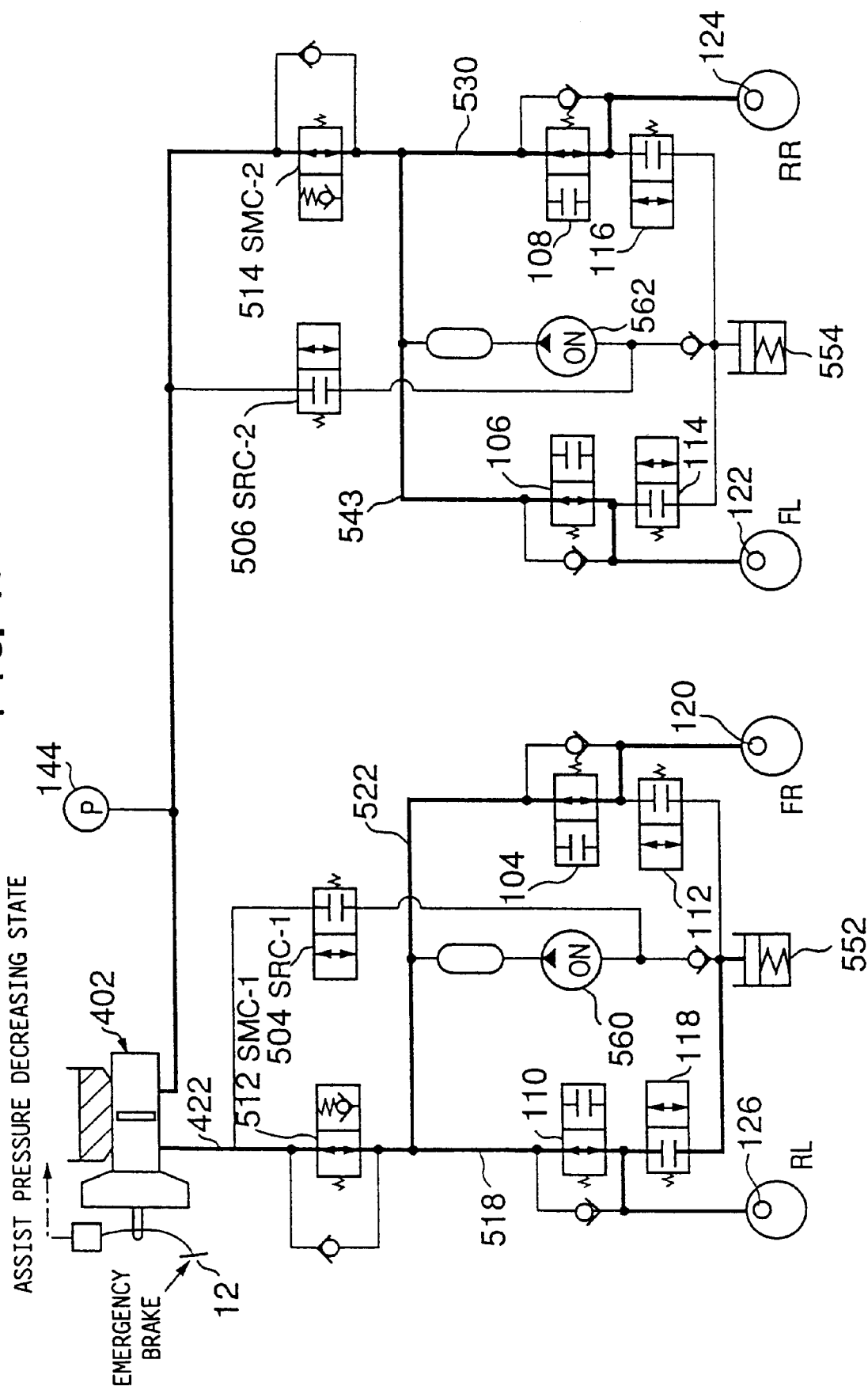
FIG. 43 is an illustration showing an assist pressure decreasing state of the brake force control apparatus according to the fourth embodiment of the present invention which is achieved during execution of the BA control.

The (3) BA function can be achieved by appropriately setting the brake force control apparatus in one of the states shown in FIGS. 41 to 43. Hereinafter, a control for achieving the BA function in the brake force control apparatus is referred to as BA control. The ECU 10 starts the BA control after a brake operation which requests a rapid increase in the brake force, that is, an emergency brake operation is performed by the driver.

FIG. 41 is an assist pressure increasing state which is achieved during execution of the BA control. The assist pressure increasing state is set when the wheel cylinder pressure $P_{W/C}$ of each of the wheels is needed to be increased during execution of the BA control, that is, when the (I) start pressurizing mode, the (II) assist pressure increasing mode, or the (V) assist pressure moderately increasing mode is requested during execution of the BA control.

In the system of the present embodiment, the assist pressure increasing state is achieved by turning on the reservoir cut solenoid valves $SRC_{-1}$ 504, $SRC_{-2}$ 506 and the master cut solenoid valves $SMC_{-1}$ 512, $SMC_{-2}$ 514 and also turning on the first pump 560 and the second pump 562 as shown in FIG. 41.

When the assist pressure increasing state is achieved, the first pump 560 and the second pump 562 begin to pump up the brake fluid from the first fluid pressure passage 422 and the second fluid pressure passage 424, respectively. Accordingly, the wheel cylinder pressure $P_{W/C}$ of each of the wheels can be immediately increased to a pressure exceeding the master cylinder pressure $P_{W/C}$ in the assist pressure increasing state shown in FIG. 41.

FIG. 42 show an assist pressure holding state which is achieved during execution of the BA control. The assist pressure holding state is set when the wheel cylinder pressure $P_{W/C}$ of each of the wheels is needed to be maintained during execution of the BA control, that is, when the (IV) assist pressure holding mode is requested during execution of the BA control. The assist pressure holding state is achieved by turning on the master cut solenoid valves $SMC_{-1}$ 512, $SMC_{-2}$ 514 as shown in FIG. 36.

When the assist pressure holding state shown in FIG. 42 is achieved, the first pump 560 and the first fluid pressure passage 422 are disconnected from each other by $SRC_{-1}$ 504, and the second pump 562 and the second fluid pressure passage 424 are disconnected from each other by the $SRC_{-2}$ 506. Thus, the first pump 560 and the second pump 562 cannot deliver the brake fluid to the wheel cylinders 120 to 126.

Additionally, in the assist pressure holding state shown in FIG. 42, the fluid pressure passages 518, 522 and 530, 534 are substantially disconnected from the master cylinder 402 by $SMC_{-1}$ 512 and $SMC_{-2}$ 514, respectively. Accordingly, a flow of fluid from the wheel cylinders 120 to 126 to the master cylinder 402 is prevented. Thus, the wheel cylinder pressure $P_{W/C}$ of each of the wheels can be maintained to be a constant pressure in the assist pressure holding state.

FIG. 43 shows an assist pressure decreasing state which is achieved during execution of the BA control. The assist pressure decreasing state is set when the wheel cylinder pressure $P_{W/C}$ of each of the wheels is needed to be decreased during execution of the BA control, that is, when the (III) assist pressure decreasing mode or the (VI) assist pressure moderately decreasing mode is requested during the BA control. The assist pressure decreasing state is achieved by turning off all of the solenoid valves as shown in FIG. 43.

In the assist pressure decreasing state shown in FIG. 43, the first pump 560 and the first fluid pressure passage 422 are disconnected from each other by $SRC_{-1}$ 504, and the second pump 562 and the second fluid pressure passage 424 are disconnected from each other by $SRC_{-2}$ 506. Thus, the first pump 560 and the second pump 562 cannot deliver the brake fluid to the wheel cylinders 120 to 126. Additionally, in the assist pressure decreasing state, the wheel cylinders 120 to 126 of the respective wheels are connected to the master cylinder 402 via the first fluid pressure passage 422 and the second fluid pressure passage 424. Accordingly, the wheel cylinder pressure $P_{W/C}$ of all of the wheels can be decreased down to the master cylinder pressure $P_{M/C}$ as a lower limit in the assist pressure decreasing state shown in FIG. 43.

In the present embodiment, similar to the first to third embodiments, the ECU 10 achieves the BA function by appropriately setting the assist pressure increasing state, the assist pressure holding state, and the assist pressure decreasing state shown in FIGS. 41 to 43 when an emergency brake operation is performed by the driver. Thus according to the brake force control apparatus of the present embodiment, the wheel cylinder pressure $P_{W/C}$ can be generated in accordance with the driver's intention during execution of the BA control as in the case of the first to third embodiments.

Now, a description will be given of a characteristic feature of the brake force control apparatus of the present embodiment with reference to FIGS. 44 and 45.

Figure 44:
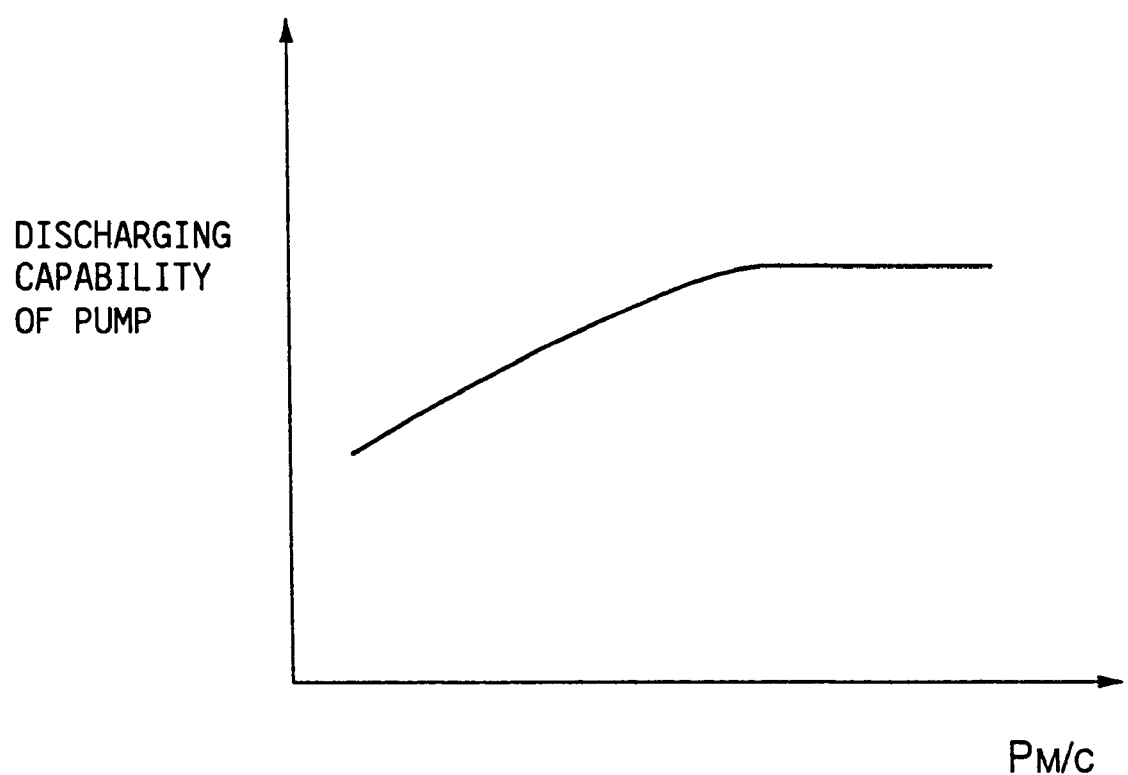
FIG. 44 is a diagram showing a relationship between a discharging capability of a pump provided to the brake force control apparatus according to the fourth embodiment of the present invention and a master cylinder pressure $P_{M/C}$.

FIG. 44 is a diagram showing a relationship between a discharging capability of the first pump 560 and the second pump 562 and the master cylinder pressure $P_{M/C}$. In the present embodiment, the first pump 560 and the second pump 562 pump up the brake fluid from the first fluid pressure passage 422 and the second fluid pressure passage 424, respectively. A pump generally exhibits a higher discharging capability as a fluid pressure supplied to its inlet increases. Accordingly, as shown in FIG. 44, the first pump 560 and the second pump 562 exhibit a higher discharging capability as the master cylinder pressure $P_{M/C}$ increases.

In the first to third embodiments described above, the assist pressure Pa is generated by performing the (I) start pressurizing mode for the predetermined time $T_{STA}$ after an emergency brake operation is performed by the driver. If the pump which generates the assist pressure Pa has a substantially constant discharging capability, a constant assist pressure Pa can be generated by means of the above-mentioned procedure. However, in the system of the present embodiment where a discharging capability of a pump changes, a constant assist pressure Pa cannot be generated by means of the above-mentioned procedure. For this reason, the brake force control apparatus of the present embodiment performs the (I) start pressurizing mode by means of a procedure which is different from that used in the first to third embodiments.

Figure 13:
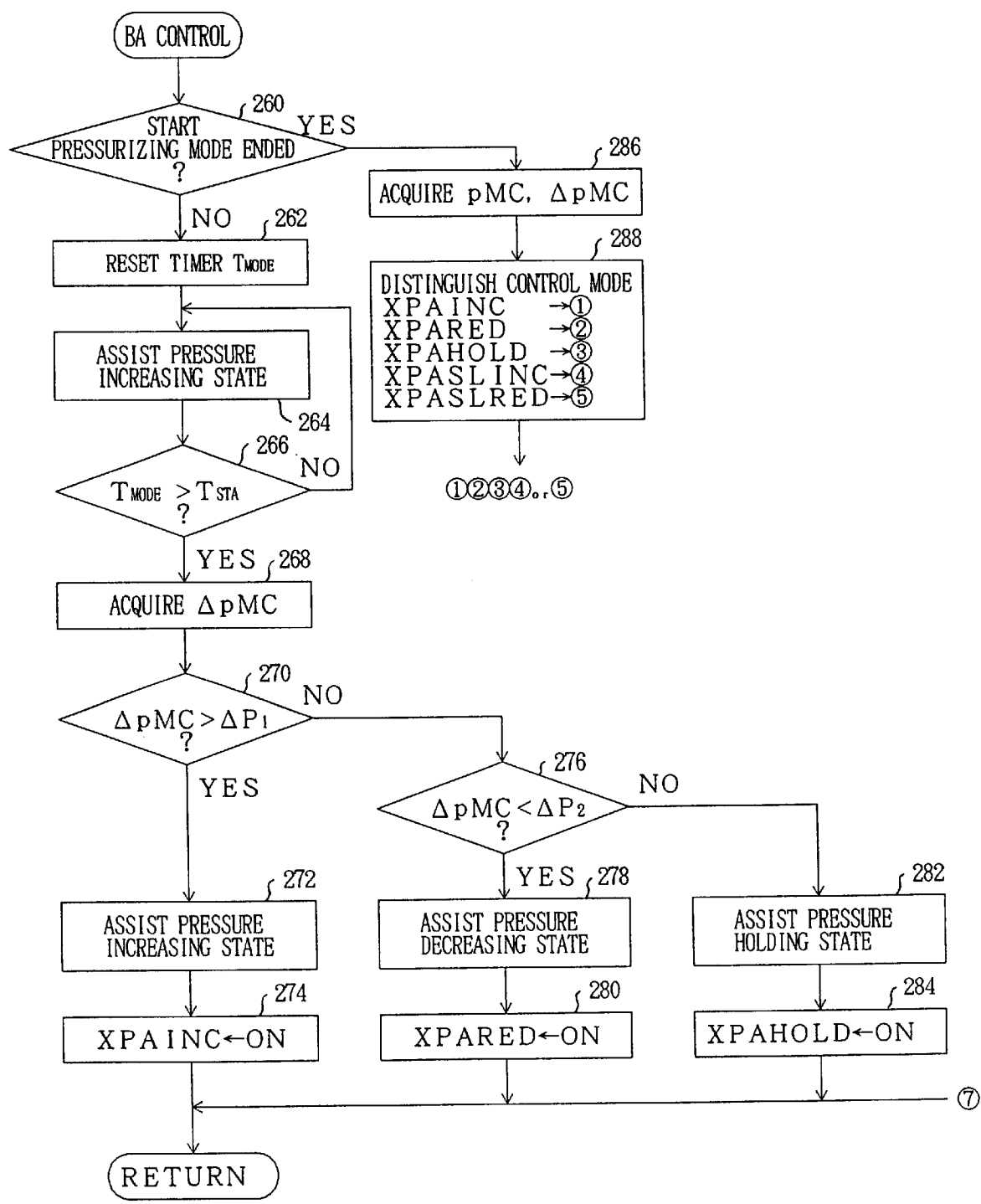
FIG. 13 is a part 1 of a flowchart of an example of a control routine performed to achieve the BA control in the brake force control apparatus according to first to third embodiments of the present invention.
Figure 45:
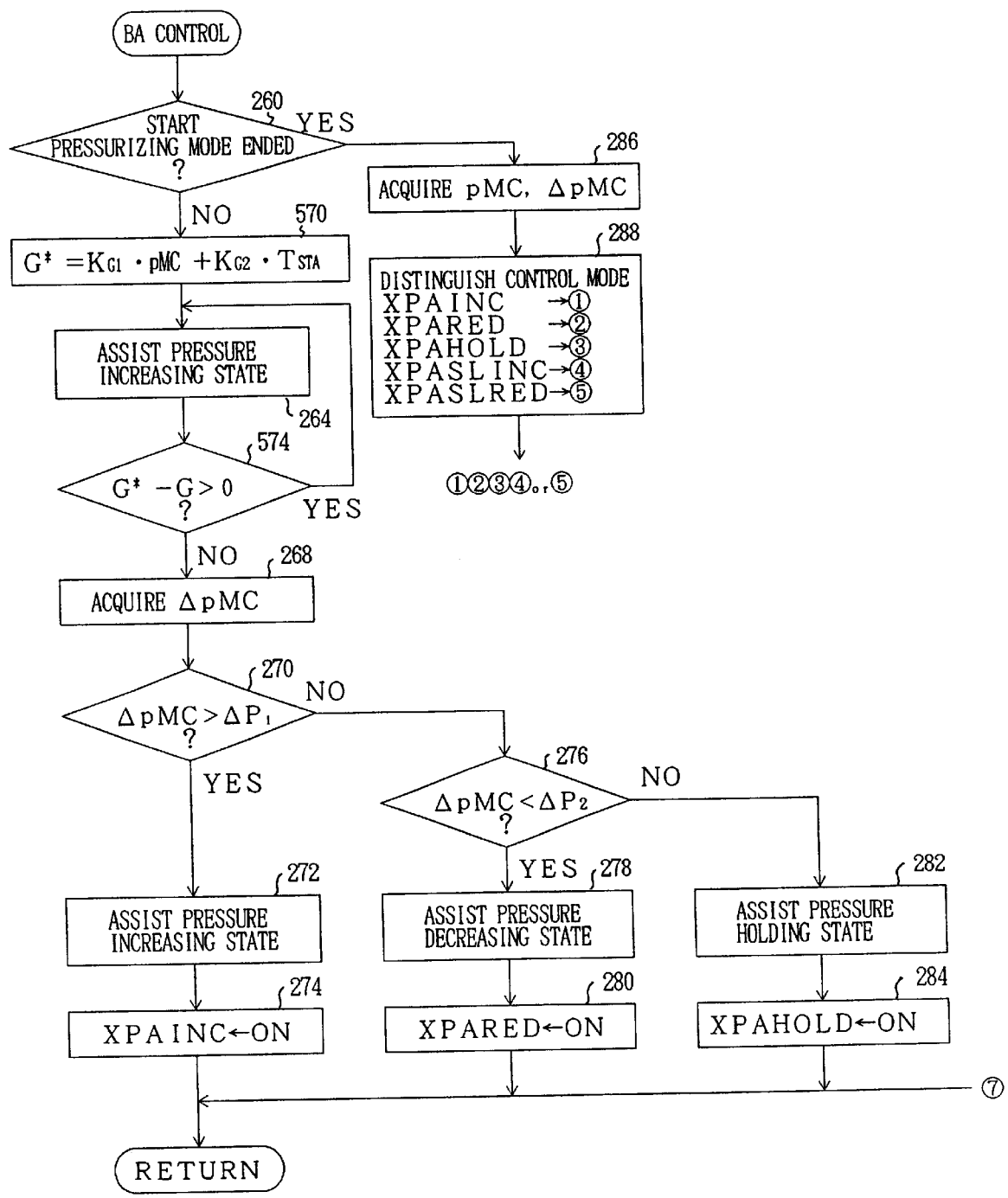
FIG. 45 is a flowchart of an example of a control routine which is performed to achieve the BA control in the brake force control apparatus according to the fourth embodiment of the present invention.

FIG. 45 shows a flowchart of processes performed by the ECU 10 so as to assure a constant assist pressure Pa in the system of the present embodiment. The ECU 10 performs the processes shown in FIG. 45 in combination with the processes shown in FIGS. 14 to 19, similar to the case of the processes shown in FIG. 13. In FIG. 45, steps in which the same processes is performed as those of steps shown in FIG. 13 are given the same numerals, and descriptions thereof will be omitted.

The processes shown in FIG. 45 is started from step 260 in a situation where a condition for starting the BA control is established. In the routine, if it is determined that the start pressurizing mode is not yet ended in step 260, the process of step 570 is then performed.

In step 570, a target deceleration G* which is to be generated during execution of the BA control is calculated. The target deceleration G* is calculated by assigning the output signal pMC of the fluid pressure sensor 144 and the pressure increasing time $T_{STA}$ set in the step 248 or 250 to the above-mentioned equation (2) (G*=$K_{G1}$·pMC+ $K_{G2}$·$T_{STA}$) as in the case of step 381. When the calculation of the target deceleration G* is completed, the process of step 264, that is, the process for setting the brake force control apparatus in the assist pressure increasing state shown in FIG. 41 is performed. In the present embodiment, when these processes are completed, the process of step 574 is performed.

In step 574, it is determined whether or not a difference G–G* between the target deceleration G and the actual deceleration G is a positive value. If it is determined that G*–G>0 is established, it can be determined that a desired deceleration is not yet obtained. In this case, the process of step 264 is performed again. On the other hand, if it is determined that G*–G>0 is not established, it can be determined that the deceleration G of the vehicle has reached the target deceleration G*. In this case, the process of step 268 and subsequent steps is performed thereafter so as to end the (I) start pressurizing mode and perform the other control modes.

According to the above-mentioned process, the (I) start pressurizing mode is ended at a time when the deceleration G of the vehicle is equal to the target deceleration G*. Thus, according to the above-mentioned process, a desired deceleration G can be positively generated irrespective of the discharging capabilities of the first pump 560 and the second pump 562 by performing the start pressurizing mode.

The deceleration generated in the vehicle during execution of the BA control is effected by a weight of loads carried by the vehicle, as well as by the discharging capabilities of the pumps as described above. The brake force control apparatus of the present embodiment performs the start pressurizing mode so that the actual deceleration G is equal to the target deceleration G*. Thus, according to the brake force control apparatus of the present embodiment, even when a weight of loads carried by the vehicle has changed, a desired deceleration G can always be generated by performing the start pressurizing mode.

The brake force control apparatus of the present embodiment continues execution of the BA control by performing the processes shown in FIGS. 14 to 19 after the start pressurizing mode is ended. These processes are performed for the purpose of maintaining the assist pressure Pa obtained in association with execution of the start pressurizing mode to be constant during execution of the BA control, more specifically, for the purpose of maintaining an amount of deceleration increased by generating the assist pressure Pa to be constant. Hereinafter, the amount of deceleration increased by generating the assist pressure Pa is referred to as an assist deceleration Ga.

However, if the discharging capabilities of the first pump 560 and the second pump 562 change depending on the master cylinder pressure $P_{M/C}$ as in the system of the present embodiment, the assist deceleration may change while the processes shown in FIGS. 14 to 19 are repeatedly performed.

In order to avoid such a change in the assist deceleration Ga, the brake force control apparatus of the present embodiment performs the control routine shown in FIG. 20 similar to the first to third embodiments, as described above. According to the control routine shown in FIG. 20, the wheel cylinder pressure $P_{W/C}$ can be corrected, if necessary, so that the actual deceleration G is equal to the target deceleration G* in a situation where the assist pressure holding mode is requested. Thus, according to the brake force control apparatus of the present embodiment, it is possible to always generate a stable assist deceleration Ga regardless of the changes in the discharging capabilities of the first pump 560 and the second pump 562 during execution of the BA control.

It should be noted that, in the above-mentioned embodiment, the deceleration sensor 146 corresponds to the "deceleration detecting means", the "difference detecting means" can be achieved by the ECU 10 calculating "G*–G" in step 574, the "fluid pressure control means" can be achieved by the ECU 10 performing the process of steps 264 and 574.

Additionally, in the above-mentioned embodiment, the fluid pressure sensor 144 corresponds to the "amount of brake operation detecting means", and the "target deceleration setting means" and the "assist deceleration adding means" can be achieved by the ECU 10 performing the process of step 570, and the "basic deceleration detecting means" can be achieved by the ECU 10 calculating "$K_{G1}$·pMC" in step 570.

The present invention is not limited to the embodiments specifically disclosed herein, and various variations and modifications will be made without departing from the scope of the present invention.

What is claimed is:

1. A brake force control apparatus which performs brake assist control for supplying an increased brake fluid pressure which is greater than that generated in a regular brake operation to a wheel cylinder of a vehicle when an emergency brake operation is performed by a driver, characterized by comprising:

deceleration detecting means for detecting a deceleration of the vehicle;

difference detecting means for detecting a difference between a target deceleration which is to be generated during execution of the brake assist control and said deceleration;

fluid pressure control means for controlling a brake fluid pressure which is supplied to the wheel cylinder during execution of the brake assist control based on said difference;

an ABS mechanism for performing ABS control which attempts to decrease a wheel cylinder pressure $P_{W/C}$ for a wheel in which an excessive slip rate is generated, pressure increasing inhibiting means for inhibiting increase of the wheel cylinder pressure $P_{W/C}$ when said ABS control is performed for at least one of front left and right wheels even if said deceleration is smaller than said target deceleration.

2. A brake force control apparatus which performs brake assist control for supplying an increased brake fluid pressure which is greater than that generated in a regular brake operation to a wheel cylinder of a vehicle when an emergency brake operation is performed by a driver, characterized by comprising:

deceleration detecting means for detecting a deceleration of the vehicle;

difference detecting means for detecting a difference between a target deceleration which is to be generated during execution of the brake assist control and said deceleration;

fluid pressure control means for controlling a brake fluid pressure which is supplied to the wheel cylinder during execution of the brake assist control based on said difference and a brake operation performed by the driver.

3. The brake force control apparatus as claimed in claim 2, characterized in that said fluid pressure control means comprises:

pressure correcting and holding means for disconnecting wheel cylinders of all wheels from all fluid pressure sources when said deceleration is greater than said target deceleration by a value which is greater than a first predetermined value and a brake operating speed is smaller than or equal to a second predetermined value.

4. The brake force control apparatus as claimed in claim 3, characterized in that said fluid pressure control means comprises:

pressure correcting and holding interrupting means for interrupting the correction of the brake fluid pressure by said pressure correcting and holding means when a brake operation is performed which intends to decrease or increase a brake force.

5. The brake force control apparatus as claimed in claim 2, characterized in that said fluid pressure control means comprises:

pressure correcting and increasing means for increasing and correcting the brake fluid pressure supplied to the wheel cylinder when said deceleration is smaller than said target deceleration by a value which is greater than a third predetermined value and the brake operating speed is greater than or equal to a fourth predetermined value.

6. The brake force control apparatus as claimed in claim 5, characterized in that said fluid pressure control means comprises:

pressure correcting and increasing interrupting means for interrupting the correction of the brake fluid pressure by said pressure correcting and increasing means when a brake operation is performed which intends to decrease or increase a brake force.

7. The brake force control apparatus as claimed in claim 1, characterizing by further comprising:

a master cylinder which is connected to the wheel cylinder; and a pump which is connected to the wheel cylinder;

wherein said brake force control apparatus supplies brake fluid pumped up by said pump from said master cylinder to said wheel cylinder during execution of said brake assist control.

8. The brake force control apparatus as claimed in claim 2, characterizing by further comprising:

a master cylinder which is connected to the wheel cylinder; and a pump which is connected to the wheel cylinder;

wherein said brake force control apparatus supplies brake fluid pumped up by said pump from said master cylinder to said wheel cylinder during execution of said brake assist control.

* * * * *

UNITED STATES PATENT AND TRADEMARK OFFICE
CERTIFICATE OF CORRECTION

PATENT NO. : 6,312,064 B1
DATED : November 6, 2001
INVENTOR(S) : Shin Koike et al.

It is certified that error appears in the above-identified patent and that said Letters Patent is hereby corrected as shown below:

Title page,
Change "[54] BRAKING FORCE CONTROLLER" to -- [54] BRAKE FORCE CONTROL APPARATUS --.

Column 38,
Line 42, after "392," insert:
-- and 394.

Additionally, in the above-mentioned embodiment, the fluid pressure sensor 144 coresponds to the "amount of brake operation detecting means", the "target deceleration setting means" and the "assist deceleration adding means" can be achieved by the ECU 10 performing the process of step 381, and the "basic deceleration detecting means" can be achieved by the ECU 10 calculating "$K_{G1}$-pMC" in step 381

Further, in the above-mentioned embodiment, the "ABS mechanism" can be achieved by performing the ABS control in the brake force control apparatus, and the "pressure increasing inhibiting means" can be achieved by the ECU 10 performing the process of step 391.

Additionally, in the above-mentioned embodiment, the "fluid pressure control means" can be achieved by the ECU 10 performing the process of steps 382 to 394, the "pressure correcting and holding means" can be achieved by the ECU 10 performing the process of steps 382, 383, the "pressure correcting and holding interrupting means" can be achieved by the ECU 10 performing the process of steps 384 the "pressure correcting and increasing means" can be achieved by the ECU 10 performing the process of step 390 and 392., and the "pressure correcting and increasing interrupting means" can be achieved by the ECU 10 performing the process of step 393.

A description will now be given, with reference to FIGS. 28 to 33, of a second embodiment of the present invention. FIG. 28 shows a system structure diagram of a pump-up type brake force control apparatus (hereinafter simply referred to as a brake force control apparatus) according to the second embodiment of the present invention. In FIG. 10, parts that are the same as the parts shown in FIG. 1 are given the same reference numerals, and descriptions thereof will be omitted. Force control apparatus) according to the third embodiment of the present invention. In FIG. 34, parts that are the same as the parts shown in FIG. 28 are given the same reference numerals, and descriptions thereof will be omitted. --

UNITED STATES PATENT AND TRADEMARK OFFICE
CERTIFICATE OF CORRECTION

PATENT NO.   : 6,312,064 B1
DATED        : November 6, 2001
INVENTOR(S)  : Shin Koike et al.

It is certified that error appears in the above-identified patent and that said Letters Patent is hereby corrected as shown below:

<u>Column 48,</u>
Line 9, delete "and 394."
Lines 10-41, delete entirely.

Signed and Sealed this

Twelfth Day of March, 2002

Attest:

Attesting Officer

JAMES E. ROGAN
Director of the United States Patent and Trademark Office